United States Patent [19]

Kamens et al.

[11] 4,029,615
[45] June 14, 1977

[54] POLYMERIC CELLULAR STRUCTURES

[75] Inventors: Ernest Rudolph Kamens, Tonawanda; Donald Milton Kressin, Getzville; Harold Carl Lange, Grand Island; Ronald Edward MacLeay, Williamsville, all of N.Y.

[73] Assignee: Pennwalt Corporation, Philadelphia, Pa.

[22] Filed: Aug. 26, 1976

[21] Appl. No.: 718,449

Related U.S. Application Data

[60] Division of Ser. No. 548,946, Feb. 11, 1975, Pat. No. 3,993,609, which is a continuation-in-part of Ser. No. 453,446, March 21, 1974, abandoned.

[52] U.S. Cl. .......................... 260/2.5 R; 260/2.5 N; 260/2.5 BD; 260/2.5 D; 260/2.5 F; 260/2.5 H; 260/2.5 EP; 260/2.5 P
[51] Int. Cl.² .......................................... C08J 9/02
[58] Field of Search .......... 260/2.5 S, 2.5 D, 2.5 F, 260/2.5 N, 2.5 EP, 2.5 P, 2.5 R, 2.5 BD, 2.5 H

[56] References Cited

UNITED STATES PATENTS

| | | | |
|---|---|---|---|
| 2,576,073 | 11/1952 | Kropa et al. | 260/2.5 N |
| 3,260,688 | 7/1966 | Watanaba et al. | 260/2.5 N |
| 3,677,981 | 7/1972 | Wada et al. | 260/825 |

*Primary Examiner*—Murray Tillman
*Assistant Examiner*—T. DeBenedictis

[57] ABSTRACT

Shaped cellular structures formed from media which are polymerizable and/or cross-linkable by free radical initiation to either a thermoplastic or thermosetting solid, process for production of such structures and the composition therefor. Process comprises preparation of composition by mixing an acid sensitive azo compound with an acidulous or acidic polymerizable medium, after which the composition is permitted to foam into a cellular structure of the desired shape. Acid sensitive azo compounds are those mono- and poly- azo compounds containing the group

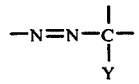

wherein Y is monovalent or divalent acid sensitive group which in the presence of an acidulous or acidic polymerizable medium causes sufficient decomposition of the azo compound that gas is released in the medium and during said decomposition said mono- or poly- azo compounds promote polymerization and/or crosslinking to provide a matrix that is sufficiently polymerized and/or crosslinked that the generated gases cause the matrix to expand, the remaining valences in the group being satisfied by organic radicals; provided that any carbon atom that is directly linked to an azo nitrogen (except that of a carbonyl group) has at least two of its remaining three valences satisfied by a carbon to carbon bond or a carbon to hydrogen bond.

10 Claims, No Drawings

POLYMERIC CELLULAR STRUCTURES

This is a division of application Ser. No. 548,946 filed Feb. 11, 1975, now U.S. Pat. No. 3,993,609, which is a continuation-in-part of U.S. Ser. No. 453,446, filed Mar. 21, 1974 (now abandoned).

THE PRIOR ART

This invention, while of a broad nature, is of particular interest in connection with the foaming of unsaturated polyesters. There are several references in the literature to methods proposed for foaming polyester resins, but to a large extent the proposed literature methods were carried out using complex mixtures of components in aqueous systems. Moreover, many of them relate to a sequential operation in which one first releases gas to the polymerizable/cross-linkable resin medium following which one attempts to effect polymerization/cross-linking without destroying the foam. The difficulties involved in such a technique are manifest. One must attempt to correlate the foaming operation and the further polymerization/cross-linking operation. Such operations have been found to be entirely impracticable. It has also been attempted in the prior art to produce foams by initiating polymerization/cross-linking while gas is being released to the resinous medium. This too has proved to be entirely impracticable. Where one attempts to perform such prior art operations in such a manner that the release of gas and the initiation of polymerization/cross-linking is substantially simultaneous, the polymerization/cross-linking reaction takes place so quickly that the resin medium becomes too highly viscous or even rigid at such an early stage that the resin cannot be foamed. In the case where the operation is performed sequentially, the foam is a transitory nature; i.e. the foam dissipates, to the extent that the gas is released to the atmosphere, before polymerization/cross-linking is effected.

While the well-known azo blowing agents, such as azodicarbonamide, decompose into gaseous products upon heating, they do not act concurrently as a polymerization initiator, and the incorporation of a separate initiator is required to support the foam. Addition of a separate gelling agent presents the problem of coordinating the polymerization of the resin with the release of the gas from the blowing agent. Furthermore, azodicarbonamide as a blowing agent requires too high a temperature for use with polyesters. In the case of normal azo initiators, such as azo nitriles, the curing of the polyester system develops so rapidly that the gas released does not have any opportunity to expand.

In the process of the present invention, the azo compounds react with the resin media in a fortuitously coordinated manner to both release gaseous products and initiate polymerization and/or cross-linking of the resin media. Thus, the azo compounds are activated by an acidulous or acidic polymerizable medium (as defined hereinafter) to gel the resulting resin while the gas is liberated. In view of the coordinated reactions, the resin medium expands while resin gelling occurs, forming a cell structure.

The present invention while not limited thereto, is especially useful in the preparation of foamed polyester resins, both rigid and flexible. Cellular structures formed from polyesters are relatively strong and inexpensive, generally resistant to heat and chemicals and exhibit good light stability and minimal moisture pickup. Cellular polyester structures are not commercially available due to the difficulty discussed above, i.e. coordination of gas generation and resin solidification. The present invention presents a simple and effective answer to that problem.

STATEMENT OF THE INVENTION

This invention relates to shaped cellular structures formed from mediums which are polymerizable and/or cross-linkable by free radical initiation to either a thermoplastic or thermosetting solid, to a process for production of such structures and to the composition useful to form the solid. The process comprises preparing the composition by mixing an acid sensitive azo compound with an acidulous or acidic polymerizable medium at a temperature below that at which during the mixing cycle, neither substantial thermal decomposition of the azo compound nor substantial cross-linking or further polymerization of the medium normally occurs; after mixing the composition is permitted to foam into a resinous cellular structure of the desired shape (as used herein, being "permitted to foam" denotes decomposition of a portion of the azo compound to effect liberation of gas and simultaneous use of another portion of the azo compound to effect cross-linking and/or further polymerization of the resulting resin).

DEFINITIONS

By "acid sensitive azo compounds" as broadly used in the instant invention is meant those mono- and poly-azo compounds containing the group

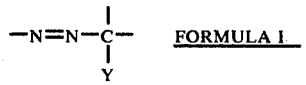 FORMULA I wherein Y is a monovalent or divalent acid sensitive group which in the presence of an acidulous or acidic polymerizable medium causes sufficient decomposition of the azo compound to release gas in the medium while said mono- or poly- azo compounds also promote polymerization and/or cross-linking of the medium to provide a matrix that is sufficiently polymerized and/or cross-linked that the generated gases cause the matrix to expand (this state of polymerization and/or cross-linking is commonly known, and is referred to hereinafter, as the "gelled" state), the remaining valences in FORMULA I being satisfied by organic radicals; provided that any carbon atom that is directly linked to an azo nitrogen (except that of a carbonyl group) has at least two of its remaining three valences satisfied by a carbon to carbon bond or a carbon to hydrogen bond.

Particular acid sensitive groups (Y) include halogens, groups having an oxygen or sulfur atom linked to the carbon atom shown in FORMULA I (such as hydroxyl, ester, ether, cyanate, thiocyanate, sulfonyl groups), and groups linked to the carbon atom shown in FORMULA I by a nitrogen atom (such as urea derivatives, hydrocarbyl-oxa(or thia)-amides (or thioamides), amines, isocyanates, and isothiocyanates).

By the term "polymerizable medium" is meant the fluid phase with which the acid sensitive azo compound is mixed. It is essential that one component in this medium be polymerizable or cross-linkable by free radical initiation, i.e. the component is a resin polymerizable or cross-linkable by free radical initiation ("reactive resin") or is a vinyl or vinylidene monomer. Thus the medium may be conveniently classified as any of the following Medium Systems Types A, B, C, D or E (exemplified in greater detail hereinafter):

Medium A: A reactive polymeric resin, or mixture of reactive resins, or a mixture of a reactive polymeric resin (or resins) with an unreactive resin or resins.

Medium B: Reactive resin(s) and/or unreactive resin(s) dissolved and/or dispersed in a polymerizable monomer or mixture of monomers.

Medium C: A reactive resin or mixture of resins at least one being reactive, dissolved or dispersed in an inert solvent or diluent.

Medium D: A monomer or mixture of monomers.

Medium E: Combinations of any or all of the above.

Many of the physical properties of the resultant foams will depend on the nature of the polymerizable medium in a manner well understood by those skilled in the art. Also, the number and spacing of cross-linkable functions in the resin will affect the degree of rigidity or flexibility of the cured foamed product as is well known to those skilled in the art. A wide variety of inert liquid diluents may be added to any of the above described polymerizable media to give appropriate viscosity, physical properties and/or cost.

By the term "acidulous" polymerization medium is meant that the polymerization medium without added extraneous acid, contains a detectable acid number. As will be discussed in greater detail hereinafter, some azo compounds are sufficiently acid sensitive that the resin media needs only to be acidulous to provide azo activation. Resins containing free-acid end groups, such as polyesters, will frequently suffice without the need to supply extraneous acid. For example, the alpha-hydroxyazo compounds hereof wherein Y is OH and $R^7$ is not H (of FORMULA II, hereinafter) are sensitive enough that the acidity of the polyester resin alone, with no extraneously added acid, is sufficient to activate their decomposition.

By the term "acidic" polymerization medium is meant a medium to which extraneous acid has been added to promote azo decomposition. When addition of extraneous acid becomes necessary because of the nature of the resin media or the azo compound, a wide range of acids may be employed. In general, for the more highly acid sensitive azo compounds relatively weak acids are suitable whereas for the less acid sensitive azo compounds strong acids are often necessary.

By the term "activator" as used herein is meant a compound which may be added to the polymerizable medium to effect activation of acid sensitive compounds so as to permit foaming of the polymerizable medium. Both organic and inorganic Bronsted-Lowry acids (substances which will dissociate a proton) and acylalkylsulfonyl peroxides have been found useful for this purpose. An activator can be used to form an "acid" polymerization medium or to increase the decomposition of the azo compound during foaming of any polymerizable medium. Among the acylalkyl sulfonyl peroxides, particularly effective are acylalkyl (cycloalkyl-)sulfonyl peroxides having the general structure:

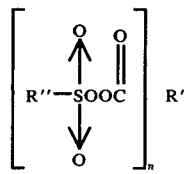

where $n = 1$ or 2, R' is lower alkyl of 1 to 6 carbons, or (where $n = 2$) lower alkylene of 1 to 6 carbons, R" is secondary and tertiary alkyl of 4 to 20 carbons and cycloalkyl (incuding bicycloalkyl) of 5 to 10 carbons which can be optionally substituted by inert substituents such as chlorine, cyano, lower acyloxy or lower alkoxycarbonyl.

PROCESSING CONDITION

The foregoing structural characterizations coupled with the concept of using any compound having such structure in an acidulous or acidic resin medium constitutes the critical aspects of the invention. So long as a mono-azo or poly-azo compound have the structure as set forth hereinabove, and so long as that they are combined with an acidulous or acidic resin medium, one may successfully effect foaming of said resin. A wide range of processing conditions, shaping techniques and after-treatments may be used. In general, and broadly stated in the process of the present invention, the azo compounds are activated to decompose and generate gaseous products at room temperature or below upon contact with the polymerizable medium to provide foamed polymeric structures. The mixture of resin media and azo compound is shaped while the azo compound reacts with the resin medium (a) to blow it by gas generation and (b) to initiate polymerization of at least one component of the medium to provide a partially polymerized or partially cross-linked matrix, i.e. a matrix having fluidity characteristics such that the gases generated cause the matrix to expand, thereby to define a stable foam. The gas bubbles, dispersed through the gelled matrix, produce either a "closed" or "open" cellular configuration depending upon the amount and rate of evolution of the gas and the fluidity and strength characteristics of the resin medium during the period of gas generation. After shaping, the cellular structure can be cured. Depending upon the nature of the polymerizable medium involved, such curing can involve cross-linking and/or further polymerization. The use of an added curing agent (i.e. in addition to the acid-sensitive azo foaming agent) is optional; in some formulations it will improve the physical properties of the foamed structures.

Thus in the process of the present invention, the physical environmental conditions of temperature and pressure, the manipulative techniques and equipment employed in mixing components and the shaping of the cellular structure during or after its production as well as after-treating by curing, and the like, may vary widely. Some such variables are discussed in greater detail below for illustrative purposes.

AMOUNT OF AZO TO USE

The amount of acid sensitive azo compound to be added to a particular resin medium will depend upon the effect desired, and chemical identity of each of the azo, the resin, and the extraneous acid or other activator (if used) and the temperature at which the components are mixed. Obviously, a lesser amount of a particular azo compound will produce, in an otherwise identical system under the same conditions, a higher density product than a relatively larger amount. Whether the cells will be closed or open will depend both on the amount of azo used, the strength characteristics of the resin during the expansion process, and the like. These are variables within the skill of technicians versed in the art of blowing plastics. Usually the use of sufficient azo to provide from 0.5 to 4 weight percent based on total reactant is sufficient to form closed cell structures. As little as 0.2 weight percentage will often produce observable foaming. As much as 15 weight percentage of azo has been found useful in some systems. Generally from about 0.2 to 8 weight percentage of azo may be used effectively.

MIXING TECHNIQUES

Any conventional mixing method can be used to distribute the azo compound throughout the resin medium, and any high speed paddle mixer is suitable. Mixing nozzles for combining the two liquids may also be employed. The order of addition of the reactants is not critical and may be varied for particular purposes. However, it is usually preferable that the resin medium contains whatever acid is necessary and whatever curing agent is desired prior to the incorporation of the azo compound. The azo compound can be mixed with monomer such as styrene and the latter mixture added to the acidulated resin to facilitate processing.

TEMPERATURE VARIATION

The temperature at which the azo compound is mixed with the resin medium is usually not important provided it is low enough to avoid rapid premature polymerization of the resin medium. Operative temperatures depend upon the nature of the azo compound and the resin. In general, the mixing should be performed at a temperature not exceeding that which would be normally used when the azo compound is employed for polymerization without an activator. Generally, the reaction will occur at room temperatures, and the speed of reaction at such temperatures will usually be suitable. The use of lower or higher temperatures may be preferred.

OPTIONAL ADDITIVES: MEDIUM

The density of the foamed product structure can be controlled by the amount and identity of azo compound employed, as pointed out previously. In addition, the amount of foaming and hence the density of the final cellular structure, can be augmented by the use of gases or liquids in the resin medium which have boiling points such that the liquids vaporize during either blowing or cure reactions. Liquids or gases of this class generally exhibit significant vapor pressure below the curing temperatures.

At times, it is advantageous to increase the flowability of the polymerizable medium by addition of an unreactive diluent or solvent. It has also been found useful to add surfactants to the resin medium to promote uniformity of cell size in the final product. Such additives are particularly valuable in systems employing a relatively high concentration of azo compound to initiate polymerization and blow the medium. Such surfactants may be of the cationic (quarternary salts), anionic (sulfonates and sulfates) and non-ionic (ethylene oxide condensates) type. Some suitable surfactants include such materials as: metallic soaps, alkylene oxide-phenol addition products, alkyl aryl sulfates and sulfonates, dimethyl siloxane polymers, and cationic siloxanes of the general formula shown in U.S. Pat. No. 3,642,670. Air will also serve as a nucleating agent. Only a small amount, well dispersed as small bubbles throughout the resin is needed (as distinguished from the case where one attempts to foam the resin by beating air into it). It is sufficient to mix the resin medium with the acid sensitive azo compound hereof (and other components hereof as desired) in the presence of air. In the experiments hereof carried out in paper cups and the like, this was accomplished simply by mixing with an electric stirrer. When one uses molding equipment involving pumped stream(s) and a mixing head, one simply bleeds some air to the mixing head.

Hollow ceramic, glass or graphite spheres can be added to the resin medium in order to decrease further the density of the final formed structure. These materials have densities less than that of the polymerized matrix and can be utilized to impart desired density or decorative properties to the foam.

MOLDING TECHNIQUES

Any means can be used to shape or mold the cellular structure that is produced during foaming of the resin. The mold system can be quiescent or dynamic, i.e., the initial reactants may be mixed in a mold in suitable proportions and permitted to react until the mold is filled or alternatively, the mixed reactants can be charged into a mold immediately after mixing, and before substantial gas generation or polymerization. In other systems the reactants can be mixed and extruded in various forms, such as sheets, rods, beads, sprays or droplets. Typical molds used in the furniture industry (room temperature vulcanizable silicone, polyurethane, and epoxy) are quite acceptable. The resultant foam piece accurately reproduces surface detail present on the mold. Sheets of the foamed product may also be formed simply by pouring the mixed reactants upon a flat surface or calendering the mixed reactants during or prior to reaction.

CURING THE SHAPED STRUCTURE

A curing agent, for example a non-acid sensitive azo compound or a peroxide used as a component of the polymerizable medium can substantially increase the strength of the foamed structure. The exotherm generated during the gelling step is often sufficient to activate the curing agent. However, where the curing agent has a half-life that is sufficiently long, activation of the curing agent may require application of external heat after blowing and gelling are complete. Curing agents for use in the polymerizable medium hereof are well known in the art and include (1) diacyl or diaroyl peroxides or peresters, sometimes in combination with tertiary amine promoters, or (2) ketone peroxide or peresters sometimes in combination with cobalt salt activating agents. A typical curing system employs benzoyl peroxide or t-butyl peroxybenzoate, and a promoter or activator therefore, such as N,N-dimethylanline or N, N-dimethyl-paratoluidine, although in most cases such a promoter or activator is not necessary.

UTILITY OF THE PRODUCT

Densities of about 25 lb. per cubic foot in the final cellular structure generally render the structures useful as synthetic wood in applications such as picture frames or plaques while densities of about 35 lb. per cubic foot and appropriate for molded components for structural purposes, such as furniture parts for which wood is normally used. Insulation, flotation articles, packaging and energy absorption materials, may have densities of about 2 lb. per cubic foot. Closed cell structures would be utilized where water resistance is desired while open cell configurations would be adopted for use as sponges, for example.

SUITABLE AZO COMPOUNDS

As indicated hereinbefore, the identity of the mono and poly azo compounds useful in this invention are accurately described in FORMULA I. Various suitable definitions for Y in Formula I follow:

When Y is monovalent, it may be halogen, such as Cl or Br; the formula of Y as an ester may be

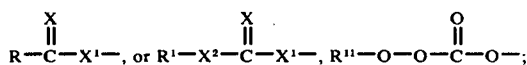

as an ether is $R^1—X—$; as a cyanate and thiocyanate are NCX—; as a sulfonyl group is

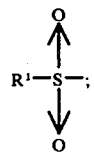

as a urea derivative may be

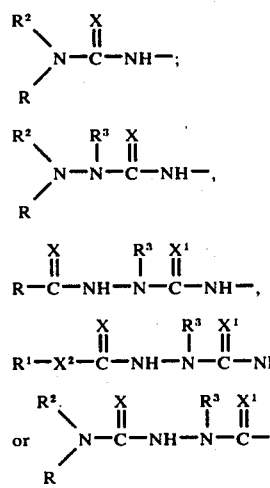

as hydrocarbyl-oxa(or thia)-amide (or thio-amide) is

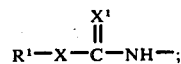

as an amine is

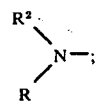

and as isocyanate and isothiocyanate are XCN—.

When Y is a divalent radical, examples thereof include those wherein Y as an ester may be

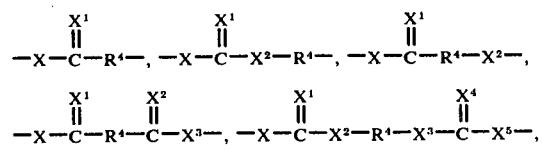

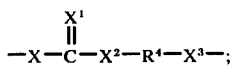

as an ether may be $—X—$, $—X—R^4—$, $—R^4—X^1—$; as a urea derivative may be

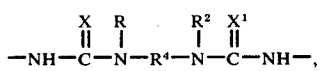

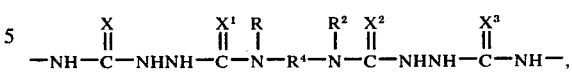

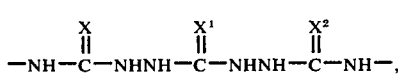

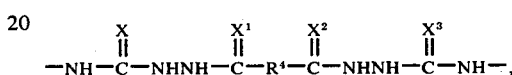

as a hydrocarbyl-oxa thia)-amide (or thio-amide) may be

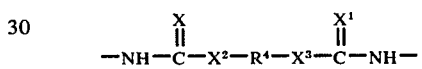

and as a amine may be

In the foregoing, each of R, $R^2$ and $R^3$ in the monovalent and divalent radicals (Y)— is the same or different substituent including H, a substituted or non-substituted hydrocarbon radical containing 1 to 18 carbon atoms, such as alkyl of 1 to 13 carbons; cycloalkyl of 3 to 12 carbons; aralkyl of 7 to 15 carbons; arcycloalkyl of 9 to 16 carbons; aryl of 6 to 14 carbons; alkaryl of 7 to 12 carbons; cycloalkaryl of 9 to 12 carbons; alkenyl of 2 to 17 carbons; cycloalkenyl of 5 to 12 carbons; 5 and 6 membered heterocyclic and benzheterocyclic wherein the hetero atoms are selected from oxygen, sulfur and nitrogen and R and $R^2$ together may form an alkylene diradical of 2 to 11 carbons. Any substituent borne by R, $R^2$ or $R^3$ is selected from lower alkoxy, aryloxy, hydroxy, alkoxycarbonyl, alkanoyloxy and aroyloxy, halogen, alkanoyl, aroyl, cyano, and carbamoyl. When Y is other than OH, R, $R^2$ and /or $R^3$ may also be substituted by carboxyl; the carbon atom content of the substituents borne by R, $R^2$ and $R^3$ may vary between 1 and 18; $R^1$ is substituted or nonsubstituted hydrocarbon radical containing 1 to 18 carbon atoms such as alkyl of 1 to 12 carbons; cycloalkyl of 3 to 12 carbons; aralkyl of 7 to 15 carbons; arcycloalkyl of 9 to 16 carbons; aryl of 6 to 14 carbons, alkaryl of 7 to 12 carbons; and cycloalkaryl of 9 to 12 carbons; the substituents borne by $R^1$ is a group containing 1 to 18 carbon atoms selected from t-alkylperoxy-, t-aralkylperoxy, -cycloalkylperoxy, t-alkylperoxycarbonyl, t-alkylperoxycarbonyloxy, alkanoylperoxy, alkanoylperoxy-carbonyl, 6ß-hydroxyalkylperoxy-α-hydroxyalkyl, α-hydroperoxyalkylperoxy-α-hydroxyalkyl, alkanoylperoxycarbonyloxy, di-(t-alkylperoxy)-methylene, alkenyl, cycloalkenyl, alkynyl, cycloalkynyl, alkoxy, cycloalkoxy, aryloxy, alkaryloxy, cycloalkaryloxy, aroyloxy, alkaroyloxy, carbamoyloxy, alkanoyloxy, alkoxycarbonyloxy, cycloalkoxycarbonyloxy, alkaryloxycarbonyloxy, aryloxycarbonyloxy, alkoxycarbonyl, cycloalkoxycarbonyl, aryloxycarbonyl, alkaryl oxycarbonyl, alkoxycarbonylamino, cycloalkoxycarbonylamino, aryloxycarbonylamino, alkaryloxycarbonylamino, alkanoyl, aroyl, alkaroyl, carbamoyl, acylamino, aroylamino, alkylamino, arylamino, thiolakanoyl, dithioalkanoyl, thioaryoyl, dithioaroyl, alkylthio, arythio and 5 and 6 membered heterocyclic and benzheterocyclic wherein the hetero atoms are selected from oxygen, sulfur, and nitrogen; as well as amino, hydroxy, halogen, and cyano; $R^4$ is a substituted and unsubstituted divalent hydrocarbon radical of 1 to 20 carbon atoms, such as alkylene of 1–20 carbons (preferably 1–10), cycloalkylene of 3–12 carbons (preferably 5–9), arylene (normally hydrocarbon arylene) of 6–14 carbons (preferably phenylene), aralkylene of 7–20 carbons (preferably phenalkylene of 7 –12 carbons), or cycloalkylalkylene (i.e., a diradical of cycloalkylalkane or alkylcycloalkylalkyl) of 4–20 carbons (preferably 4–12); such divalent radicals optionally containing one or two non-terminal and non-adjacent hetero atoms selected from oxygen, nitrogen, and sulfur in the chain, the substituents borne by $R^4$ being any of those defined herein for $R^1$; $R^{11}$ is tertiary alkyl containing 4 to 18 carbon atoms (preferably 4 to 8) or tertiary aralkyl containing 9 to 18 carbon atoms (preferably 9 to 12). Each $X, X^1, X^2, X^3, X^4$ and $X^5$ is the same or different oxygen or sulfur.

The identity of the other substituents that satisfy the other valances for FORMULA I are quite immaterial so long as these azo compounds have the essential structure recited in FORMULA I. The particular embodiments that follow hereinbelow only serve to confirm this breadth of the invention.

In particular embodiments, the mono- and poly- azo compounds useful in accordance with this invention can be illustrated by FORMULA II.

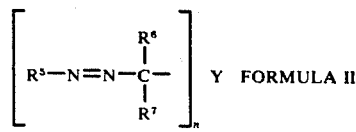   Y   FORMULA II wherein
n is 1 or 2;
$R^5$ is

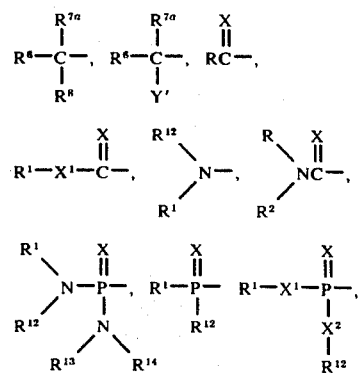

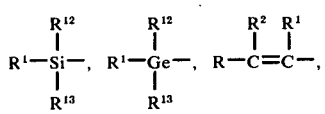

or one of the substituted or nonsubstituted hydrocarbon radicals defined herein for $R^1$, provided that any substituent borne by $R^5$ is not linked to the $R^5$ carbon atom directly attached to an azo nitrogen of FORMULA II; $R^{12}$, $R^{13}$, and $R^{14}$ are same or different radicals as defined for $R^1$;

$R^6$ is

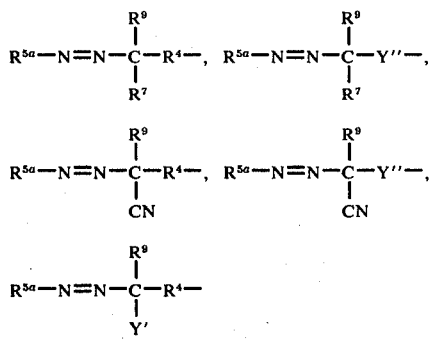

or one of the substituted or nonsubstituted hydrocarbon radicals defined herein for $R^1$;
$R^7$ is a substituted or nonsubstituted hydrocarbon radical containing 1 to 18 carbon atoms, such as alkyl of 1 to 12 carbons, cycloalkyl of 3 to 12 carbons, aralkyl of 7 to 15 carbons, and arcycloalkyl of 9 to 16 carbons wherein the substituent borne by $R^7$ is selected from the substituents defined herein for $R^1$;
$R^7$ can be hydrogen when Y is —OH or R—C(=O)O;
$R^6$ and $R^7$ may together form a ring (containing 4–12 carbons) with the carbon linked to the azo nitrogen;
$R^{7a}$ is the same as $R^7$ except it is not hydrogen;
$R^8$ is

$R^9$ is the same as $R^6$ except it is not any of the azo radicals defined therefor;
$R^{10}$ is lower alkyl (1 to 6 carbon atoms) or cycloalkyl (5 to 6 carbon atoms);
Y is defined hereinbefore plus

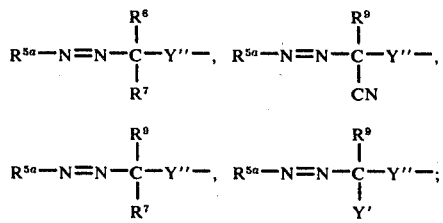

Y" and $R^7$ taken together with the carbon linked to the azo nitrogen form a ring containing 4 to 12 atoms;

Y' is a monovalent group that is the same as Y except Y' i not

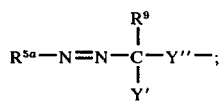

Y'' is the same as Y which is divalent;
R$^{5a}$ is the same as R$^5$ except there where R$^5$ is

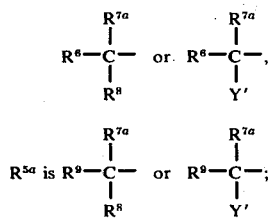

All other substituents in FORMULA II are defined as in FORMULA I. Examples of R, R$^2$ and R$^3$ radicals; hydrogen, methyl, ethyl, propyl, butyl, i-butyl, sec-butyl, tert-butyl, octyl, decyl, dodecyl, tridecyl, cyclopropyl, cyclobutyl, cyclopentyl, cyclohexyl, cyclooctyl, cyclododecyl, bicyclo [2.2.1] heptyl, adamantyl, perhydronaphthyl, benzyl, α-amyl, p-isopropyl-α-cumyl, phenylcyclopropyl, naphthylcyclohexyl, phenyl, naphthyl, phenanthryl, methylphenyl, triethylphenyl, cyclopropylphenyl, cyclohexylphenyl, ethenyl, allyl, 9-decenyl, 1-propenyl, 8-heptadecenyl, cyclohexenyl, cyclopenetenyl, cyclododecenyl, 2-phenylethenyl, 2-ethoxycarbonylethenyl, p-benzoylphenyl, 2-pyridyl, 4-pyridyl, 2-pyrazinyl, 2-thienyl, 10-xanthenyl, 2-benzimidazolyl, 2-benzothiazolyl, 1-methyl-2-imidazolyl, furyl, and chloromethyl.

Examples of R$^4$ diradicals: ethylene, tetramthylene, dodecamethylene, ethyleneoxycarbonylethyl, trimethylencoxyacebonylethyl, trimethylene ethyleneoxyethyl, tetramethyleneaminocarbonylbutyl, tetramethylenethiobutyl, hexamethylenethioxycarbonylneopentyl, p-phenylene, 4,4'-biphenylene, octamethylene-p-phenyl, p-phenyleneoxycarbonylneopentyl, phenanthrylene, naphthylene, propenyleneaminocarbonyloxypentyl, cyclohexylene, cyclopentylene, cyclohexyleneoxycarbonyloxyisoheptyl, chlorophenylene, cyanonaphthylene, 3-phenylpentamethylene, phenylethylenecarbonyloxy propyl, cyclohexeneylene, methylenecarbonyloxypropyl, acenaphthenylene, 2-butenylene, and pinanylene.

Examples of R$^1$, R$^5$, R$^6$ and R$^9$ radicals: methyl, ethyl, propyl, i-propyl, butyl, i-butyl, sec-butyl, tert-butyl, tert-amyl, t-hexyl, t-octyl, n-dodecyl, cyclopentadecyl, cyclopropyl, cyclobutyl, cyclopentyl, 1-methylcyclopentyl, cyclohexyl, 1-methylcyclohexyl, cyclooctyl, cyclododecyl, perhydronaphthyl adamantyl, bicyclo [2.2.1]heptyl, 9,10-ethano-9,10-dihydro-9-anthracyl, benzyl, α-cumyl p-phenyl-α-cumyl 2-phenylcyclopropyl, 4-naphthylcyclohexyl, naphthylneopentyl, phenyl, naphthyl, phenanthryl, toluyl, xylyl, 4-ethyl-1-naphthyl, m-cyclopropylphenyl, p-cyclohexylphenyl, and triethylphenyl.

Additional R$^5$ radicals include propionyl, naphthoyl, isopropoxycarbonyl, triethylsilyl, tripropylgermanyl, carbamoyl, N-methylcarbamoyl, diethylamino, penten-2-yl, cyclopenten-1-yl, diethylphosphono, dibutylphosphinyl, bis-(diethylamino0-phosphinyl, dibutylphosphinothioyl.

Examples of R$^7$ radicals: same as for R$^5$ radicals except the aromatic radicals and "Additional R$^5$ radicals" are excluded, i.e., "phenyl, naphthyl, . . . and triethylphenyl", and "propionyl, . . . dibutylphosphinothioyl." inclusive.

Examples of R$^{10}$ radicals: methyl, ethyl, propyl, i-propyl, butyl, i-butyl, sec-butyl, tert-butyl, pentyl, hexyl, cyclopenetyl, and cyclohexyl.

Examples of R$^{11}$ radicals: t-butyl, t-amyl, t-octyl, α-cumyl p-isopropylcumyl, 1,1-dimethyl-hexadecyl, p-(α-cumyl)cumyl.

Examples of Substituents borne by R$^1$, R$^4$ through R$^7$inclusive, R$^9$ and R$^{11}$: ethenyl, allyl, hexenyl, cyclopentenyl, methylcyclohexenyl, ethynyl, propynyl, hexynyl, cyclooctynyl, methoxy, ethoxy, propoxy, hexoxy, isopentoxy, methylcyclopentoxy, cyclohexoxy, phenoxy, naphthoxy, chlorophenoxy, dimethylphenoxy, ethylphenoxy, cyclohexylphenoxy, acetoxy, propionoxy, isohexanoyloxy, cyclohexanecarbonyloxy, benzoyloxy, naphthoyloxy, chlorobenzoyloxy, methylbenzoyloxy, methylnaphthoyloxy, carbamoyloxy, dimethylcarbamoyloxy, phenylcarbamoyloxy, methoxycarbonyloxy, propoxycarbonyloxy, cyclohexoxycarbonyloxy, methylphenoxycarbonyloxy, phenoxycarbonyloxy, chlorophenoxycarbonyloxy, naphthoxy-carbonyloxy, methoxycarbonyl, ethoxycarbonyl, butoxycarbonyl, cyclohexoxycarbonyl, phenoxycarbonyl, naphthoxycarbonyl, chlorophenoxycarbonyl, methylphenoxycarbonyl, methylbiphenyloxycarbonyl, methoxycarbonylamino, ethoxycarbonylamino, isopropoxycarbonylamino, cyclohexoxycarbonylamino, phenoxycarbonylamino, naphthoxycarbonylamino, chlorophenoxycarbonylamino, methylphenoxycarbonylamino, methylnaphthoxycarbonylamino, acetyl, propionyl, valeroyl, cyclohexanecarbonyl, benzoyl, naphthoyl, tertiarybutylperoxy, tertiarybutylperoxycarbonyl, tertiarybutylperoxycarbonyloxy, benzoylperoxy, decanoylperoxycarbonyl, chlorobenzoyl, methylbenzoyl, methylnaphthoyl, carbamoyl, diethylcarbamoyl, methylcarbamoyl, phenylcarbamoyl, carboxy, chlorine, bromine, iodine, fluorine, hydroxy, cyanide, 2-furyl, amino, thiophenoxy, indolinyl, pyridyl, pyrazinyl, thienyl, furyl, xanthenyl, benzimidazolyl, benzothiazolyl, 1-methylimidazolyl, acetamino, benzoylamino, butylamino, phenylamino, diethylamino, cyclohexanecarbonylamino, thiobutyryl, dithiodecanoyl, thiobenzoyl and dithionaphthoyl.

Examples of Substituents borne by R, R$^2$ and R$^3$: methoxy, ethoxy, propoxy, isopropoxy, butoxy, sec-butoxy, t-butoxy, phenoxy, parachlorpheoxy, ortho- meta- and paramethylphenoxy, hydroxy, methoxycarbonyl, ethoxycarbonyl, propoxycarbonyl, isopropoxycarbonyl, butoxycarbonyl, t-butoxycarbonyl, acetyloxy, propionyloxy, butyryloxy, valeroyloxy, hexanoyloxy, benzoyloxy, parachlorobenzoyloxy, 2,4-dichlorobenzoyloxy, naphthoyloxy, chloro, bromo, iodo, fluoro, acetyl, propionyl, butyryl, valeroyl, hexanoyl, 2-ethylhexanoyl, benzoyl, naphthoyl, cyano, N-methylamido N,N-dimethylamido and N,N-diethylamido.

Examples of R$^6$ and R$^7$ linked together: trimethylene, pentamethylene, heptamethylene, decamethylene, tetramethylene, 1,1,3,3-tetramethylpropylene, undecamethylene, and 1,2, or 3-methylpentamethylene.

Examples of R and R$^2$ linked together: same as for Examples R$^6$ and R$^7$ linked together, plus ethylene.

Examples of Y radicals: chlorine, bromine, acetoxy, propionoxy, formyloxy, methacryloxy, butyryloxy, undecelynoyloxy, lauroyloxy, decanoyloxy, cyclopropylcarbonyloxy, cyclohexanecarbonyloxy, cyclododecanecarbonyloxy, cyclohexenecarbonyloxy, propargyloxy, phenylacetoxy, phenoxyacetoxy, pivaloyloxy, 2-ethylhexanoyloxy, pelargonoyloxy, 3-ethoxycarbonylpropionoxy, 4-ethoxycarbonylbutyryloxy, 5-methoxycarbonylvaleryloxy, 9-ethoxycarbonylpelargonoyloxy, hydroxypivaloyloxy, cyanoacetoxy, 3-methoxypropionoxy, 6-acetoxyhexanoyloxy, 6-benzyloxycarbonylaminohexanoyloxy, benzoyloxy, naphthoyloxy, phenanthrenecarbonyloxy, toluoyloxy, methoxy, ethoxy, isopropoxy, dodecyloxy, cyclohexyloxy, cyclopropyloxy, cyclododecyloxy, benzyloxy, α-cumyloxy, phenoxy, naphthyloxy, phenanthryloxy, m-methylphenoxy, p-methylphenoxy, methylamino, butylamino, dodecylamino, N-methylanilino, phenylamino, diethylamino, methylaminothiocarbonylamino, butylaminothiocarbonylamino, dodecylaminothiocarbonylamino, butylaminocarbonylamino, ethoxycarbonylamino, isocyanato, isothiocyanato, cyanato, thiocyanato, ethoxythiocarbonylamino, perchloroacryloxy, perfluoro-9-methyldecanoyloxy, 4-acetylbutyryloxy, adamantylacetoxy, 3-aminobutyryloxy, p-aminothiophenoxyacetoxy, m-bromocinnamoyloxy, cyanoacetoxy, 4-chlorobutyryloxy, propionyloxy, cyclohexylacetoxy, 3,4-dimetoxycinnamoyloxy, diphenylacetoxy, 3-ethoxycarbonylacryloxy, 4-hydroxybutyryloxy, 3-indolinylacryloxy, iodacetoxy, tridecanoyloxy, 2-naphthylacetoxy, 3-phenoxypropionoxy, 2-pyridylacetoxy, pyruvoyloxy, 9-anthracenecarbonyloxy, 4-benzoylbenzoyloxy, 2-hydroxy-benzoyloxy, 1-methylcyclohexanecarbonyloxy, isonicotinoyloxy, 2-pyrazinecarbonyloxy, 2-thiophenecarbonyloxy, 10-xanthenecarbonyloxy, 3-acetamidophenoxy, 2-allylphenoxy, 1-amino-2-naphthoxy, 4-cyanophenoxy, 4-acetamidothiophenoxy, allylthio, butoxycarbonylmethylthio, cyclohexylthio, 2-furylmethylthio, 2-thiobenzimidazole, 2-thiobenzothiazole, 2-thio-1-methylimidazole, 2-pyridylthio, isopropylthio, t-butylthio, octylthio, dodecylthio, 2-hydroxyethylthio, thiophenoxy, p-t-butylphenylthio, hydroxy, thioacetoxy, dithioacetoxy, and thiobenzoyloxy, sulfur, oxygen, ethylenedioxy, trimethylenedioxy, hexamethylenedithioxy, hexamethylenediamino, decanedithiol, phenylenedioxy, naphthylenedioxy, phenanthrylenedithioxy, oxyhexamethylenethioxy, oxyphenylenethioxy, aminophenyleneoxy, and aminohexamethylenethioxy.

METHODS OF PREPARATION OF THE AZO FOAMING AGENTS

A. Symmetrical Azos

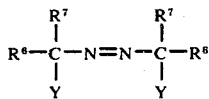

1. The α,α'-dihalo-azohydrocarbon compound (Y = Cl or BR) can be prepared by condensation of the ketone with hydrazine and the addition of halogen to the resulting ketazine - Goldschmidt and Acksteiner, Ann. 618, 173 (1958); Chem. Ber. 91, 502 (1958) the disclosure of which is incorporated herein by reference.

2. Azo compound having ester groups attached to both alpha carbons [Y is —X C(=X)R] can be prepared by one of several methods.

a. Those derived from low molecular weight aliphatic acids can be prepared (Example 2 hereof) by reacting α,α'-dihalo-azo-hydrocarbon compounds with metal salts of the appropriate acids in the presence of that acid according to the method described by Benzing U.S. Pat. No. 3,282,912, the disclosure of which is incorporated herein by reference.

b. Those prepared from higher molecular weight acids and aromatic acids can be prepared by reacting the α,α'-dihalo-azohydrocarbon compounds with salts of the acids in an inert solvent.

c. Those derived from aliphatic liquid acids can be prepared by halogenating the ketazine in the acid in the presence of a salt of that acid. This method is also described by Benzing in U.S. Pat. No. 3,282,912.

3. Symmetrical azo compounds having ether groups (Y is —XR) attached to both alpha carbon atoms can be prepared by reacting α,α'-dihalo-azohydrocarbon compounds with a metal salt (MY). This reaction is fundamentally the same as that used to prepare the azo compounds having ester groups attached to both alpha carbon atoms. For example, α,α'-diphenoxyazoalkanes were prepared by reacting the appropriate α,α'-dichloroazo-alkanes with sodium phenoxide in methanol. In another embodiment of this same reaction, the α,α'-dialklthio and α,α'-diarylthioazoalkanes were prepared by forming the sodium or potassium salts of the mercaptans in methanol and then adding a pentane solution of the α,α'-dichloroazoalkane to the methanol solution of the mercaptan salt at room temperature. The reaction mixture was stirred ½ hour to 1 hour, poured into water and the product extracted with methylene chloride, washed with 5% NaOH, 10% NaHCO₃ solution, dried and the methylene chloride evaporated under reduced pressure.

4. Symmetrical azo compounds having cyanate and thiocyanate groups (Y is NCX—) and isocyanate and isothiocyanate groups (Y is XCN—) attached to the alpha carbon atoms can be prepared by this same procedure. For example, the α,α'-dithiocyanato and α,α'-diisothiocyanatoazoalkanes were prepared by reacting the α,α'-dichlorozoalkanes with sodium thiocyanate in 75% aqueous isopropanol; the reaction mixture was diluted with water, extracted with methylene chloride and the methylene chloride evaporated under reduced pressure; the residue, a mixture of liquid and solids, was recrystallized from pentane. The α,α'-dithiocyanatoazoalkanes are solids and are relatively insoluble in pentane (IR-sharp weak band at 2400 cm⁻¹). The α,α'-diisothiocyanatoazoalkanes are liquids and relatively soluble in pentane (IR-strong broad band at 2000-2200 cm⁻¹). The percentage of the two isomers varies with the starting α,α'-dichloroazoalkane and the reaction conditions. In yet another embodiment of this same method, the α,α'-diisocyanatoazoalkanes were prepared by reacting the α,α'-dichloroazoalkanes with potassium cyanate in 70% aqueous isopropanol or aqueous acetone. The reaction mixture was diluted with water and extracted with pentane. The pentane solution was dried and the pentane evaporated under reduced pressure.

5. The α,α'-diisothiocyanatoazohydrocarbon compounds and the α,α'-diisocyanatoazohydrocarbon compounds can be reacted with active hydrogen compounds. For example, α,α'-diisothiocyanatoazoalkanes and α,α'-diisocyanatoazoalkanes were reacted with ammonia, primary and secondary amines to convert them to thioureas and ureas respectively. In another embodiment of this method α,α'-diisothiocyanatoazoalkanes and α,α'-diisocyanatoazoalkanes were reacted with hydrazines to convert them to thiosemicarbazide and semicarbazide derivatives respectively. Similarly, reaction of α,α'-diisothiocyanato- and diisocyanatoazohydrocarbon compounds with alcohols, phenols or thiol will convert them to thiocarbamates and carbamates.

B. Unsymmetrical Azos

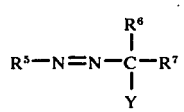

can be prepared from aryl, and primary-, secondary- and tertiary- (alkyl, cycloalkyl, bicycloalkyl and aralkyl) hydrazones which in turn can be prepared from the corresponding hydrazines.

1. Preparation of alkyl and aryl hydrazines a. There are numerous methods described in the literature for preparing primary-alkylhydrazines. For example, one method used herein for preparing n-octylhydrazine and n-dodecylhydrazine was that described by J. L. Rutter, "A Study of Some Reactions of the Monoalkylhydrazines", University Microfilms 68-325 (1967). An excess of hydrazine was reacted with the corresponding alkyl bromide and the primary-alkylhydrazine was covered by distillation.

In another method benzhydrazide was reacted with an aldehyde to form the desired benzoylhydrazone. The benzoylhydrazone was then hydrogenated over platinum oxide in ethanol to form the 1-benzoyl-2-primary-alkylhydrazine. The benzoyl group was removed by hydrolysis with concentrated hydrochloric acid. The method is essentially a combination of the methods described by H. H. Fox and J. T. Gibas, J. Org. Chem. 18, 994 (1953) and H. Ramspergen, J. Am. Chem. Soc. 51, 918 (1929). Methyl-, benzyl-, and 2-hydroxyethyl-hydrazines are commercially available.

b. There are numerous methods described in the literature for preparing secondary-alkyl-hydrazines. A method used herein is that used by Hawkins, J. Chem. Soc. C (1971) p. 1474, for the preparation of cyclohexanone cyclohexylhydrazone by hydrogenation of cyclohexanone ketazine hydrochloride in ethanol. For purposes of this invention, it was found that this method is applicable to most ketazines and the hydrazones can easily be hydrolyzed to the secondary-alkylhydrazine hydrochlorides by addition of water to the hydrogenation reaction mixture.

c. t-Butylhydrazine and t-amylhydrazine were prepared according to the method of Sheppard and Korczykowski (Canadian Patent No. 827,703). α-t-Cumyl-hydrazine was prepared by the method of C. G Overberger and A. V. DiGiulio, J.A.C.S. 80, 6562 (1958).

d. Arylhydrazines can be prepared by the sodium sulfite reduction of the corresponding diazonium chloride. Many of the arylhydrazines are commercially available.

2. Formation of Alkyl and Aryl Hydrazones a. The ketone and aldehyde alkylhydrazones were generally prepared by refluxing an aqueous solution of the alkylhydrazine with an equivalent (or slightly less) amount of an aliphatic ketone according to the method of MacLeay and Caruso (British Patent No. 1,291,317) for the preparation of t-alkylhydrazones. In the case of the less reactive aldehydes or ketones, the reaction of the alkylhydrazine and the appropriate aldeyde or ketone can be carried out in solution in benzene while the water formed by the reaction is removed by azeotropic distillation.

b. The arylhydrazones were prepared by reacting a benzene solution of the arylhydrazine and an appropriate aldehyde or ketone while the water formed by the reaction is removed by azeotropic distillation.

3. Halogenation of sec. - and t-Alkyl and Aryl Hydrazones of Ketones a. The unsymmetrical sec. - and t-(alkyl, cycloalkyl, bicycloalkyl and aralkyl-)α-haloazoalkanes can be prepared by passing ½ mol of a halogen (Cl or Br — preferably Cl) into a hydrocarbon solution of 1 mol of the appropriate hydrazone of a ketone, filtering off the insoluble hydrazone hydrohalide that forms and evaporating the solvent under reduced pressure (MacLeay & Sheppard Application U.S. Ser. No. 148,885 filed June 1, 1971, the contents of which are incorporated herein by reference). The unsymmetrical sec.- and t-alkyl-α-haloazolalkanes can also be prepared by passing 1 mol of a halogen (Cl or Br — preferably Cl) into a hydrocarbon solution of 1 mol of the corresponding alkylhydrazone and 1 mol triethylamine, filtering off the insoluble triethylamine hydrohalide that forms and evaporating the solvent under reduced pressure (U.S. patent application Ser. No. 79,713, MacLeay & Lange, filed Oct. 9, 1970).

b. Arylhdrazones can be halogenated (preferably Cl) in methylene chloride according to the method of M. W. Moon, J. Org. Chem. 37, 383 (1972) except that triethylamine was added as an acid acceptor. The resultant products were mixtures of the aryl-α-haloazolkanes and various halogenated aryl-α-haloazolalkanes. Since the halogen substituents in the aromatic ring have no effect on the foaming mechanism, no attempt was made to separate the mixture into the individual compounds.

4. Reactions of Unsymmetrical α-Halo-azohydrocarbon Compounds with Nucleophiles

Unsymmetrical α-halo-azohydrocarbon compounds react with nucleophiles by way of many of the same reactions as those described above for α,α'-dihalo-azohydrocarbon compounds. For example:

a. Azo hydrocarbon compounds having an ester group on an alpha carbon atoms [Y is —X'C(=X)R] can be prepared (i) from the corresponding alpha-halo-azohydrocarbon compounds by reaction with a metal salt (MY) of the acid from which the ester is derived in the presence of that acid or an inert solvent; (ii) those derived from liquid acids can also be prepared by passing a halogen into a mixture of the appropriate hydraozone and the salts of the acid in the presence of the acid (i.e. combining the techniques of Examples 4 & 5 hereof); (iii) those wherein Y is —SC(=O)R were prepared by reacting the appropriate alpha halo-azhydrocarbon compound with a solution of the thioacid and an equivalent amount of an alkali metal hydroxide in an alcohol, such as methanol (U.S. patent application Ser. No. 88,250 filed by MacLeay and Sheppard, Nov. 9, 1970, the compounds and methods of which are incorporated herein by reference).

b. Unsymmetrical azo-hydrocarbon compounds wherein Y is —X$^1$C(=X)X$^2$R can be prepared by reacting: (i) salts of α-hydroxy or mercapto azos with mono- or poly- haloformates (illustrated in Examples XXV and XXVI of application Ser. No. 428,493 filed by R. E. MacLeay and C. S. Sheppard on Dec. 26, 1973, the compounds and methods of which are incorporated herein by reference) or (ii) metal salt of the acid [MX$^1$—C(=X)—X$^2$—R] with an alpha halo-azohydrocarbon compound in an inert solvent, such as N, N-dimethylformamide.

c. Azo-hydrocarbon compounds having an ether group on one alpha carbon (Y is —XR) can be prepared by: (i) reacting the appropriate α-halo-azo hydrocarbon compound with a solution of a metal salt of the appropriate ROH or RSH; for the lower molecular weight alcohols, such as methanol and ethanol, a solution of potassium or sodium hydroxide in methanol or ethanol is sufficient; for the higher molecular weight alcohols, the sodium salt can be prepared from the alcohol with sodium hydride in dimethylformamide and then the α-haloazo added (U.S. application Ser. No. 148,885, supra); (ii) reacting the α-haloazohydrocarbon compounds with a solution of the appropriate phenol and an equivalent amount of sodium or potassium hydroxide in methanol; the phenol being more acidic than methanol, the α-halo-azo compound preferentially reacts with the former (Canadian Pat. No. 924,299); (iii) by reacting the α-haloazohydrocarbon compounds with a solution of a thiol and an equivalent amount of sodium or potassium hydroxide in methanol, the thiol being more acidic than the alcohol, the α-halo-azo compound preferentially reacts with the former (U.S. Pat. application Ser. No. 88,250, supra).

d. The α-bezenesulfonylazohydrocarbon compounds can be prepared by reacting a metal salt of benzenesulfinic acid with an α-halo-azohydrocarbon in 70% aqueous methanol.

e. The α-aminoazohydrocarbon compound (Y is —NRR$^2$) can be prepared (Example 5), by reacting an α-halo-azohydrocarbon compound with a hydrocarbon solution of two equivalents of a primary or secondary amine, filtering off the amine hydrohalide that forms and evaporating the solvent under reduced pressure (U.S. application Ser. No. 148,885, supra). The less reactive amines can be converted to their sodium salts with sodium hydride and then reacted with the α-haloazohydrocarbon.

f. The α-cyano and α-thiocyanato-azohydrocarbon compounds can be prepared by reacting an α-halo-azohydrocarbon compound with a metal cyanate or thio-cyanate (U.S. application Ser. No. 148,885, supra). Prolonged stirring of the reaction mixture in aqueous alcohol promotes isomerization of the α-cyanato or α-thiocyanato-azohydrocarbon compound to the corresponding α-isocyanato or α-isothiocyanato-azohydrocarbon carbon compound (Lange and MacLoay U.S. application Ser. No. 453,452 filed Mar. 21, 1974, the contents of which are incorporated herein by reference).

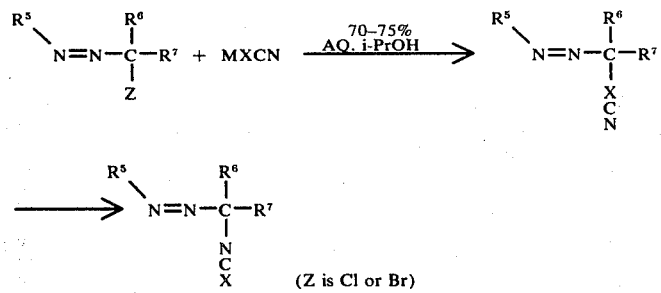

g. Reaction of the α-isocyanato and α-isothiocyanato-azohydrocarbon compounds with ammonia, primary or secondary amines, hydrazines and hydrazine derivatives convert the isocyanato and isothiocyanato group to urea, semicarbazide, thiourea and thiosemicarbazide groups respectively. The isocyanato and isothiocyanato groups also react with other active hydrogen compounds such as alcohols, phenols, thiols, acids, etc. (See Lange and MacLeay application Ser. No. 453,452, supra).

h. Bis-(axohydrocarbon) compounds can be prepared by reacting the α-halo-azohydrocarbons with sodium sulfide in aqueous alcohol, with the sodium salts of dicarboxylic acids in dimethylformamide, with the sodium salts of dithiols, with sodium salts of diols, with the sodium salt of a hydroxy-containing azo, with diamines, with salts of dithiocarboxylates, hydrazine and symmetrically substituted dialkylhydrazines.

I. Such Bis-azos can also be prepared by reacting α-isothiocyanato and α-isocyanato-azohydrocarbon compounds with hydrazine, diamines, diols and dithiols, etc. (Lange and MacLeay application Ser. No. 453,452, supra).

5. Preparation of Unsymmetrical α-Hydroxyazohydrocarbon Compounds a. One process involves reacting an aryl or a tertiary- or secondary(alkyl, cycloalkyl, bicycloalkyl, or aralkyl)-α-halo-azohydrocarbon with an alkali metal or alkaline earth hydroxide in an inert cosolvent (U.S. application Ser. No. 148,885, supra).

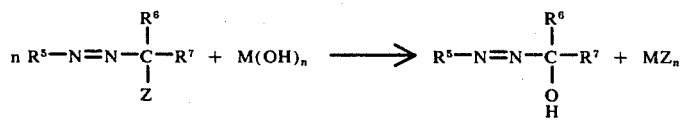

wherein R$^7$ is not hydrogen.

b. A second process involves oxidizing a tertiary- or secondary-(alkyl, cycloalkyl, bicycloalkyl, or aralkyl) -ketone hydrazone with aqueous hypohalite (ClO or BrO) to the corresponding α-hydroxy-azo (MacLeay U.S. application Ser. No. 453,450 filed Mar. 21, 1974, the contents of which are incorporated herein by reference).

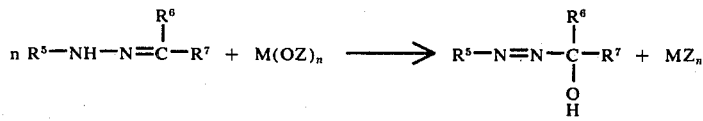

wherein M is an alkali metal or alkaline earth metal valence of $n$; and $R^7$ is not hydrogen.

An aqueous solution of 5–15% NaClO is slowly added to the stirred hydrazone, controlling the temperature at 0°–40° C depending on the reactivity of the hydrazone. The oxidation can generally be followed by gas chromatography.

c. A third process involves reducing the corresponding aryl, primary, secondary or tertiary- (alkyl, cycloalkyl, bicycloalkyl or aralkyl)-α-hydroperoxy azohydrocarbon to the α-hydroxyazohydrocarbon with a mold non-acidic reducing agent such as aqueous sodium sulfite (MacLeay U.S. application Ser. No. 453,451 filed Mar. 21, 1974, the contents of which are incorporated herein by reference).

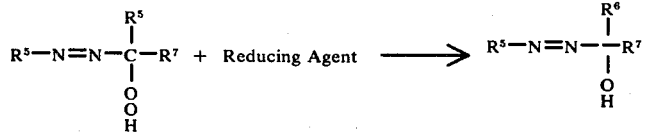

This method is especially suitable for preparing the above compounds when $R^7$ hydrogen or $R^5$ is primary or unsubstituted aryl since these compounds are difficult to prepare by the other two methods. The α-hydroperoxyazohydrocarbons are prepared by bubbling oxygen into a solution of the corresponding hydrazone in an inert solvent until the hydrazone has been completely oxidized to the α-hydroperoxyazohydrocarbon compound (Application Ser. No. 88,248 of MacLeay & Mageli & Application Ser. No. 88,249 of MacLeay and Sheppard, both filed Nov. 9, 1970, the contents of which are incorporated herein by reference). Most of the α-hydroperoxyazohydrocarbon compounds are thermally unstable and shock sensitive so extreme care should be exercized in handling them.

Since both the α-hydroperoxy- and the α-hydroxyazohydrocarbons compounds are sensitive to acidic reagents, it is essential that the reducing system used be essentially neutral or basic. Dilute aqueous solutions of sodium sulfite reduce the α-hydroperoxyazos smoothly. Due to the thermal instability of the α-hydroperoxyazos and the α-hydroxylazos, the reductions are usually carried out below 25° C. This requires cooling and slow addition of the reducing agent to control the exotherm generated in the reduction. Gas chromatography offers a convenient method for monitoring the reduction.

6. Alternate Routes to Unsymmetrical Azos a. α-Alkanoyloxyazos i. The α-loweralkanoyloxyazos were prepared in good yield by the lead tetra-acetate oxidation of the corresponding hydrazones according to the method of Iffland, J. Am. Chem. Soc., 83, 747 (1961).

ii. The α-lower alkanoyloxyazos can be prepared by acylation of the corresponding α-hydroxyazo with a lower alkanoic anhydride in pyridine according to the method of Hunig and Büttner, Chem. Ber. 104, 1088 (1971).

b. α-Alkoxyazos

The α-alkoxyazos were prepared in reasonable yield by iodine oxidation of the corresponding hydrazones in the desired alcohol according to the method of Schantl, Tet. Lett. 1970, p. 3785.

7. Other Unsymmetrical Azos

Other unsymmetrical azo compounds (Formula II) can be prepared by the foregoing methods starting with the appropriate hydrazine, $R^5$ NHNH$_2$ many of which hydrazines being well known in the literature. Examples of such other azo compounds include:

2-(acetylazo)-2-hydroxy-propane
2-(benzoylazo)-2-acetoxy-butane
2-(methoxycarbonylazo)-2-hydroxypropane
2-(ethoxycarbonylazo)-2-methoxybutane
2-(trimethylsilylazo)-2-hydroxy-butane
2-(trimethylgermanylazo)-2-acetoxypropane
2-(N, N-diethylcarbamoylazo)-2-hydroxy-butane
2-N,N-dimethylcarbamoylazo)-2-acetoxy-propane
2-(N, N-dimethylaminoazo)-2-hydroxy-butane
2-(N, N-diethylaminoazo)-2-acetoxy-4-methylbutane
2-(2-hydroxyisopropylazo)-butene-2
1-(2-acetoxyisopropylazo)cyclohexene
2-hydroxyisopropylazo-phosphoric acid diphenyl ester
1-acetoxycyclohexylazo phosphoric acid dimethyl ester
2-hydroxyisopropylazo-diphenylphosphine oxide
2-acetoxyisopropylazo-dicyclohexyl phosphine oxide
2-hydroxyisopropylazo-diphenylphosphine sulfide
2-acetoxyisopropylazo-phosphoric acid-bis(dimethylamide)
2-hydroxyisopropylazo-phosphoric acid-bis(dimethylamide)

C. Other methods of Preparation of Acid-Sensitive Azo Foaming Agents

1. Compounds of general structure

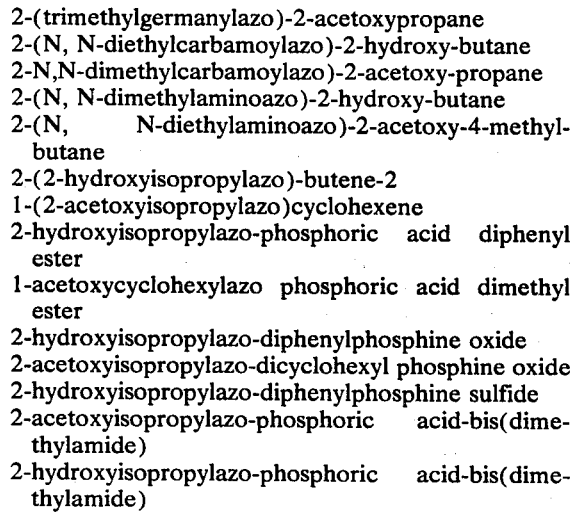

can be prepared according to the method of Benzing the U.S. Pat. No. 3,282,912. One mole of HCN is added to a ketazine to form an α-cyanohydrazone which is then halogenated to form a α-cyano-α-′-halogeno-azohydrocarbon compound which is then reacted with various nucleophiles (Y) to form acid-sensitive α′-substituted-α-cyanoazohydrocarbons in the same general manner that the α-substituted-azohydrocarbons in Examples 2, 5, 7 and 9 [B.4]were prepared. Typical examples of compounds of the above structure which Benzing made and which are included in this invention as foaming agents for polyester resins are as follows:

- 2-cyano-2'-chloro-2,'2'-azopropane
- 2-cyano-2'-thiocyano-2,2'-azopropane
- 2-cyano-2'-methoxy-2,2'-azopropane
- 2-cyano-2'-ethoxy-2,2'-azopropane
- 2-cyano-2'-acetoxy-2,2'-azopropane
- 2-cyano-2'-formyloxy-2,2'-azopropane
- 2-cyano-2'-propionyloxy-2,2'-azopropane The above α-cyano-α'-substituted-azohydrocarbons can be oxidized to the α-carbamyl-α'-substituted-azohydrocarbons with hydrogen peroxide. Recent references have described the oxidation of nitriles to the corresponding amides. (L. Fieser and M. Fieser, Reagents for Organic Synthesis, John Wiley & Sons, Inc. New York, 1967, p. 469).

2. Compounds of the formula:

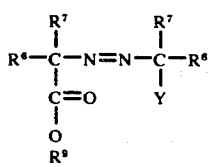

can be prepared in the same manner as the t-α-substituted azos except one would prepare a hydrazone from a hydrazine of structure

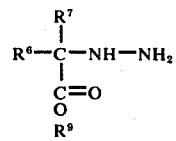

prepared in accordance with Method B.I. (c). The preparation of hydrazines of this structure are described in Canadian Pat. Nos. 890,451 and 899,374. The ester group would be inert to the chlorination of the hydrazone and subsequent reactions of the α-chloroazo with equivalent amounts of the desired nucleophiles.

3. Azo compounds in which the acid sensitive group Y is connected to $R^6$ or $R^7$ to form a cyclic group also fall within the scope of this invention.

a. For example, γ,γ'-azo-bis(γ-valerolactone) is prepared by reacting sodium levulinate with hydrazine to form the di sodium salt of levulinic acid ketazine. The ketazine is isolated and then chlorinated. The resulting α,α'-dichloroazo reacts with the acyloxy end group to form the lactone structure (Russian Pat. No. 321 115). Other cyclic acyloxy azos can be prepared using the same reaction, substituting other keto acids or secondary or tertiary hydrazines.

b. Likewise, other cyclic structures can be prepared from keto alcohols, keto thiols, keto amines, keto acids and keto thioacids, e.g.

Unsymmetrical Azos:

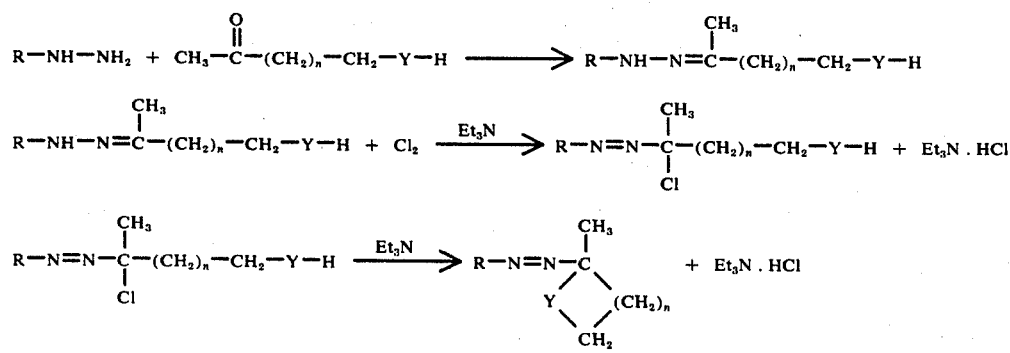

Symmetrical Azos:

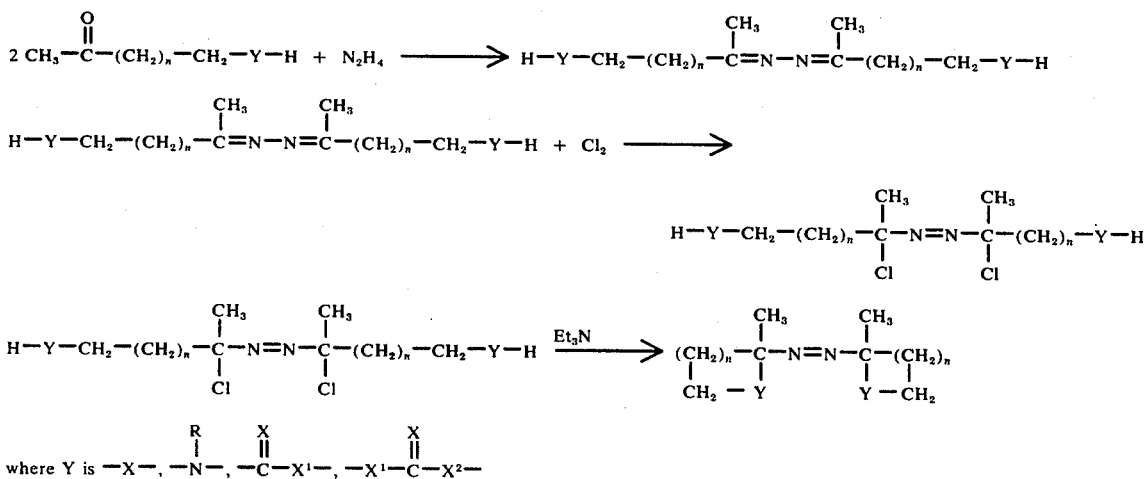

where Y is $-X-$, $-\underset{|}{N}-$, $-\underset{}{\overset{X}{\underset{\|}{C}}}-X^1-$, $-X^1-\underset{}{\overset{X}{\underset{\|}{C}}}-X^2-$ Some Typical Examples of Cyclic Azo Compounds
gamma-t-Butylazo-gamma-valerolactone
2-t-Butylazo-2-methyl-tetrahydrofuran
2-t-Butylazo-2-methylpiperidine
gamma-t-Butylazo-thio-gamma-valerolactone
gamma-t-Butylazo-gamma-dithiovalerolactone
gamma, gamma'-Azobis(gamma-valerolactone)
2,2'-Azobis(2-methyl-tetrahydrofuran)
2,2'-Azobis(2-methyl-tetrahydrothiopyran)
2.2'-Azobis(2-methylpiperidine)
gamma, gamma'-Azobis(thio-gamma-valerolactone
gamma, gamma'-Azobis(gamma-dithiovalerolactone)
2-t-Butylazo-2-methyl-tetrahydrothiopyran The following acid sensitive bis azo compounds, the preparation of which is described in Application Ser. No. 428,493, supra, are also included within the scope of this invention:
Ethylene Bis(4-t-butylazo-4-methoxypentyl carbonate)
Ethylene Bis[4-t-butylazo-4-t-butylazo-Ethylene Bis[4t-butylazo-4-(p-t-butylthiophenoxy)pentyl carbonate]Ethylene Bis(4-t-butylazo-4-thiocyanopentyl carbonate
Ethylene Bis(4-t-butylazo-4-phenoxypentyl carbonate)
Ethlene Bis[4-t-butylazo-4-(octylthio)pentyl carbonate]
2,2-Bis[4-(1-(t-butylazo)cyclohexoxy)phenyl]propane
Bis(1-t-butylazo-1,3-dimethylbutyl)ether
1,4-Bis[1-(t-butylazo)-1,3-dimethylbutoxy]butane
Di(1-t-butylazo-1,3-dimethylbutyl)succinate
Bis(1-t-butylazo-1,3-dimethylbutyl)sulfide
Di(1-t-butylazo-1-cyclohexyl)sulfide
Di(1-t-butylazo-1-methylethyl)sulfide
1,6-Di[1-(t-butylazo)-1,3-dimethylbutylthio]hexane
1,4-Cyclohexylenedimethyl Bis[2-(t-butylazo)isopropyl carbonate]
S,S-1,6-Hexylene Bis[2-(t-butylazo)isopropyl thiocarbonate]

The following acid sensitive azo peroxides whose preparation is described in U.S. application Ser. No. 37,310 filed May 14, 1970 by Sheppard, MacLeay and Bafford also fall within the scope of this invention:
2-(t-Butylazo)-2-chloro-4-methyl-4-(t-butylperoxy)-pentane
2-(t-Butylazo)-2-phenoxy-4-methyl-4-(t-butylperoxy)pentane
2-(t-Butylazo)-2-(p-t-butylthiophenoxy)-4-methyl-4-(t-butylperoxy) pentane
2-(t-Butylazo)-2-thiocyano-4-methyl-4-(t-butylperoxy)pentane
2-(t-Butylazo)-2-dodecanethiol-4-methyl-4-(t-butylperoxy)-pentane
2-(t-Butylazo)-2-thioacetoxy-4-thioacetoxy-4-methyl-4-(t-butylperoxy)pentane
t-Butyl 4-(t-Butylazo)-4-(thiophenoxy)peroxyvalerate
Di[4-(t-butylazo)-4-(thiophenoxy)valeryl]Peroxide
t-Butyl 4-(t-Butylazo)-4-(p-t-butylthiophenoxy)-peroxyvalerate
Di[4-(t-butylazo)-4-(p-t-butylthiophenoxy)valery]-Peroxide
1,1,3,3-Tetramethylbutyl 4-(t-Butylazo)-4-(p-t-butylthiophenoxy) peroxyvalerate The following acid sensitive dual temperature azo compounds whose preparation is described in U.S. Pat. No. 3,649,614 (the contents of which are incorporated herein by reference) also fall within the scope of this invention.
2,2'-Azobis[2-(4-t-butylazo-4-cyanovaleroyloxy)-4-methylpentane]
   3 azo groups — only one is acid sensitive
Di(1-t-butylazo-1,3-dimethylbutyl)4,4'-Azobis(4-cyanovalerate)
   3 azo groups — only two are acid sensitive
2-t-Butylazo-1,3-dimethylbutyl 4-t-Butylano-4-cyanovalerate
   2 azo groups — only one is acid sensitive The following acid sensitive dual temperature azo compounds whose preparation is described in U.S. application Ser. No. 234,377 filed Mar. 13, 1972 by Lange, MacLeay and Sheppard (the contents of which are incorporated herein by reference) also fall within the scope of this invention:
4-t-Butylazo-4-methyl-3-thiapentyl 4-t-Butylazo-4-cyanovalerate
   2 azo groups — only one is acid sensitive
4-t-Butylazo-4,6-dimethyl-3-thiaheptyl 4-t-Butylazo-4-cyanovalerate
   2 azo groups — only one is acid sensitive
1-Methyl-1-(2-(t-butylazo)-2-methyl-1-thiapropyl)-4-(3-(t-butylazo)-1, 1,3-trimethyl-2-thiabutyl)cyclohexane
   2 azo groups — both are acid sensitive
Di (4-t-butylazo-4,6-dimethyl-3-thiaheptyl) 4,4'-Azobis(4-methyl-3-thiapentyl)Dicarbonate
   2 azo groups — both are acid sensitive
Di(4-t-butylazo-4-methyl-3-thiapentyl) 4,4'Azobis(4-cyanovalerate
   3 azo groups — only two are acid sensitive
2-t-Butylazo-isopropyl 4-t-Butylazo-4-methyl-3-thiapentyl Carbonate
   2 azo groups — both are acid sensitive
2,2'-Azobis(5-(4-t-butylazo-4-cyanovaleroyloxy-2-methyl-3-thiapentane
   3 azo groups — only one is acid sensitive
2,2'-Azobis(7-t-butylazo-2,7,9-trimethyl-3-thia-6-oxadecane)
   3 azo groups 13 all 3 are acid sensitive
6-Methyl-6-t-butylazo-5-oxaheptyl 4-t-Butylazo-4-cyanovalerate
   2 azo groups — only one is acid sensitive
2,2'-Azobis [5-(4-t-butylazo-4-(p-t-butylthiophenoxy)valeroyloxy)-2-methyl-3-thiapentane]
   3 azo groups — all 3 are acid sensitive
2,7-Di(t-butylazo)-2,7-dimethyl-3-thia-6-oxaoctane
   2 azo groups — both are acid sensitive
4-t-Butylazo-4,6-dimethyl-3-thiaheptyl 3-[2-(t-butylazo)-isopropylthio]propionate
   2 azo groups — both are acid sensitive
2,2'-Azobis [5-[(5-t-butylazo)-5-methyl-4-thiahexanoyloxy]-2-methyl-3-thiapentane]
   3 azo groups — all 3 are acid sensitive
2-t-butylazoisopropyl 3[2-(t-butylazo)isopropylthio]-propionate
   2 azo groups — both are acid sensitive
2,7-Di(t-butylazo)-2-methyl-3-oxa-7-cyanooctane
   2 azo groups — only one is acid sensitive
Di(4-t-butylazo-4,6-dimethyl-3-thiaheptyl)4,4' Azobis(4-cyanovalerate)
   3 azo groups — only two are acid sensitive

SUITABLE POLYMERIZABLE MEDIUMS

A Type Mediums

Specific suitable unsaturated polyesters useful as reactive "resins" in the process of the present invention are, for instance, polyesters as they are obtained by esterifying preferably ethylenically unsaturated di- or poly- carboxylic acids or their anhydrides or their acid halides, such as maleic acid, fumaric acid, glutaconic acid, itaconic acid, mesaconic acid, citraconic acid, allyl malonic acid, ally succinic acid, tetrahydrophthalic acid, 2,3-dicarboxybicyclo (2.2.1) heptene and others, with saturated or unsaturated di- or polyalcohols, such as ethylene glycol, diethylene glycol, triethylene glycol, 1,2- and 1,3-propanediols, 1,2-, 1,3- and 1,4-butanediols, 2,2-dimethyl-1,3-propanediol, 2-hydroxymethyl-2-methyl-1,3-propanediol, 2-buten-1,4-diol, 2-butyn-1,4-diol, 2,2,4-trimethyl-1,3-pentanediol, glycerol, pentaerythritol, mannitol and others. Mixtures of such polyacids and/or mixtures of such polyalcohols may also be used. The unsaturated di- or polycarboxylic acids may be replaced, at least partly, by unreactive, saturated polycarboxylic acids, such as adipic acid, succinic acid, sebacic acid and others and/or by aromatic polycarboxylic acids, such as phthalic acid, trimellitic acid, pyromellitic acid, isophthalic acid and terephthalic acid. The dibasic acid may be polymeric with terminal carboxylic acid groups, such as those prepared by polymerizing monomers such as styrene, butadiene, isoprene and chloroprene with initators containing carboxylic acid groups in each initiating fragment, i.e., 4,4′-azobis-(4-cyanovaleric acid) or by treating living anionic polymers with carbon dioxide. These mediums may contain a mixture of two or more differnet polymers, one or more of which is active.

Other Type A Mediums consist of polymeric active resins containing one or more terminal and/or pendant functional groups that undergo free radical reaction. The polymeric molecules have the general formula:

$$P - (M)_m$$

where P is a mono-or polyvalent polymeric residue of a polymer i.e. $P—(H)_m$ (with at least one hydrogen atom removed) selected from: polyesters polyamides, polyethers, polycarbonates, polyurethanes, polystyrene, polybutadiene, polyacrylate, polymethacrylate, polyethylene, poly(vinyl acetate), poly(vinyl chloride), poly(vinylpyridine), polyisobutylene, poly(vinylpyrrolidone), poly(vinylcarbazole), poly(vinylidene chloride), poly(vinylidene fluoride), poly(alpha-methylstyrene), poly(chlorostyrene), polyacrylonitrile, poly(methacrylonitrile), polychloroprene, polyisoprene, and copolymers and terpolymers thereof, as well as copolymers and terpolymers of ethylene, propylene and dienes. In the formula $P—(M)_m$ where $m = 1$ or more, M is selected from:

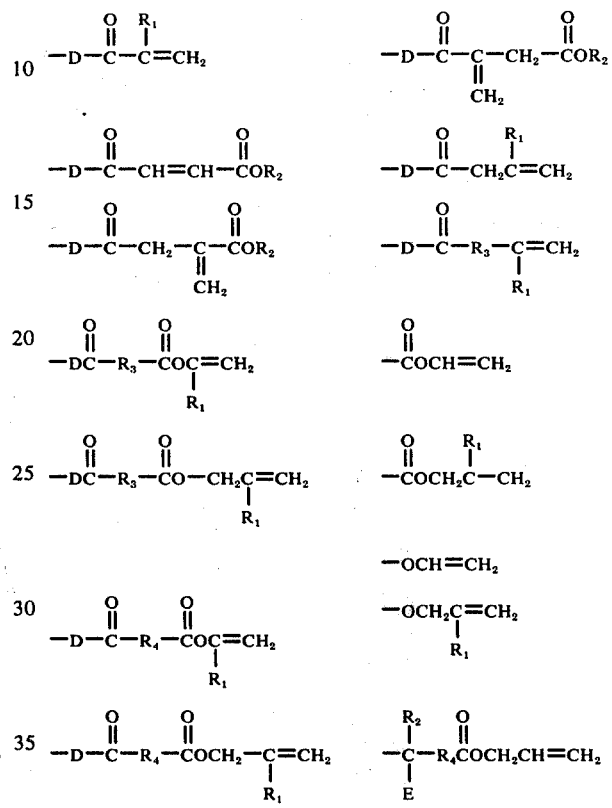

$R_1 = H—$ or $CH_3—$
$R_2 =$ lower alkyl of 1 to 6 carbons
$R_3 =$ phenylene or naphthylene
$R_4 =$ alkylene of 1 to 8 carbons

or —O—

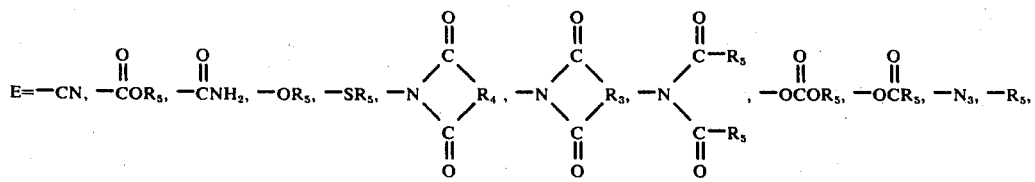

—$N_3$, —$R_5$, $R_5 =$ lower alkyl of 1 to 6 carbons, aryl of 6 to 12 carbons, and cycloalkyl of 5 to 8 carbons.

Other examples of M groupings in $P(M)_m$ where $m =$ 2 or more:

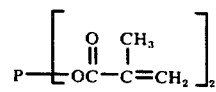 

-continued
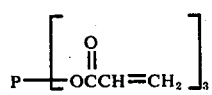
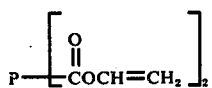
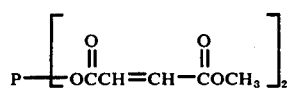
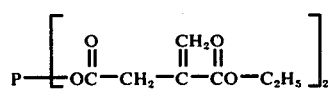
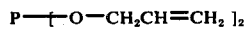
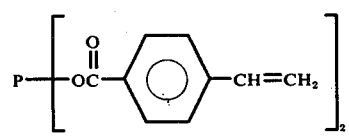
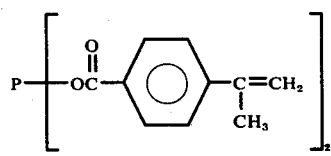
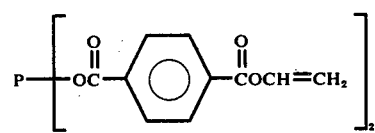
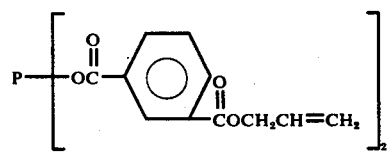
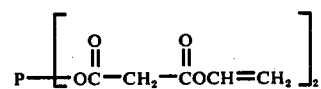
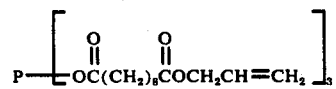
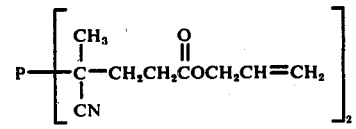
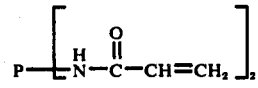
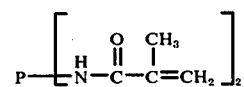
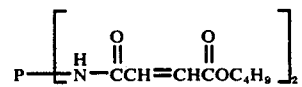
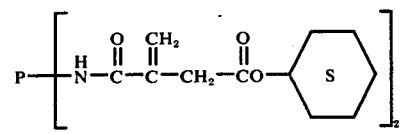
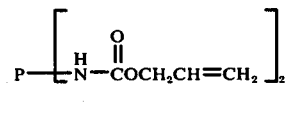
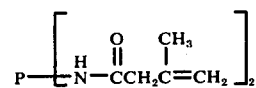
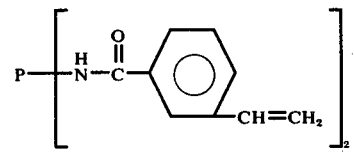
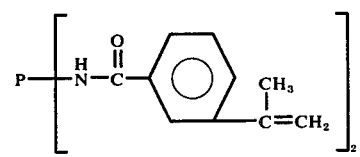
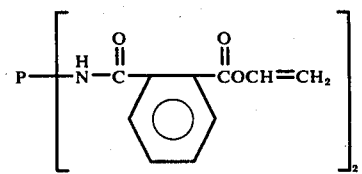

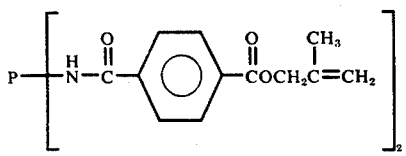 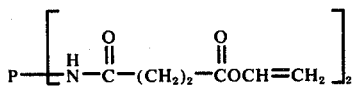

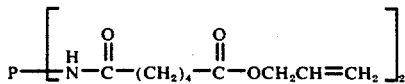

The polymeric active resins, $P(M)_m$, may be prepared by several known methods as follows:

1. The reaction of hydroxy-terminated polymers with acid chlorides or chloroformates containing vinyl unsaturation such as from acrylic acid, methacrylic acid, itaconic acid monoester, fumaric acid monoester, maleic acid monoester, vinylacetic acid, carboxystyrene, carboxy-α-methylstyrene, phthalic acid monovinyl ester, isophthalic acid monoallyl ester, malonic acid monovinyl ester, succinic acid monovinyl ester, glutaric acid monoallyl ester, adipic acid monoallyl ester, sebacic acid monovinyl ester and ally chloroformate.

The hydroxy-terminated polymers may be prepared by one of several known methods: (1) the polycondensation of diacid chlorides or bischloroformates with excess diols to form hydroxy terminated polyesters or polycarbonates. (2) the polycondensation of epoxides (e.g. ethylene oxide or propylene oxide) with dihydroxy compounds followed by hydrolysis to form hydroxy-terminate polyethers. (3) the free radical polymerization or copolymerization of vinyl monomers such as styrene, chlorostyrene, α-methylstyrene, vinyltoluene, butadiene, isoprene, chloroprene and copolymers there of with hydroxy-containing free radical initiators such as hydrogen peroxide and 4,4'-azobis (4-cyano-n-pentanol). (4) the telomerization of vinyl monomers such as ethylene with carbon tetrachloride to form $Cl-(CH_2CH_2)_nCCl_3$ followed by hydrolysis and reduction to form $HO-(CH_2CH_2)_n CH_2OH$. (5) the dianionic polymerization (living polymers) of aromatic vinyl monomers such as styrene, α-methylstyrene, vinyl toluene, t-butyl styrene, conjugated dienes such as isoprene, and butadiene and other monomers polymerizable by this mechanism [terminated by an epoxide such as ethylene oxide], (6) the di-cationic polymerization of vinyl monomers such as α-methylstyrene, vinyl esters, isobutylene, and vinyl ethers followed by hydrolytic termination.

2. The reaction of amino-terminated polymers with acid halide or haloformates containing vinyl unsaturation such as those described above. The amino-terminated polymers may be prepared by one of several known methods, e.g., the polycondensation of diacid chlorides or bischloroformates with excess diamines to form amino-terminated polyamides and polyurethanes.

3. The conversion of carboxy-containing polymers to the corresponding vinyl, allyl, and methallyl esters by known organic synthetic techniques, e.g., reaction with acetylene to form vinyl esters and allyl alcohols to form the methallyl and allyl esters. The carboxy-containing polymers may be prepared by one of several known methods, e.g., (1) the polycondensation of excess diacid chlorides with dihydroxy or diamino compounds to form carboxy-terminated (or acid chloride terminated) polyesters and polyamides; (2) the free radical polymerization or copolymerization of vinyl monomers (as above) with carboxy-containing free radical initiators such as 4,4'-azobis-(4-cyanovaleric acid) and di(4-carboxybutyryl) peroxide (glutaric acid peroxide); (3) the dianionic polymerization of vinyl monomers (as above) followed by termination with carbon dioxide; (4) the reaction of any of the hydroxy-terminated polymers described above with dibasic acid anhydrides such as succinic anhydride, glutaric anhydride, phthalic anhydride, etc. (5) copolymerization of a monomer containing a carboxylic acid group with other monomers, e.g., copolymerization of styrene with acrylic acid.

4. The free radical polymerization of vinyl monomers with initiators containing vinyl unsaturation wherein the vinyl monomer has a very low reactivity ratio with the unsaturation of the initiator and wherein the vinyl monomer is significantly more reactive to free radical polymerization than the unsaturation on the initiator. Suitable such initiators are aliphatic azo compounds containing ally groups as the vinyl unsaturation, e.g., diallyl 4,4'-azobis(4-substituted valerates) wherein the 4-substituent is cyano; alkoxycarbonyl(methoxy, ethoxy, etc.); carbamoyl; alkoxy(methoxy, ethoxy, etc.); aryloxy(phenoxy, naphthoxy, etc.); thioalkoxy(methylthio, t-butylthio, etc.); thioaryloxy(phenylthio, 4-t-butylphenylthio, etc.); imido (phthalimido, succinimido, etc.); acyloxy (acetoxy, benzolyloxy, etc.); azido; alkyl(methyl, ethyl, cyclohexyl, etc.) and aryl(phenyl, biphenyl, etc.).

Allyl-type of vinyl monomers are less reactive and have very low reactivity ratios with most vinyl monomers. They do have good reactivity ratios with certain vinyl monomers however, such as vinyl acetate and other allyl monomers which makes these monomers suitable for dissolving the allyl-terminated polymers to form the polymerizable media of this invention.

5. The conversion of hydroxy-terminated polymers to the corresponding vinyl, methallyl, and allyl ethers by known organic synthetic technique, e.g., the Williamson synthesis of ethers.

Other methods of preparing the $P(M)_m$ polymeric molecules will be obvious to one skilled in the art.

Some examples of $P-(H)_m$ suitable for preparing reactive resins of the $P-(M)_m$ variety are given below: polystyrene, polybutadiene(cis-1,2, cis-1,4, trans 1,2, trans 1,4 and mixtures thereof), poly(ethyl acrylate), poly(methyl methacrylate), polyethylene, poly(vinyl acetate), poly(vinyl chloride), poly(vinylpyridine), polyisobutylene, poly(vinylpyrrolidone), poly(vinyl carbazole), poly(vinylidene chloride), poly(vinylidene fluoride), poly(α-methylstyrene), poly(chlorostyrene), polyacrylonitrile, poly(methacrylonitrile), polychloroprene, polyisoprene, ethylene propylene copolymer, ethylene-propylene-norbornadiene terpolymer, ethylene-propylene-1,4-hexadiene terpolymer, ethylenepropyleneethylidenenorbornene terpolymer, acrylonitrile-butadiene-styrene terpolymer and mixed copolymers, ethylene vinyl acetate copolymer, styrene-butadiene copolymer, styrene methyl methacrylate copolymer, polyester of adipic acid and ethylene glycol, polyester of succinic acid and diethylene glycol, polyamide of sebacic acid and hexamethylenediamine, polycarbonate of butanediol bis chloroformate and bisphenol A (i.e. 2,2-di(4-hydroxyphenyl)propane), polyurethane of hexanediol bischloroformate and ethylenediamine, polyether of bisphenol A and propylene oxide, and poly(ethylene oxide). Combinations of 2 or more of these polymeric materials may be used as a polymerizable medium.

B Type Mediums

These mediums consist of a polymer or mixture of polymers dissolved and/or dispersed in a monomer or a mixture of monomers. A wide varitey of polymers can be used. A partial list of reactive polymers is given in the description of A Type Mediums. In addition, a wide variety of polymers which are unreactive $[P(H)_m]$ to free radical polymerization or crosslinking reactions may also be used. Note that the polymers and/or the monomer may also contain other functional groups which can undergo polymerization or crosslinking reactions by non-radical mechanisms.

Among reactive resins useful in B Type Mediums are included those resins which are terminated by polymerizable unsaturated ester functions but wherein the polymer repeating units may or may not be of the polyester type, for example, polyethers terminated with acrylic acid ester groups, blended with suitable copolymerizable monomers. These may be cured to hard thermosets by means of free radical curing agents. A typical series of such resins are commercially available from Dow Chemical Corporation under the trade mark "Derakane" resins and generally comprise polyethers prepared from an epoxide (e.g., glycidol) and a bisphenol (e.g., 2,2-di(4-hydroxyphenyl) propane or bisphenol A) which are terminated by acrylic acid ester functions and blended with styrene. A preferred resin medium contains the esterification products of propylene glycol with maleic anhydride and phthalic anhydride in admixture with styrene as a monomer component. That resin is referred to hereinafter as the Standard Unsaturated Polyester Resin. Among suitable copolymerizable monomers useful in B Type Mediums are ethylenically unsaturated monomers such as styrene, vinyl toluene, methyl methacrylte, diallyl phthalate, dibutyl fumarate, acrylonitrile, triallyl cyanurate, α-methyl styrene, divinyl benzene, methyl acrylate, diallyl maleate, n-butyl methacrylate and ethyl acrylate. A partial list of other such monomers follow:

| acrylic acid | methacrylic acid | p-methylstyrene |
| butyl acrylate | methacrylonitrile | vinyl acetate |
| butadiene | p-chlorostyrene | vinylpyridine |
| isoprene | p-methoxystrene | |

It is preferred to select the polymer-monomer pair in such a way that the polymer can be dissolved in the monomer. The ratio of polyester to monomer or monomer mixture may vary over a wide range. Generally a ratio of polyester: monomer between about 0.2:1 to 4:1 is suitable.

C Type Mediums

These mediums consist of a free radically reactive polymer or mixture of polymers dissolved in an unreactive diluent or mixture of diluents. Unreactive polymers may also be incorporated. A partial list of appropriate polymers are described in "A Type Mediums". These diluents may be used to obtain proper viscosity and other physical properties of the resultant foam or attractive economics.

Examples of such diluents are:

| acetone | butyl benzyl phthalate | pentane |
| tetrahydrofuran | butyl octyl phthalate | cyclohexane |
| 1,4-dioxane | di-(2-ethyl hexyl) phthalate | benzene |
| methyl ethyl ketone | dioctyl adipate | decane |
| hexane | dibutyl sebacate | |

D Type Mediums

These mediums consist of a wide variety of monomers and mixtures of monomers which are capable of free radical polymerization. Examples of such monomers are given in "B Type Medium" (wherein they are used to dilute polymeric materials).

E Type Mediums

Combinations of any or all of A, B, C, and D Type Mediums can be used. In addition said reactive Mediums may also be mixed with other mediums which undergo polymerization and/or crosslinking by other mechanisms, i.e., epoxy resins and phenol formaldehyde resins, e.g., butyl glycidyl ether, phenyl glycidyl ether, and 4-methylphenyl glycidyl ether. Also included are monomers containing both an epoxy group and free radically polymerizable unsaturated function, e.g., glycidyl methacrylate and allyl glycidyl ether. Also included are typical di- or polyfunctional epoxy resins, the technology of which is well known.

FILLERS

Fillers may be used as components in any of the reactive mediums described above following techniques well known to those skilled in the art of casting and molding resins. Fillers improve fabrication and handling characteristics, reduce shrinkage, lower cost, and improve physical properties. A wide variety of fillers have been found to be compatible with the foaming process of this invention. Milled fiberglass and cotton flock are re-enforcing fillers and tend to increase green strength, compressive strength and impact strength. Bulk fillers such as wood flours, clays, carbonates and silicates decrease the cost and reduce thermoexpansion and shrinkage. Mineral fillers such as borax and alum are known to effectively reduce the burning rates. Examples of fillers include the following: pecan shell flour, milled fiberglass, wood chips, sawdust, vermiculite, carbon black, magnesium sulfate, cotton flock, calcium carbonate, mica steel wire, aluminum powder, polystyrene powder, polypropylene powder, polyethylene powder, polyvinylchloride powder, and powdered cross-linked butadiene-acrylonitrile rubber.

ACTIVATORS

Both organic and inorganic Bronsted-Lowry acids (substances which will dissociate a proton) have been found effective in activating acid sensitive azo compounds of this invention to evolve gas. Representative examples are:

| Inorganic Acids | Organic Acids |
|---|---|
| hydrochloric | acetic |
| hydrofluoric | formic |
| hydrobromic | methane sulfonic |
| nitric (dilute) | maleic |
| nitrous | 4,4'-azobis-(4-cyanovaleric) |
| sulfuric | 4-t-butylazo-(4-cyanovaleric) |
| sulfurous | adipic |
| phosphoric | oxalic |
| phosphorous | propionic |
| perchloric | succinic |
|  | benzoic |
|  | phthalic |
| Esters | tri-chloro-acetic |
| maleic monoesters | tri-fluoro-acetic |
| phthalic monoesters | carboxylic acid substituted with electron withdrawing groups |
|  | acrylic acid |
|  | methacrylic acid |
|  | carboxy-containing polymers (of "A Medium) |

Representative examples of acyl alkyl(cycloalkyl)-sulfonyl peroxides useful as activators are:
  acetyl cyclopentylsulfonyl peroxide
  acetyl cyclohexylsulfonyl peroxide
  acetyl methylcyclohexylsulfonyl peroxide
  acetyl cyclooctylsulfonyl peroxide
  acetyl tert-butylsulfonyl peroxide
  acetyl tert-amylsulfonyl peroxide
  acetyl sec-hexylsulfonyl peroxide
  acetyl sec-heptylsulfonyl peroxide
  acetyl tert-dodecylsulfonyl peroxide
  acetyl sec-eicosylsulfonyl peroxide
  acetyl adamantylsulfonyl peroxide
  acetyl sec-norbornylsulfonyl peroxide
  acetyl 3-chloro-1-methylpropylsulfonyl peroxide
  acetyl 3-chloro-1,1-dimethylpropylsulfonyl peroxide
  acetyl 1-cyano-sec-heptylsulfonyl peroxide
  acetyl 1-acetoxy-2-ethylhexanesulfonyl peroxide
  acetyl 1-methoxycarbonylundecanesulfonyl peroxide
  propionyl cyclohexylsulfonyl peroxide
  n-butyryl cyclohexylsulfonyl peroxide
  00, 00-bis(cyclohexylsulfonyl)diperoxysuccinate
  propionyl cyclopentylsulfonyl peroxide

CURING AGENTS

Curing agents enhance the cure reaction effected by the acid sensitive azos hereof and improve the physical properties of the resultant polymeric foam. Free radical initiators such as peroxides and azos (in addition to the acid sensitive azo compounds of this invention) are effective.

Representative examples are:

| Organic Peroxides | |
|---|---|
| benzoyl peroxide | t-butyl peroctoate |
| acetyl peroxide | di-t-butyl diperphthalate |
| di-t-butyl peroxide | t-butyl perbenzoate |
| dicumyl peroxide | 2,5-dimethyl-2,5-bis(benzoylperoxy)-hexane |
| methyl ethyl ketone peroxides | |
| di-(sec-butyl) peroxydicarbonate | 2,5-dimethyl-2,5-di(t-butylperoxy)-hexane |
| diisopropyl peroxydicarbonate | t-butyl hydroperoxide |
| t-butyl peracetate | |
|  | cumene hydroperoxide |
|  | 2,2-bis(t-butylperoxy)-butane |

A large number of other peroxides known for curing resins, such as polyesters and other polymers, are operable in this invention. The curing of polyester resins, without foaming, is well known art and all known curing agents for these resins can be used in conjunction with the foaming systems of this invention.

Also included as curing agents are conventional azo curing compounds other than the acid sensitive ones useful in this invention. Examples of such azo curing agents are:
  azobisisobutyronitrile
  azocumene
  2-t-butylazo-2-cyano-4-methoxy-4-methylpentane
  2-t-butylazo-2-cyano-4-metylpentane
  4-t-butylazo-4-cyanovaleric acid
  1-cyano-1-(t-butylazo)-cyclohexane
  2,2'-azobis (2,4-dimethylvaleronitrile)

Azo compounds of the foregoing class effect polymerization or curing but no foaming when reacted in a polymerizable medium. Also included in this class of compounds are those containing both azo and peroxide functions such as
  di-t-butyl 4,4'-azobis-(4-cyanoperoxyvalerate) and
  1,3-dimethyl-3-(t-butylperoxy)butyl 4-t-butylazo-4-cyanovalcrate Other free radical generating compounds or systems have also been used to cure unsaturated polyester resins such as certain hexa-substituted ethanes, e.g. 1,2-dicyano-1,2-di(methoxycarbonyl)-1,2-di(4-methylphenyl)ethane, or certain photo-initiators or photosensitizers in the presence of ultraviolet irradiation, e.g. benzoin methyl ether. These also include transition metal salts (cobalt, copper, iron, etc.) in combination with specific reactant compound such as certain halo-hydrocarbons, hydrazine derivatives, etc. Such curing agents are well known in the art and can be used in conjunction with the foaming system of this invention; for example the addition of certain transition metal salts such as copper naphthenate accelerates both the foaming and curing reaction in the present invention.

VAPORIZING ADJUVANTS

Vaporizing adjuvants enhance the amount of foaming effected by the acid sensitive azo compounds hereof. Effective compounds have boiling points such that they become gaseous during the early portions of the cure reaction; i.e., below 100° C.

Representative examples are:

| pentane | trans-2-butene | $C_2F_3Cl_3$ |
| hexane | 1-butene | isoprene |
| heptane | 1-pentene | iso-pentane |
| cis-2-butene | 1-hexane | neo-pentane |
|  | $CFCl_3$ | |

Other compounds that vaporize below 100° C, can be used as well. In some cases less volatile compounds (having boiling points higher than 100° C) can be used to enhance foaming.

NUCLEATION AND STABILIZATION AGENTS

A considerable variety of surfactants have been used in the preparation of urethane foams. They are also effective in the preparation of polymeric foams hereof. These products serve to reduce the surface tension of the system and to aid in nucleation and bubble stabilization. Anionic, cationic and non-ionic surfactants all can be used.

Representative examples are:

Tergitol NPX— Nonyl phenyl polyethylene glycol ether
Union Carbide Corporation (non-ionic)

Igepal CO 430 — Nonyl phenoxy poly(ethyleneoxy)ethanol
(GAF) (non-ionic)

Monawet MT 70 — di-tridecyl sodium sulfosuccinate
(Mona Industries (anionic)

Triton X 400 — stearyl dimethyl benzyl ammonium chloride
(Rohm & Haas) (cationic)

Triton X 200 — sodium salt of alkyl aryl polyether sulfonate (anionic)
(Rohm & Haas)

ADJUVANTS

Adjuvants having densities less than that of the polymerized matrix can contribute to a decrease in density of the system along with the gas bubbles generated from the decomposition of acid sensitive azo compounds hereof. They may be utilized to impart certain desired properties to the foam. Hollow ceramic, glass or graphite spheres may be used in this capacity. For example, Eccospheres (registered trademark of Emerson & Cuming, Inc.) IG-100 have been employed. This material consists of hollow sodium borosilicate glass spheres of 10–250 microns and diameter with a true particle density of 0.31 grams/cc.

COMPONENT AND TEMPERATURE VARIABLES

A wide range of proportions among the components of the active polymerizable mediums is possible in the practice of the present invention as is a broad range of temperature variables. Utilization ranges (with percentages based on weight of polymerizable medium) of the various parameters are listed below:

| Parameter | Broad Range | General Operating Range | Preferred Range |
|---|---|---|---|
| Acid Sensitive Azo Compounds | 0.02 to 15 wt% | 0.2 to 8 wt% | 0.5 to 4 wt% |
| Activators | 0 to 99.9 wt% | 0.0 to 10 wt% | 0.0 to 6 wt% |
| Curing Agents | 0.0 to 10 wt% | 0.05 to 5 wt% | 0.1 to 2 wt% |
| Vaporizable Adjuvants | 0.0 to 20 wt% | 0.0 to 10 wt% | 0.0 to 4 wt% |
| Nucleation and Stabilization Agents | 0.0 to 5 wt% | 0.25 to 2 wt% | 0.5 to 1.5 wt% |
| Low Density Adjuvants | 0.0 to 30 wt% | 0 to 25 wt% | 0 to 20 wt% |
| Fillers | 0.0 to 60 wt% | 0.0 to 30 wt% | 0 to 10 wt% |
| Temperatures | −20 to 200° C | 15 to 100° C | 21 to 60° C |

EXAMPLES

The followng examples are cited to illustrate the invention. They are not intended to limit it in any manner.

To permit comparative evaluation, unless otherwise stated in the Examples, a Standard Unsaturated Polyester Resin was employed. It was made by reacting maleic anhydride (1.0 mol), phthalic anhydride (1.0 mol), and propylene glycol (2.2 mols) until an acid number of 45–50 was obtained. To this was added hydroquinone at 0.013% concentration. Seven parts of this unsaturated polyester were diluted with three parts of monomeric styrene to obtain a homogenous blend having a viscosity of 21 to 25 poise and a specific gravity of 1.14 (The specific gravity of blend after curing in the absence of a foaming agent was 1.25 —obtained by mixing 100 g. of said resin with 1 g. methyl ethyl ketone peroxide, then mixing therewith 0.2 g. of a 6% solution of Co Naphthanate—gel time of 5.5 minutes, a cure time of 12 minutes and a peak exotherm of 330° F.)

Unless otherwise indicated in the Examples the foam structure made from the Standard Resin was made by mixing 100 grams of the Standard UnsaturatedPolyester Resin with 0.2 gram Lupersol DDM (Lucidols methyl ethyl ketone peroxide formulation) or 0.05 to 1.0 gram t-butyl peroxy-benzoate and the desired number of grams of the azo compound (see column labeled Parts Azo) using an electric stirrer. Finally, the appropriate number of grams of an activator (if required-see columns labeled Activator and Parts Activator) was mixed into the formulation. The mixture was poured into a waxed cup at ambient temperature (75° F) and allowed to foam and cure. The foaming and curing were complete in less than 30 minutes. After the foams had cooled to room temperature the foam density was determined in grams/cc. (see column labeled Foam Density).

The activator acetyl sec-hexy sulfonyl peroxide is designated as $AH_6SP$ in the Examples. Where used, it was added as a 50% solution in dimethyl phthalate. The activator acetyl cyclohexylsulfonyl peroxide is designated as ACSP in the Examples, and where used, it was added as a 30% solution in dimethyl phthalate. The phosphoric acid when used as the activator was 86% by weight and the sulfuric acid when used was 60% by weight aqueous solutions.

Examples 1–14 inclusive, are intended to illustrate the wide variety of acid sensitive azo compounds useful in the present invention as employed with a variety of solvents, activators and the like.

Example 1

Preparation of Symmetrical
$\alpha,\alpha'$-Dihaloazohydrocarbon Compounds
and Their Use in Preparing
Polyester Foams $$R^7\!\!>\!\!C=N-N=C\!\!<\!\!R^7 + Cl_2 \longrightarrow R^6-\underset{Cl}{\underset{|}{\overset{R^7}{\overset{|}{C}}}}-N=N-\underset{Cl}{\underset{|}{\overset{R^7}{\overset{|}{C}}}}-R^6$$

| | SYNTHESIS DATA | | | FOAMING DATA | | |
|---|---|---|---|---|---|---|
| Example | $R^6$ | $R^7$ | % Yield | Activator | Parts Activator | Parts Azo | Foam Density |
| 1-1 | $CH_3$ | $CH_3$ | 87 | $H_3PO_4$ | 5.0 | 2.0 | 0.50 |
| 1-2 | $CH_3$ | i-Bu | 91 | $H_3PO_4$ | 6.0 | 2.0 | 0.50 |
| 1-3 | $CH_3$ | $C_6H_5$ | 100 | $H_3PO_4$ | 4.0 | 2.0 | 0.91 |
| 1-4 | —$(CH_2)_5$— | | 100 | $AH_6SP$ | 2.0 | 2.0 | 0.94 |

"halo" denotes Cl, Br, and the like
Synthesis solvent was pentane

Example 2

Preparation of Symmetrical Azo Compounds From α,α'-Dihaloazo-hydrocarbon Compounds and Their Use in Preparing of Polyester Foams $$R_6-\underset{\underset{Cl}{|}}{\overset{\overset{R_7}{|}}{C}}-N=N-\underset{\underset{Cl}{|}}{\overset{\overset{R_7}{|}}{C}}-R_6 \xrightarrow{MY} R_6-\underset{\underset{Y}{|}}{\overset{\overset{R_7}{|}}{C}}-N=N-\underset{\underset{Y}{|}}{\overset{\overset{R_7}{|}}{C}}-R_6 + MCl$$

| | | | SYNTHESIS DATA | | | | FOAMING DATA | | |
|---|---|---|---|---|---|---|---|---|---|
| Example | $R_6$ | $R_7$ | Y | M | Solvent | % Yield | Activator | Parts Activator | Parts Azo | Foam Density |
| 2-1 | $CH_3$ | $CH_3$ | —OCCH$_3$ (ester) | Na | HOCCH$_3$ | 75 | $H_3PO_4$ | 6.0 | 2 | 0.69 |
| 2-2 | $CH_3$ | i-Bu | —OCCH$_3$ | Na | HOCCH$_3$ | 87 | $H_3PO_4$ | 6.0 | 2 | 0.85 |
| 2-3 | $CH_3$ | —CH$_2$—C(CH$_3$)$_2$—OCH$_3$ | —OCCH$_3$ | Na | HOCCH$_3$ | 52 | $H_3PO_4$ | 6.0 | 2 | 0.96 |
| 2-4 | $CH_3$ | $CH_3$ | —OCH | Na | HOCH | 55 | $H_3PO_4$ | 6.0 | 2 | 0.73 |
| 2-5 | $CH_3$ | $CH_3$ | —OCCH$_2$CH$_3$ | Na | HOCCH$_2$CH$_3$ | 40 | $H_3PO_4$ | 6.0 | 2 | 0.77 |
| 2-6 | $CH_3$ | i-Bu | —OC—C(CH$_3$)=CH$_2$ | Na | HOC—C(CH$_3$)=CH$_2$ | 67 | $H_3PO_4$ | 5.0 | 2 | 0.58 |
| 2-7 | $CH_3$ | $C_6H_5$ | —OCCH$_3$ | Na | HOCCH$_3$ | 33 | $H_2SO_4$ | 1.5 | 2 | 0.70 |
| 2-8 | $CH_3$ | $C_2H_5$ | —OCCH$_3$ | Na | HOCCH$_3$ | 65 | $H_2SO_4$ | 1.5 | 2 | 0.61 |
| 2-9 | $CH_3$ | $CH_3$ | —OCCH$_2$—CH$_2$—C(CH$_3$)(CN)—N=N—C(CH$_3$)$_3$ | Na | methanol | 30 | AH$_6$SP | 2.0 | 2.0 | 0.81 |
| 2-10 | $CH_3$ | i-Bu | —OC$_6$H$_5$ | Na | $CH_3OH$ | 86 | $H_2SO_4$ | 1.0 | 2 | 0.65 |
| 2-11 | $CH_3$ | $CH_3$ | —SC$_6$H$_5$ | K | $CH_3OH$ | 87 | AH$_6$SP | 4.0 | 2 | 0.53 |
| 2-12 | $CH_3$ | —CH$_2$—C(CH$_3$)$_2$—OCH$_3$ | —SC$_6$H$_5$ | K | $CH_3OH$ | 79 | AH$_6$SP | 4.0 | 2 | 0.59 |
| 2-13 | $CH_3$ | i-Bu | —SC$_6$H$_5$ | Na | $CH_3OH$ | 64 | AH$_6$SP | 4.0 | 1.7 | 0.459 |
| 2-14 | $CH_3$ | —CH$_2$—C(CH$_3$)$_2$—OCH$_3$ | —S—C$_6$H$_4$—C(CH$_3$)$_3$ | K | $CH_3OH$ | 62 | AH$_6$SP | 4.0 | 2 | 0.70 |
| 2-15 | $CH_3$ | —CH$_2$—C(CH$_3$)$_2$—OCH$_3$ | —SC$_8$H$_{17}$ | K | $CH_3OH$ | 73 | AH$_6$SP | 2.0 | 2 | 0.816 |
| 2-16 | $CH_3$ | i-Bu | —S—C$_6$H$_4$—C(CH$_3$)$_3$ | Na | $CH_3OH$ | 20 | AH$_6$SP | 4.0 | 2 | 0.60 |
| 2-17 | $CH_3$ | i-Bu | —S—CCH$_3$ (O) | Na | $CH_3OH$ | 33 | AH$_6$SP | 4.0 | 2 | 1.06 |
| 2-18 | $CH_3$ | i-Bu | —SCN | NaSCN | 75% aq. i-PrOH | 25 | AH$_6$SP | 4.0 | 2.0 | 0.91 |
| 2-19 | $CH_3$ | i-Bu | —NCS | NaSCN | 75% aq. i-PrOH | 35 | AH$_6$SP | 4.0 | 2.0 | 0.622 |
| 2-20 | $CH_3$ | i-Bu | —NCO | KOCN | 70% aq. i-PrOH | 55 | AH$_6$SP | 4.0 | 2.0 | 0.72 |
| 2-21 | $CH_3$ | $CH_3$ | —SCN | NaSCN | 75% aq. i-PrOH | 52.5 | AH$_6$SP | 2.0 | 2.0 | 1.07 |
| 2-22 | $CH_3$ | $CH_3$ | —NCO | KOCN | 70% aq. i-PrOH | 26 | AH$_6$SP | 2.0 | 2.0 | 1.04 |
| 2-23 | $CH_3$ | $C_2H_5$ | —NCO | KOCN | 70% aq. i-PrOH | 61 | AH$_6$SP | 2.0 | 2.0 | 0.75 |
| 2-24 | —(CH$_2$)$_5$— | | —NCO | KOCN | 70% aq. i-PrOH | 61 | AH$_6$SP | 2.0 | 2.0 | 0.94 |

"halo" denotes Cl, Br and the like

Example 3

Preparation of Symmetrical Azo Compounds From α,α'-Di-isocyanato And α,α'-Di-isothiocyanato-azo-hydrocarbon Compounds And Their Use In Preparing Polyester Foams $\left(Y= -NH-\overset{X}{\underset{\|}{C}}-Q\right)$

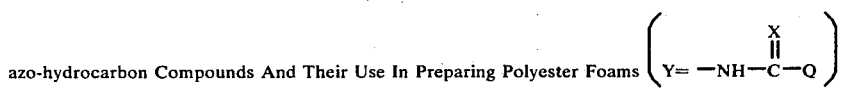

$$XCN-\underset{R^7}{\overset{R^6}{\underset{|}{C}}}-N=N-\underset{R^7}{\overset{R^6}{\underset{|}{C}}}-NCX + 2QH \longrightarrow Y-\underset{R^7}{\overset{R^6}{\underset{|}{C}}}-N=N-\underset{R^7}{\overset{R^6}{\underset{|}{C}}}-Y$$

| | SYNTHESIS DATA | | | | | | FOAMING DATA | | | |
|---|---|---|---|---|---|---|---|---|---|---|
| Example | R⁶ | R⁷ | X | Q | Solvent | % Yield | Activator | Parts Activator | Parts Azo | Foam Density |
| 3-1 | CH₃ | CH₃ | O | —NH—NH—C₆H₅ | pentane | 54 | AH₆SP | 1.0 | 0.4 | 1.03 |
| 3-2 | CH₃ | CH₃ | O | —O—CH(CH₃)₂ | isopropanol | * | AH₆SP | 2.0 | 2.0 | 0.88 |
| 3-3 | CH₃ | i-Bu | O | —NH-i-Bu | pentane | 59 | AH₆SP | 2.0 | 2.0 | 0.99 |
| 3-4 | CH₃ | i-Bu | S | —NH-i-Bu | pentane | 85 | AH₆SP | 2.4 | 1.2 | 0.95 |
| 3-5 | CH₃ | C₂H₅ | O | —NH—NH—C(CH₃)₃ | pentane | 33 | AH₆SP | 1.0 | 2.0 | 1.04 |
| 3-6 | CH₃ | C₂H₅ | O | —OCH₃ | methanol | 28 | AH₆SP | 2.0 | 1.4 | 0.87 |
| 3-7 | —(CH₂)₅— | | O | —NHC₆H₁₁ | pentane | 54 | AH₆SP | 2.0 | 2.0 | 1.05 |
| 3-8 | —(CH₂)₅— | | O | —NH—NH—C₆H₅ | pentane | 57 | H₃PO₄ | 2.0 | 2.0 | 1.06 |
| 3-9 | —(CH₂)₅— | | O | —OCH₃ | methanol | 33 | none | — | 2.0 | 1.05 |

*By-product of isocyanate reaction

Example 4

Preparation of Unsymmetrical α-Halozaohydrocarbon Compounds and Their Use in Preparing Polyester Foams $$R^5-NH-N=\underset{R^7}{\overset{R^6}{\underset{|}{C}}} + Y_2 \xrightarrow{Et_3N} R^5-N=N-\underset{X}{\overset{R^6}{\underset{|}{C}}}-R^7 + Et_3N \cdot HY$$

| | SYNTHESIS DATA | | | | | | FOAMING DATA | | | |
|---|---|---|---|---|---|---|---|---|---|---|
| Example | R⁵ | R⁶ | R⁷ | Y | Solvent | % Yield | Activator | Parts Activator | Parts Azo | Foam Density |
| 4-1 | (CH₃)₃C | CH₃ | CH₃ | Cl | pentane | 94 | H₃PO₄ | 3.0 | 2 | 0.45 |
| 4-2 | (CH₃)₃C | CH₃ | i-Bu | Cl | pentane | 91 | H₃PO₄ | 3.0 | 2 | 0.53 |
| 4-3 | (CH₃)₃C | —(CH₂)₅— | | Cl | pentane | 93 | H₃PO₄ | 4.0 | 2 | 0.54 |
| 4-4 | (CH₃)₃C | CH₃ | CH₃ | Br | pentane | 74 | H₃PO₄ | 0.6 | 2 | 0.72 |
| 4-5 | (CH₃)₃C | —(CH₂)₄— | | Cl | pentane | 86 | AH₆SP | 4.0 | 4.0 | 0.44 |
| 4-6 | (CH₃)₃C | CH₃ | C₆H₅ | Cl | pentane | 99 | H₃PO₄ | 2.0 | 2.0 | 0.61 |
| 4-7 | (CH₃)₃C | CH₃ | —CH₂—C(CH₃)₂—OCH₃ | Cl | pentane | 70 | H₃PO₄ | 3.0 | 2 | 0.71 |
| 4-8 | (CH₃)₃C | i-Bu | i-Bu | Cl | pentane | 95 | H₃PO₄ | 4.0 | 2.0 | 0.70 |
| 4-9 | (CH₃)₃C | CH₃ | —CH(CH₂)(CH₂) | Cl | pentane | 85 | H₃PO₄ | 4.0 | 2.0 | 0.99 |
| 4-10 | (CH₃)₃C | CH₃ | —CH₂—CH₂—COCH₂—CH=CH₂ | Cl | pentane | 98 | H₃PO₄ | 4.0 | 2.0 | 0.77 |
| 4-11 | (CH₃)₃C | | adamantyl group | Cl | pentane | 97 | H₃PO₄ | 4.0 | 2.0 | 0.66 |
| 4-12 | (CH₃)₃C | CH₃ | CH₂C₆H₅ | Cl | pentane | 92 | H₃PO₄ | 4.0 | 2.0 | 0.54 |
| 4-13 | (CH₃)₃C | CH₃ | CH₂CH₂C₆H₅ | Cl | pentane | 91 | H₃PO₄ | 4.0 | 2.0 | 0.58 |
| 4-14 | (CH₃)₃C | —(CH₂)₇— | | Cl | pentane | 82 | H₃PO₄ | 4.0 | 2.0 | 0.87 |
| 4-15 | (CH₃)₃C | C₂H₅ | C₂H₅ | Cl | pentane | 87 | H₃PO₄ | 4.0 | 2.0 | 0.60 |
| 4-16 | C₆H₅—C(CH₃)₂— | CH₃ | —CH₂—CH₂—CO$_n$C₄H₉ | Cl | pentane | 95 | H₃PO₄ | 4.0 | 2.0 | 0.77 |
| 4-17 | norbornyl—C(CH₃)(H)— | CH₃ | CH₃ | Cl | pentane | 80 | ACSP* | 2.0 | 2.0 | 1.11 |

Example 4-continued

Preparation of Unsymmetrical α-Halozaohydrocarbon Compounds and Their Use in Preparing Polyester Foams $$R^5-NH-N=C\begin{matrix}R^6\\R^7\end{matrix} + Y_2 \xrightarrow{Et_3N} R^5-N=N-\underset{X}{\overset{R^6}{C}}-R^7 + Et_3N \cdot HY$$

| | SYNTHESIS DATA | | | | | | FOAMING DATA | | | |
|---|---|---|---|---|---|---|---|---|---|---|
| Example | $R^5$ | $R^6$ | $R^7$ | Y | Solvent | % Yield | Activator | Parts Activator | Parts Azo | Foam Density |
| 4-18 | cyclopentyl | —(CH$_2$)$_5$— | | Cl | pentane | 79 | NONE | — | 2.0 | 1.11 |
| 4-19 | (CH$_3$)$_2$CHCH$_2$CH(CH$_3$)— | CH$_3$ | C$_2$H$_5$ | Cl | pentane | 51 | ACSP | 2.0 | 2.0 | 1.10 |
| 4-20 | C$_2$H$_5$—CH(CH$_3$)— | CH$_3$ | C$_2$H$_5$ | Cl | pentane | 64 | ACSP | 2.0 | 2.0 | 1.08 |
| 4-21 | cyclohexyl | CH$_3$ | C$_2$H$_5$ | Cl | pentane | 74 | ACSP | 2.0 | 2.0 | 0.88 |
| 4-22 | cyclohexyl | —(CH$_2$)$_5$— | | Cl | pentane | 99 | H$_3$PO$_4$ | 2.0 | 2.0 | 1.03 |
| 4-23 | C$_6$H$_5$—CH(CH$_3$)— | CH$_3$ | CH$_3$ | Cl | pentane | 87 | H$_3$PO$_4$ | 4.0 | 2.0 | 0.87 |
| 4-24 | (CH$_3$)$_2$CHCH$_2$CH(CH$_3$)— | CH$_3$ | i-Bu | Cl | pentane | 91 | AH$_6$SP | 2.0 | 2.0 | 0.69 |
| 4-25 | (CH$_3$)$_2$CHCH$_2$CH(CH$_3$)— | CH$_3$ | CH$_3$ | Cl | pentane | 91 | ACSP | 2.0 | 2.0 | 1.14 |
| 4-26 | (CH$_3$)$_2$CHCH$_2$CH(CH$_3$)— | —(CH$_2$)$_5$— | | Cl | pentane | 96 | AH$_6$SP | 2.0 | 2.0 | 0.61 |
| 4-27 | cyclohexyl | CH$_3$ | CH$_3$ | Cl | pentane | 89 | H$_3$PO$_4$ | 4.0 | 2.0 | 0.91 |
| 4-28 | cyclohexyl | CH$_3$ | i-Bu | Cl | pentane | 94 | ACSP | 2.0 | 2.0 | 0.88 |
| 4-29 | (CH$_3$)$_2$CH— | CH$_3$ | i-Bu | Cl | pentane | 93 | ACSP | 2.0 | 2.0 | 0.96 |
| 4-30 | (CH$_3$)$_2$CH— | CH$_3$ | —CH$_2$—C(CH$_3$)$_2$—O—CH$_3$ | Cl | pentane | 75 | ACSP | 2.0 | 2.0 | 1.05 |
| 4-31 | (CH$_3$)$_2$CHCH$_2$CH(CH$_3$)— | CH$_3$ | —CH$_2$—C(CH$_3$)$_2$—O—CH$_3$ | Cl | pentane | 80 | ACSP | 2.0 | 2.0 | 0.79 |
| 4-32 | cyclohexyl | CH$_3$ | —CH$_2$—C(CH$_3$)$_2$—O—CH$_3$ | Cl | pentane | 96 | ACSP | 2.0 | 2.0 | 0.80 |
| 4-33 | C$_2$H$_5$—CH(CH$_3$)— | CH$_3$ | i-Bu | Cl | pentane | 88 | ACSP | 2.0 | 2.0 | 0.81 |
| 4-34 | C$_2$H$_5$—CH(CH$_3$)— | CH$_3$ | —CH$_2$—C(CH$_3$)$_2$—O—CH$_3$ | Cl | pentane | 91 | ACSP | 2.0 | 2.0 | 0.84 |

Example 4-continued

Preparation of Unsymmetrical α-Halozaohydrocarbon Compounds and Their Use in Preparing Polyester Foams $$R^5-NH-N=C\begin{matrix}R^6\\ \\R^7\end{matrix} + Y_2 \xrightarrow{Et_3N} R^5-N=N-\underset{X}{\overset{R^6}{\underset{|}{C}}}-R^7 + Et_3N \cdot HY$$

| | SYNTHESIS DATA | | | | | | FOAMING DATA | | | |
|---|---|---|---|---|---|---|---|---|---|---|
| Example | $R^5$ | $R^6$ | $R^7$ | | Y | Solvent | % Yield | Activator | Parts Activator | Parts Azo | Foam Density |
| 4-35 | $C_6H_5-\underset{CH_3}{\underset{|}{CH}}-$ | | $-(CH_2)_5-$ | | Cl | pentane | 96 | ACSP | 2.0 | 2.0 | 0.96 |
| 4-36 | $C_6H_5-\underset{CH_3}{\underset{|}{CH}}-$ | $CH_3$ | i-Bu | | Cl | pentane | 68 | ACSP | 2.0 | 2.0 | 0.84 |
| 4-37 | $C_6H_5-\underset{CH_3}{\underset{|}{CH}}-$ | $CH_3$ | $CH_3$ | | Cl | pentane | 80 | ACSP | 2.0 | 2.0 | 1.01 |
| 4-38 | $(CH_3)_2CHCH_2\underset{CH_3}{\underset{|}{CH}}-$ | $CH_3$ | $C_2H_5$ | | Br | pentane | 85 | NONE | — | 2.0 | 1.00 |
| 4-39 | $C_6H_5$ | $CH_3$ | $CH_3$ | | Cl | $CH_2Cl_2$ | >100 | $AH_6SP$ | 4.0 | 4.0 | 0.47 |
| 4-40 | $C_6H_5$ | $CH_3$ | i-Bu | | Cl | $CH_2Cl_2$ | >100 | $AH_6SP$ | 2.0 | 2.0 | 0.73 |
| 4-41 | $C_6H_5$ | | $-(CH_2)_5-$ | | Cl | $CH_2Cl_2$ | 77 | $AH_6SP$ | 2.0 | 2.0 | 0.86 |

"Halo" denotes Cl, Br, and the like

Example 5

Preparation of Unsymmetrical Azo Foaming Agents from α-Halo-azo-hydrocarbon Compounds And Their Use in Preparing Polyester Foams

$$R^5-N=N-\underset{\underset{Cl}{|}}{\overset{\overset{R^6}{|}}{C}}-R^7 + MY \longrightarrow R^5-N=N-\underset{\underset{Y}{|}}{\overset{\overset{R^6}{|}}{C}}-R^7 + MCl$$

| | | | SYNTHESIS DATA | | | | | FOAMING DATA | | |
|---|---|---|---|---|---|---|---|---|---|---|
| Example | $R^5$ | $R^6$ | $R^7$ | Y | M | Solvent | % Yield | Activator | Parts Activator | Parts Azo | Foam Density |
| 5-1 | $(CH_3)_3C$ | $CH_3$ | $CH_3$ | $-OCH_3$ | K | $CH_3OH$ | 95 | $H_3PO_4$ | 3.75 | 2.0 | 0.37 |
| 5-2 | $(CH_3)_3C$ | $CH_3$ | i-Bu | $-OCH_3$ | K | $CH_3OH$ | 84 | $H_3PO_4$ | 2.50 | 2.0 | 0.40 |
| 5-3 | $(CH_3)_3C$ | $CH_3$ | $-CH_2-\underset{\underset{CH_3}{|}}{\overset{\overset{CH_3}{|}}{C}}-O-CH_3$ | $-OCH_3$ | K | $CH_3OH$ | 81 | $H_3PO_4$ | 1.75 | 2.0 | 0.41 |
| 5-4 | $(CH_3)_3C\overset{CH_3}{\underset{CH_3}{|}}$ | $CH_3$ | $-(CH_2)_5-CH_3$ | $-OCH_3$ | K | $CH_3OH$ | 85 | $H_3PO_4$ | 3.50 | 2.0 | 0.42 |
| 5-5 | $C_6H_5-\underset{\underset{CH_3}{|}}{\overset{\overset{CH_3}{|}}{C}}-$ | $CH_3$ | $CH_3$ | $-OCH_3$ | K | $CH_3OH$ | 75 | $H_3PO_4$ | 3.0 | 2.0 | 0.56 |
| 5-6 | $C_6H_5-\underset{\underset{CH_3}{|}}{\overset{\overset{CH_3}{|}}{C}}-$ | $CH_3$ | i-Bu | $-OCH_3$ | K | $CH_3OH$ | 65 | $H_3PO_4$ | 3.0 | 2.0 | 0.53 |
| 5-7 | $(CH_3)_3C$ | $CH_3$ | n-$C_6H_{13}$ | $-OCH\underset{CH_3}{\overset{CH_3}{|}}$ | K | $CH_3OH$ | 97 | $H_3PO_4$ | 3.0 | 2.0 | 0.53 |
| 5-8 | $(CH_3)_3C$ | $CH_3$ | $CH_3$ | $-O-CH\underset{CH_3}{\overset{CH_3}{|}}$ | K | i-PrOH | 42 | $H_3PO_4$ | 3.0 | 2.0 | 0.56 |
| 5-9 | $(CH_3)_3C$ | $CH_3$ | i-Bu | $-O-CH\underset{CH_3}{\overset{CH_3}{|}}$ | K | i-PrOH | 55 | $H_3PO_4$ | 3.0 | 2.0 | 0.71 |
| 5-10 | $(CH_3)_3C$ | $CH_3$ | $-\underset{\underset{CH_3}{|}}{\overset{\overset{CH_3}{|}}{C}}-\overset{O}{\overset{\|}{C}}-\underset{\underset{CH_3}{|}}{\overset{\overset{CH_3}{|}}{C}}-$ | $-OCH_3$ | K | $CH_3OH$ | 85 | $AH_6SP$ | 1.0 | 2.0 | 1.0 |
| 5-11 | $(CH_3)_3C$ | $CH_3$ | $-(CH_2)_4-$ | $-OCH_3$ | K | $CH_3CH$ | 83 | $H_3PO_4$ | 2.0 | 2.0 | 0.45 |
| 5-12 | $(CH_3)_3C$ | $CH_3$ | $C_6H_5$ | $-OCH_3$ | K | $CH_3OH$ | 73 | $H_3PO_4$ | 2.0 | 2.0 | 0.53 |
| 5-13 | $(CH_3)_3C$ | $CH_3$ | $-\overset{O}{\overset{\|}{C}}-$ | $-OCH_3$ | K | $CH_3OH$ | 70 | $H_3PO_4$ | 2.0 | 2.0 | 0.44 |
| 5-14 | cyclohexyl-$CH_3$ | | $-CH_2CH_2OOH$ $-(CH_2)_5-$ | $OCH_3$ | Na | $CH_3OH$ | 72 | $H_3PO_4$ | 2.0 | 4.0 | 0.74 |

Example 5-continued

Preparation of Unsymmetrical Azo Foaming Agents from α-Halo-azo-hydrocarbon Compounds
And Their Use in Preparing Polyester Foams $$R^5-N=N-\underset{\underset{Cl}{|}}{\overset{\overset{R^6}{|}}{C}}-R^7 + MY \longrightarrow R^5-N=N-\underset{\underset{Y}{|}}{\overset{\overset{R^6}{|}}{C}}-R^7 + MCl$$

| | SYNTHESIS DATA | | | | | | | FOAMING DATA | | |
|---|---|---|---|---|---|---|---|---|---|---|
| Example | $R^5$ | $R^6$ | $R^7$ | Y | M | Solvent | % Yield | Activator | Parts Activator | Parts Azo | Foam Density |
| 5-15 | $C_6H_5-\underset{\underset{CH_3}{|}}{CH}-$ | $CH_3$ | $CH_3$ | $-OCH_3$ | Na | $CH_3OH$ | 77 | $AH_6SP$ | 2.0 | 2.0 | 0.61 |
| 5-16 | $(CH_3)_2CHCH_2\underset{\underset{CH_3}{|}}{CH}-$ | $CH_3$ | i-Bu | $-OCH_3$ | Na | $CH_3OH$ | 76 | ACSP | 2.0 | 2.0 | 1.03 |
| 5-17 | $(CH_3)_2CHCH_2\underset{\underset{CH_3}{|}}{CH}-$ | $CH_3$ | $CH_3$ | $-OCH_3$ | Na | $CH_3OH$ | 94 | $AH_6SP$ | 4.0 | 2.0 | 0.34 |
| 5-18 | cyclopentyl | $-(CH_2)_4-$ | | $OCH_3$ | Na | $CH_3OH$ | 45 | $H_3PO_4$ | 2.5 | 2.0 | 0.87 |
| 5-19 | $(CH_3)_2CHCH_2\underset{\underset{CH_3}{|}}{CH}-$ | $-(CH_2)_5-$ | | $-OCH_3$ | Na | $CH_3OH$ | 91 | $AH_6SP$ | 2.0 | 2.0 | 0.59 |
| 5-20 | cyclohexyl | $CH_3$ | $CH_3$ | $-OCH_3$ | Na | $CH_3OH$ | 82 | $H_3PO_4$ | 4.0 | 2.0 | 0.74 |
| 5-21 | methylcyclohexyl | $CH_3$ | i-Bu | $-OCH_3$ | Na | $CH_3OH$ | 89 | ACSP | 2.0 | 2.0 | 0.92 |
| 5-22 | $\underset{\underset{CH_3}{|}}{CH_3}\underset{}{CH}-$ | CH | i-Bu | $-OCH_3$ | Na | $CH_3OH$ | 91 | ACSP | 2.0 | 2.0 | 1.00 |
| 5-23 | $\underset{\underset{CH_3}{|}}{CH_3}\underset{}{CH}-$ | $CH_3$ | $-CH_2-\underset{\underset{CH_3}{|}}{\overset{\overset{CH_3}{|}}{C}}-O-CH_3$ | $-OCH_3$ | Na | $CH_3OH$ | 83 | ACSP | 2.0 | 2.0 | 0.99 |
| 5-24 | $(CH_3)_2CHCH_2\underset{\underset{CH_3}{|}}{CH}-$ | $CH_3$ | $-CH_2-\underset{\underset{CH_3}{|}}{\overset{\overset{CH_3}{|}}{C}}-O-CH_3$ | $-OCH_3$ | Na | $CH_3OH$ | 78 | ACSP | 2.0 | 2.0 | 1.06 |

Example 5-continued

Preparation of Unsymmetrical Azo Foaming Agents from α-Halo-azo-hydrocarbon Compounds And Their Use in Preparing Polyester Foams

$$R^5-N=N-\overset{R^6}{\underset{Cl}{C}}-R^7 + MY \longrightarrow R^5-N=N-\overset{R^6}{\underset{Y}{C}}-R^7 + MCl$$

| Example | R⁵ | R⁶ | R⁷ | Y | M | Solvent | % Yield | Activator | Parts Activator | Parts Azo | Foam Density |
|---|---|---|---|---|---|---|---|---|---|---|---|
| 5-25 | cyclohexyl | CH₃ | —CH₂—C(CH₃)₂—O—CH₃ | —OCH₃ | Na | CH₃OH | 79 | ACSP | 2.0 | 2.0 | 1.02 |
| 5-26 | C₂H₅—CH(CH₃)— | CH₃ | i-Bu | —OCH₃ | Na | CH₃OH | 93 | ACSP | 2.0 | 2.0 | 0.92 |
| 5-27 | C₂H₅—CH(CH₃)— | CH₃ | —CH₂—C(CH₃)₂—O—CH₃ | —OCH₃ | Na | CH₃OH | 89 | ACSP | 2.0 | 2.0 | 1.02 |
| 5-28 | C₆H₅—CH(CH₃)— | CH₃ | —(CH₂)₅— | —OCH₃ | Na | CH₃OH | 87 | ACSP | 2.0 | 2.0 | 0.97 |
| 5-29 | C₆H₅—CH(CH₃)— | CH₃ | i-Bu | —OCH₃ | Na | CH₃OH | 61 | ACSP | 2.0 | 2.0 | 1.00 |
| 5-30 | C₆H₅—CH₂—Cl* | CH₃ | i-Bu | —OCH₃ | K | CH₃OH | 79 | AH₆SP | 2.0 | 2.0 | 0.78 |
| 5-31 | C₂H₅—CH₂—Cl* | CH₃ | —(CH₂)₅— | —OCH₃ | K | CH₃OH | 78 | AH₆SP | 2.0 | 2.0 | 0.81 |
| 5-32 | (CH₃)₃C | CH₃ | CH₃ | =O | Na | =O | 95 | H₃PO₄ | 3.75 | 2.0 | 0.35 |
| 5-33 | (CH₃)₃C | CH₃ | i-Bu | —OCCH₃ (=O) | Na | HOCCH₃ (=O) | 80 | H₃PO₄ | 2.50 | 2.0 | 0.42 |
| 5-34 | (CH₃)₃C | CH₃ | —CH₂—C(CH₃)₂—O—CH₃ | —OCCH₃ (=O) | Na | HOCCH₃ (=O) | 75 | H₃PO₄ | 1.25 | 2.0 | 0.47 |
| 5-35 | (CH₃)₃C | | —(CH₂)₅— | —OCCH₃ (=O) | Na | HOCCH₃ (=O) | 75 | H₃PO₄ | 3.00 | 2.0 | 0.47 |
| 5-36 | (CH₃)₃C | | —(CH₂)₅— | —OCCH₃ (=O) | Na | HOCCH₃ (=O) | 76 | H₃PO₄ | 4.0 | 2.0 | 0.51 |
| 5-37 | (CH₃)₃C | | —(CH₂)₅— | —OCCH₂CH₃ (=O) | Na | HOCCH₂CH₃ (=O) 50% aq. i-PrOH | 54 | H₃PO | 6.0 | 2.0 | 0.72 |
| 5-38 | (CH₃)₃C | CH₃ | i-Bu | —OCC₆H₅ (=O) —OCH (=O) | Na | HOCH (=O) | 79 | H₃PO₄ | 3.2 | 2.0 | 0.49 |

Example 5-continued

Preparation of Unsymmetrical Azo Foaming Agents from α-Halo-azo-hydrocarbon Compounds And Their Use in Preparing Polyester Foams

$$R^5-N=N-\underset{\underset{Cl}{|}}{\overset{\overset{R^6}{|}}{C}}-R^7 + MY \longrightarrow R^5-N=N-\underset{\underset{Y}{|}}{\overset{\overset{R^6}{|}}{C}}-R^7 + MCl$$

| | | SYNTHESIS DATA | | | | | FOAMING DATA | | |
|---|---|---|---|---|---|---|---|---|---|
| Example | $R^5$ | $R^6$ | $R^7$ | Y | M | Solvent | % Yield | Activator | Parts Activator | Parts Azo | Foam Density |
| 5-39 | $(CH_3)_3C$ | $CH_3$ | $C_6H_5$ | $-OCCH_3$ (O=) | Na | $HOCCH_3$ (O=) | 66 | $H_3PO_4$ | 3.0 | 2.0 | 0.56 |
| 5-40 | $(CH_3)_3C$ | $\overset{CH_3}{\underset{CH_3}{C_6H_5-C-}}$ | $CH_3$ | $-OCCH_3$ (O=) | Na | $HOCCH_3$ (O=) | 90 | $H_3PO_4$ | 3.0 | 2.0 | 0.55 |
| 5-41 | $(CH_3)_3C$ | $\overset{CH_3}{\underset{CH_3}{-\overset{O=}{C}-\overset{CH_3}{\underset{CH_3}{C}}-}}$ | | $-OCCH_3$ (O=) | Na | $HOCCH_3$ (O=) | 80 | $H_3PO_4$ / $AH_6SP$ | 4.0 / 4.0 | 2.0 / 4.0 | 1.21 / 0.67 |
| 5-42 | $(CH_3)_3C$ | $-(CH_2)_4-$ | | $-OCCH_3$ (O=) | Na | $HOCCH_3$ (O=) | 87 | $H_3PO_4$ | 6.0 | 2.0 | 0.49 |
| 5-43 | $(CH_3)_3C$ | $-(CH_2)_5-$ | | $-OCCH_3$ (O=) | Na | $HOCCH_3$ (O=) | 90 | $H_3PO_4$ | 3.5 | 2.0 | 0.62 |
| 5-44 | $(CH_3)_3C$ | $-(CH_2)_5-$ | | $-OC-C=CH_2$ (O=, $CH_3$) | Na | 80% aq. dioxane | 74 | none | — | 2.0 | 0.88 |
| 5-45 | $(CH_3)_3C$ | $-(CH_2)_5-$ | | $-OCCCl_3$ (O=) | Na | 80% aq. dioxane | 51 | none | — | 2.0 | 0.85 |
| 5-46 | $(CH_3)_3C$ | $-(CH_2)_5-$ | | $-OCCF_3$ (O=) | Na | 80% aq. dioxane | 77 | none | — | 2.0 | 0.64 |
| 5-47 | $(CH_3)_3C$ | $CH_3$ | $CH_3$ | $-OCCH_2CN$ (O=) | Na | $HOC-C=CH_2$ (O=, $CH_3$) | 14 | $AH_6SP$ | 2.0 | 2.0 | 1.11 |
| 5-48 | cyclohexyl | $-(CH_2)_5-$ | | $-OCCHCl_2$ (O=) | Na | $HOCCHCl_2$ (O=) | 61 | $H_3PO_4$ | 4.0 | 2.0 | 0.78 |
| 5-49 | $(CH_3)_2CHCH_2\overset{CH_3}{\underset{}{CH-}}$ | $CH_3$ | i-Bu | $-OCCH_3$ (O=) | Na | $HOCCH_3$ (O=) | 63 | $AH_6SP$ | 2.0 | 2.0 | 0.53 |
| 5-50 | $(CH_3)_2CHCH_2\overset{CH_3}{\underset{}{CH-}}$ | $CH_3$ | $CH_3$ | $-OCCH_3$ (O=) | Na | $HOCCH_3$ (O=) | 85 | $AH_6SP$ | 4.0 | 2.0 | 0.30 |

Example 5-continued

Preparation of Unsymmetrical Azo Foaming Agents from α-Halo-azo-hydrocarbon Compounds And Their Use in Preparing Polyester Foams $$R^5-N\equiv N-\underset{\underset{Cl}{|}}{\overset{\overset{R^6}{|}}{C}}-R^7 + MY \longrightarrow R^5-N\equiv N-\underset{\underset{Y}{|}}{\overset{\overset{R^6}{|}}{C}}-R^7 + MCl$$

SYNTHESIS DATA / FOAMING DATA

| Example | $R^5$ | $R^6$ | $R^7$ | Y | M | Solvent | % Yield | Activator | Parts Activator | Parts Azo | Foam Density |
|---|---|---|---|---|---|---|---|---|---|---|---|
| 5-51 | $(CH_3)_2CHCH_2CH(CH_3)-$ | | $-(CH_2)_5-$ | $-OCCH_3$, $\|O$ | Na | $HOCCH_3$, $\|O$ | 86 | ACSP | 2.0 | 2.0 | 0.99 |
| 5-52 | cyclohexyl-CH₃ | $CH_3$ | $CH_3$ | $-OCCH_3$, $\|O$ | Na | $HOCCH_3$, $\|O$ | 79 | $H_3PO_4$ | 4.0 | 2.0 | 0.66 |
| 5-53 | cyclohexyl-CH₃ | $CH_3$ | i-Bu | $-OCCH_3$, $\|O$ | Na | $HOCCH_3$, $\|O$ | 91 | ACSP | 2.0 | 2.0 | 1.09 |
| 5-54 | cyclopentyl | | $-(CH_2)_5-$ | $-OCH$, $\|O$ | Na | $HOCH$, $\|O$ | 36 | ACSP | 2.0 | 2.0 | 0.64 |
| 5-55 | $C_6H_{5-n}Cl_n^*$ | $CH_3$ | i-Bu | $-OCCH_3$, $\|O$ | Na | $HOOCH_3$, $\|O$ | 88 | $AH_6SP$ | 2.0 | 2.0 | 0.73 |
| 5-56 | $C_6H_{5-n}Cl_n^*$ | | $-(CH_2)_5-$ | $-OCCH_3$, $\|O$ | Na | $HOCCH_3$, $\|O$ | 84 | $AH_6SP$ | 2.0 | 2.0 | 0.85 |
| 5-57 | $(CH_3)_3C$ | $CH_3$ | $CH_3$ | $-OC_6H_5$ | Na | $CH_3OH$ | 87 | $H_3PO_4$ | 6.0 | 2.0 | 0.61 |
| 5-58 | $(CH_3)_3C$ | $CH_3$ | i-Bu | $-OC_6H_5$ | Na | $CH_3OH$ | 88 | $H_3PO_4$ | 6.0 | 2.0 | 0.57 |
| 5-59 | $(CH_3)_3C$ | | $-(CH_2)_5-$ | $-OC_6H_5$ | Na | $CH_3OH$ | 83 | $H_3PO_4$ | 6.0 | 2.0 | 0.65 |
| 5-60 | $(CH_3)_3C$ | | $-(CH_2)_5-$ | $-O-$(biphenyl) | K | $CH_3OH$ | 64 | $H_3PO_4$ | 6.0 | 2.0 | 0.73 |
| 5-61 | $(CH_3)_3C$ | | $-(CH_2)_5-$ | $-OC_6Br_5$ | K | $CH_3OH$ | 58 | $H_3PO_4$ $H_3PO_4$ | 6.0 2.0 | 2.0 2.0 | 1.03 0.66 |

Example 5-continued

Preparation of Unsymmetrical Azo Foaming Agents from α-Halo-azo-hydrocarbon Compounds And Their Use in Preparing Polyester Foams $$R^5-N=N-\underset{\underset{Cl}{|}}{\overset{\overset{R^6}{|}}{C}}-R^7 + MY \longrightarrow R^5-N=N-\underset{\underset{Y}{|}}{\overset{\overset{R^6}{|}}{C}}-R^7 + MCl$$

| | | SYNTHESIS DATA | | | | | FOAMING DATA | | |
|---|---|---|---|---|---|---|---|---|---|
| Example | $R^5$ | $R^6$ $R^7$ | Y | M | Solvent | % Yield | Activator | Parts Activator | Parts Azo | Foam Density |
| 5-62 | $(CH_3)_3C$ | —$(CH_2)_5$— | ![2,4-dichlorophenoxy] | K | $CH_3OH$ | 81 | $H_3PO_4$ | 6.0 | 2.0 | 0.89 |
| 5-63 | $(CH_3)_3C$ | —$(CH_2)_5$— | ![3-methoxyphenoxy] | K | $CH_3OH$ | 78 | $H_3PO_4$ $H_3PO_4$ | 6.0 2.0 | 2.0 2.0 | 1.11 0.81 |
| 5-64 | $(CH_3)_3C$ | —$(CH_2)_5$— | ![3-chlorophenoxy] | K | $CH_3OH$ | 74 | $H_3PO_4$ $H_3PO_4$ | 6.0 2.0 | 2.0 2.0 | 0.83 0.81 |
| 5-65 | $(CH_3)_3C$ | —$(CH_2)_5$— | ![4-phenoxyphenoxy] —$OC_6H_5$ | K | $CH_3OH$ | 58 | $H_3PO_4$ $H_3PO_4$ | 6.0 2.0 | 2.0 2.0 | 1.08 1.02 |
| 5-66 5-67 | $(CH_3)_3C$ $(CH_3)_3C$ | $CH_3$ $C_6H_5$ —$(CH_2)_5$— | ![4-dodecylphenoxy] $C_{12}H_{25}$ | Na K | $CH_3OH$ $CH_3OH$ | 62 56 | $H_3PO_4$ $H_3PO_4$ $H_3PO_4$ | 2.0 6.0 2.0 | 2.0 2.0 2.0 | 0.63 1.16 1.14 |
| 5-68 | $(CH_3)_3C$ | —$(CH_2)_5$— | ![4-bromophenoxy] Br | K | $CH_3OH$ | 98 | $H_3PO_4$ | 6.0 | 2.0 | 0.75 |
| 5-69 | $(CH_3)_3C$ | —$(CH_2)_5$— | ![naphthyloxy] | K | $CH_3OH$ | 98 | $H_3PO_4$ | 6.0 | 2.0 | 0.70 |
| | | | ![4-methoxyphenoxy] —$OCH_3$ | | | | | | | |

Example 5-continued

Preparation of Unsymmetrical Azo Foaming Agents from α-Halo-azo-hydrocarbon Compounds And Their Use in Preparing Polyester Foams $$R^5-N=N-\underset{\underset{Cl}{|}}{\overset{\overset{R^6}{|}}{C}}-R^7 + MY \longrightarrow R^5-N=N-\underset{\underset{Y}{|}}{\overset{\overset{R^6}{|}}{C}}-R^7 + MCl$$

| | SYNTHESIS DATA | | | | | | | | FOAMING DATA | | |
|---|---|---|---|---|---|---|---|---|---|---|---|
| Example | $R^5$ | $R^6$ | $R^7$ | Y | M | Solvent | % Yield | Activator | Parts Activator | Parts Azo | Foam Density |
| 5-70 | $(CH_3)_3C$ | —$(CH_2)_5$— | | ![4-(C(CH3)2C6H5)-C6H4-O-] | K | $CH_3OH$ | 40 | $H_3PO_4$ $H_3PO_4$ $H_3PO_4$ | 6.0 2.0 1.0 | 2.0 2.0 2.0 | 1.18 1.16 1.14 |
| 5-71 | $(CH_3)_3C$ | —$(CH_2)_5$— | | ![4-Cl-C6H4-O-] | K | $CH_3OH$ | 54 | $H_3PO_4$ $H_3PO_4$ | 6.0 2.0 | 2.0 2.0 | 1.17 1.01 |
| 5-72 | $(CH_3)_3C$ | —$(CH_2)_5$— | | ![3-CH3-C6H4-O-] | K | $CH_3OH$ | 99 | $H_3PO_4$ | 6.0 | 2.0 | 0.46 |
| 5-73 | $\underset{CH_3}{\overset{CH_3}{CH}}CH_2-$ | —$(CH_2)_5$— | | —$OC_6H_5$ | K | $CH_3OH$ | 76 | None | — | 2.0 | 1.09 |
| 5-74 5-75 | $C_6H_{5-n}Cl_n{}^*$ $(CH_3)_3C$ | $CH_3$ $CH_3$ | $CH_3$ $CH_3$ | —$OC_6H_5$ —$SCH_2CH_2OH$ | K K | $CH_3OH$ $CH_3OH$ | 60 72 | ACSP $H_3PO_4$ | 2.0 6.0 | 2.0 2.0 | 0.77 0.70 |
| 5-76 | $(CH_3)_3C$ | $CH_3$ | i-Bu | —$SCH_2CH_2OH$ | K | $CH_3OH$ | 85 | $AH_6SP$ | 4.0 | 4.0 | 0.33 |
| 5-77 | $(CH_3)_3C$ | $CH_3$ | $-CH_2-\underset{\underset{CH_3}{|}}{\overset{\overset{CH_3}{|}}{C}}-O-CH_3$ | —$SCH_2CH_2OH$ | K | $CH_3OH$ | 67 | $H_3PO_4$ $H_3PO_4$ | 6.0 6.0 | 2.0 2.0 | 0.71 0.30 0.72 |
| 5-78 5-79 5-80 | $(CH_3)_3C$ $(CH_3)_3C$ $(CH_3)_3C$ | $CH_3$ $C_6H_5$ $CH_3$ | —$(CH_2)_5$— i-Bu | —$SCH_2CH_2OH$ —$SCH_2CH_2OH$ —$SCH_2CH_2OH_2CH_3$ | K K K | $CH_3OH$ $CH_3OH$ $CH_3OH$ | 88 64 97 | $H_3PO_4$ $H_3PO_4$ $H_3PO_4$ | 6.0 2.0 6.0 | 2.0 2.0 2.0 | 0.64 0.80 0.87 |
| 5-81 5-82 | $(CH_3)_3C$ $(CH_3)_3C$ | $CH_3$ $CH_3$ | i-Bu $-CH-\underset{\underset{CH_3}{|}}{\overset{\overset{CH_3}{|}}{C}}-CH_2-CH-\overset{CH_3}{\underset{CH_3}{|}}$ | —$SC_6H_5$ —$SC_6H_5$ | K Na | $CH_3OH$ $CH_3OH$ | 92 94 | $AH_6SP$ $AH_6SP$ | 4.0 4.0 | 4.0 4.0 | 0.35 0.36 0.43 |
| 5-83 | $(CH_3)_3C$ | $CH_3$ | —$CH_2-CH_2-\overset{O}{\underset{\|}{C}}OH$ | —$SC_6H_5$ | K | $CH_3OH$ | 87** | $AH_6SP$ | 4.0 | 4.0 | 0.52 |

Example 5-continued

Preparation of Unsymmetrical Azo Foaming Agents from α-Halo-azo-hydrocarbon Compounds
And Their Use in Preparing Polyester Foams $$R^5-N=N-\underset{\underset{Cl}{|}}{\overset{\overset{R^6}{|}}{C}}-R^7 + MY \longrightarrow R^5-N=N-\underset{\underset{Y}{|}}{\overset{\overset{R^6}{|}}{C}}-R^7 + MCl$$

| | SYNTHESIS DATA | | | | | | | FOAMING DATA | | |
|---|---|---|---|---|---|---|---|---|---|---|
| Example | $R^5$ | $R^6$ | $R^7$ | Y | M | Solvent | % Yield | Activator | Parts Activator | Parts Azo | Foam Density |
| 5-84 | $(CH_3)_3C$ | $CH_3$ | $-CH_2-CH_2-\overset{\overset{O}{\|\|}}{C}OH$ | | K | $CH_3OH$ | 80** | $AH_6SP$ | 4.0 | 4.0 | 0.49 |
| 5-85 | $(CH_3)_3C$ | $CH_3$ | $CH_3$ | $-S-\bigcirc-C(CH_3)_3$ | K | $CH_3OH$ | 80 | $AH_6SP$ | 4.0 | 4.0 | 0.47 |
| 5-86 | $(CH_3)_3C$ | $CH_3$ | i-Bu | $-S-\bigcirc-C(CH_3)_3$ | K | $CH_3OH$ | 92 | $AH_6SP$ | 4.0 | 4.0 | 0.48 |
| 5-87 | $(CH_3)_3C$ | $CH_3$ | $-CH_2-\underset{\underset{CH_3}{\|}}{\overset{\overset{CH_3}{\|}}{C}}-O-CH_3$ | $-S-\bigcirc-C(CH_3)_3$ | K | $CH_3OH$ | 85 | $AH_6SP$ | 4.0 | 4.0 | 0.40 |
| 5-88 | $(CH_3)_3C$ | $CH_3$ | i-Bu | $-SCH_2CH_2CH_3$ | K | $CH_3OH$ | 97 | $AH_6SP$ | 4.0 | 4.0 | 0.35 |
| 5-89 | $(CH_3)_3C$ | $CH_3$ | i-Bu | $-S(CH_2)_3CH_3$ | K | $CH_3OH$ | 99 | $AH_6SP$ | 4.0 | 4.0 | 0.46 |
| 5-90 | $(CH_3)_3C$ | $CH_3$ | $CH_3$ | $-SCH\underset{\underset{CH_3}{\|}}{\overset{\overset{CH_3}{\|}}{}}$ | K | $CH_3OH$ | 98 | $AH_6SP$ | 4.0 | 4.0 | 0.33 |
| 5-91 | $(CH_3)_3C$ | $CH_3$ | i-Bu | $-SCH\underset{\underset{CH_3}{\|}}{\overset{\overset{CH_3}{\|}}{}}$ | K | $CH_3OH$ | 96 | $AH_6SP$ | 4.0 | 4.0 | 0.32 |
| 5-92 | $(CH_3)_3C$ | $CH_3$ | $CH_3$ | $-SCH_2-\overset{\overset{O}{\|\|}}{C}H_2OOH$ | K | $CH_3OH$ | 99** | $AH_6SP$ | 4.0 | 4.0 | 0.30 |
| 5-93 | $(CH_3)_3C$ | $CH_3$ | $CH_3$ | $-S-\overset{\overset{O}{\|\|}}{C}CH_3$ | Na | $CH_3OH$ | 46 | $AH_6SP$ | 4.0 | 4.0 | 0.59 |

Example 5-continued

Preparation of Unsymmetrical Azo Foaming Agents from α-Halo-azo-hydrocarbon Compounds
And Their Use in Preparing Polyester Foams $$R^5-N=N-C(R^7)(Cl)-R^4 + MY \longrightarrow R^5-N=N-C(R^7)(Y)-R^6 + MCl$$

| | | SYNTHESIS DATA | | | | | FOAMING DATA | | |
|---|---|---|---|---|---|---|---|---|---|
| Example | $R^5$ | $R^6$  $R^7$ | Y | M | Solvent | % Yield | Activator | Parts Activator | Parts Azo | Foam Density |
| 5-94 | $(CH_3)_3C-$ | $-(CH_2)_5-$ | $-S(=O)(=O)-C_6H_5$ | Na | 70% aq. CH$_3$OH | 76 | AH$_6$SP | 4.0 | 4.0 | 0.48 |
| 5-95 | $(CH_3)_3C-$ | $CH_3$  $-CH_2-C(CH_3)_2-O-CH_3$ | $-S-t-Bu$ | K | CH$_3$OH | 90 | AH$_6$SP | 4.0 | 1.6 | 0.296 |
| 5-96 | $CH_3-CH(C_6H_5)-$ | $-(CH_2)_5-$ | $-S-C(=O)-CH_3$ | Na | CH$_3$OH | 89 | ACSP | 2.0 | 2.0 | 1.04 |
| 5-97 | $CH_3-CH(C_6H_5)-$ | $-(CH_2)_5-$ | $-S-C_6H_4-C(CH_3)_3$ | Na | CH$_3$OH | 63 | AH$_6$SP | 4.0 | 2.0 | 0.39 |
| 5-98 | $CH_3-CH(C_6H_5)-$ | $-(CH_2)_5-$ | $-S-CH_2-CH_2-OH$ | Na | CH$_3$OH | 74 | None | — | 2.0 | 1.16 |
| 5-99 | $(CH_3)_2CH-$ | $-(CH_2)_5-$ | $-S(=O)(=O)-C_6H_5$ | Na | 70% aq. CH$_3$OH | 60 | AH$_6$SP | 2.0 | 2.0 | 0.51 |
| 5-100 | $C_6H_{5-n}Cl_n^*$ | $CH_3$  $CH_3$ | $-S-C_6H_4-C(CH_3)_3$ | K | CH$_3$OH | 76 | ACSP | 2.0 | 2.0 | 0.87 |
| 5-101 | $C_6H_{5-n}Cl_n^*$ | $CH_3$  $CH_3$ | $-S-CH_2-CH_2-OH$ | K | CH$_3$OH | 60 | ACSP | 2.0 | 2.0 | 0.82 |

Example 5-continued

Preparation of Unsymmetrical Azo Foaming Agents from α-Halo-azo-hydrocarbon Compounds And Their Use in Preparing Polyester Foams $$R^5-N=N-\underset{\underset{Cl}{|}}{\overset{\overset{R^6}{|}}{C}}-R^7 + MY \longrightarrow R^5-N=N-\underset{\underset{Y}{|}}{\overset{\overset{R^6}{|}}{C}}-R^7 + MCl$$

| Example | R⁵ | R⁶ | R⁷ | Y | M | Solvent | % Yield | Activator | Parts Activator | Parts Azo | Foam Density |
|---|---|---|---|---|---|---|---|---|---|---|---|
| | | | | SYNTHESIS DATA | | | | | FOAMING DATA | | |
| 5-102 | $C_6H_{5-n}Cl_n$* | $CH_3$ | i-Bu | | K | $CH_3OH$ | 67 | $AH_6SP$ | 2.0 | 2.0 | 0.81 |
| 5-103 | $(CH_3)_3C$ | $CH_3$ | i-Bu | n-$C_4H_9NH$— | n-$C_4H_9NH_2$ | pentane | 88 | None | — | 2.0 | 0.70 |
| 5-104 | $(CH_3)_3C$ | | | —NCS | NaSCN | 75% aq i-PrOH | 75 | $AH_6SP$ | 4.0 | 4.0 | 0.53 |
| 5-105 | $(CH_3)_3C$ | | | —SCN | NaSCN | 75% aq i-PrOH | 85 | $AH_6SP$ | 4.0 | 2.0 | 0.74 |
| 5-106 | $(CH_3)_3C$ | | —(CH₂)₅— | —NCO | KOCN | 70% aq i-PrOH | 95 | None | — | 2.0 | 0.62 |
| 5-107 | $(CH_3)_3C$ | | —(CH₂)₅— | —NH—$C_6H_5$ | NaNH—$C_6H_5$ | dimethylformamide | 86 | None | — | 2.0 | 0.64 |
| 5-108 | $(CH_3)_3C$ | $CH_3$ | $CH_3$ | —NCO | KOCN | 70% aq. i-PrOH | 70 | $AH_6SP$ | 1.0 | 2.0 | 0.53 |
| 5-109 | $C_2H_5$—$\underset{\underset{CH_3}{\|}}{CH}$— | $CH_3$ | i-Bu | —NCO | KOCN | 70% aq. Acetone | 67 | None | 2.0 | 2.0 | 1.04 |
| 5-110 | $(CH_3)_2CHCH_2\underset{\underset{CH_3}{\|}}{CH}$— | $CH_3$ | $C_2H_5$ | —NCO | KOCN | 70% aq. Acetone | 80 | $AH_6SP$ | 2.0 | 2.0 | 0.40 |

*Phenylazo-α chloroalkane reactants were prepared in accordance with the method illustrated in Example 4 resulting in a mixture of compounds wherein R⁵ is phenyl, chlorophenyl, dichlorophenyl, and trichlorophenyl radicals (i.e. n=0, 1, 2 and 3), which mixture was used as such for indicated reactions in this example 5.
**Products and yields are for corresponding esters which were saponified to the free acids in 90–100% yields for foaming per this Example 5.
"Halo" denotes Cl, Br and the like.

Example 6

PREPARATION OF UNSYMMETRICAL AZO COMPOUNDS FROM α-ISOCYANATO and α-ISOTHIOCYANATO-AZO-HYDROCARBON COMPOUNDS and THEIR USE IN PREPARING POLYMER FOAMS $\left(Y = -NH-\overset{\overset{X}{\|}}{C}-Q\right)$

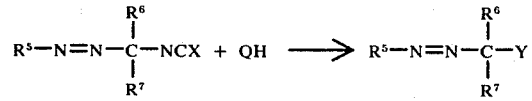

$$R^5-N=N-\underset{R^7}{\overset{R^6}{\underset{|}{C}}}-NCX + QH \longrightarrow R^5-N=N-\underset{R^7}{\overset{R^6}{\underset{|}{C}}}-Y$$

| | | SYNTHESIS DATA | | | | | FOAMING DATA | | | |
|---|---|---|---|---|---|---|---|---|---|---|
| EXAMPLE | $R^5$ | $R^6$ | $R^7$ | X | Q | % Yield | Activator | Parts Activator | Parts Azo | Foam Density |
| 6-1 | $(CH_3)_3C$ | | $-(CH_2)_5-$ | S | $-NH-C_6H_{11}$ | 95 | $AH_6SP$ | 2.0 | 2.0 | 0.54 |
| 6-2 | $(CH_3)_3C$ | | $-(CH_2)_5-$ | S | $-NH-i-C_4H_9$ | 97 | $AH_6SP$ | 2.0 | 2.0 | 0.64 |
| 6-3 | $(CH_3)_3C$ | | $-(CH_2)_5-$ | S | $-N(CH_3)-NH_2$ | 89 | $AH_6SP$ | 2.0 | 2.0 | 0.50 |
| 6-4 | $(CH_3)_3C$ | | $-(CH_2)_5-$ | S | $-N(C_2H_5)_2$ | 95 | $AH_6SP$ | 2.0 | 2.0 | 0.42 |
| 6-5 | $(CH_3)_3C$ | | $-(CH_2)_5-$ | S | $-NH-N(CH_3)_2$ | 88 | $AH_6SP$ | 4.0 | 2.0 | 0.438 |
| 6-6 | $(CH_3)_3C$ | | $-(CH_2)_5-$ | S | $-NH-CH_2-CH=CH_2$ | 94 | $AH_6SP$ | 2.0 | 2.0 | 0.54 |
| 6-7 | $(CH_3)_3C$ | | $-(CH_2)_5-$ | S | $-NH-C_6H_5$ | 97 | $AH_6SP$ | 2.0 | 2.0 | 0.50 |
| 6-8 | $(CH_3)_3C$ | | $-(CH_2)_5-$ | S | $-NH-NH-t-C_4H_9$ | 95 | $AH_6SP$ | 2.0 | 2.0 | 0.75 |
| 6-9 | $(CH_3)_3C$ | | $-(CH_2)_5-$ | S | $-NH-NH-\overset{\overset{O}{\|}}{C}-NH_2$ | 73 | $AH_6SP$ | 2.0 | 2.0 | 0.802 |
| 6-10 | $(CH_3)_3C$ | $CH_3$ | i-Bu | S | $-NH-C_4H_{9-n}$ | 88 | none | 0 | 2.0 | 0.65 |
| | | | | | | | $H_3PO_4$ | 0.3 | 2.0 | 0.45 |
| 6-11 | $(CH_3)_3C$ | | $-(CH_2)_7-$ | S | $-NH-C_4H_{9-n}$ | 73 | $AH_6SP$ | 2.0 | 2.0 | 0.68 |
| 6-12 | $(CH_3)_3C$ | $CH_3$ | $-CH<\begin{array}{c}CH_2\\CH_2\end{array}$ | S | $-NH-\underset{CH_3}{\overset{CH_3}{\underset{|}{C}}}-CH_2-\underset{CH_3}{\overset{CH_3}{\underset{|}{C}}}-CH_3$ | 76 | $AH_6SP$ | 2.0 | 2.0 | 0.74 |
| 6-13 | $(CH_3)_3C$ | $CH_3$ | $CH_2-CH_2-C_6H_5$ | S | $-NH-\text{cyclohexyl}$ | 76 | $AH_6SP$ | 2.0 | 2.0 | 0.45 |
| 6-14 | $(CH_3)_3C$ | $C_2H_5$ | $C_2H_5$ | S | $-N(C_2H_5)_2$ | 60 | $AH_6SP$ | 2.0 | 2.0 | 0.38 |
| 6-15 | $(CH_3)_3C$ | | $-(CH_2)_5-$ | S | $-OCH_3$ | 34 | $AH_6SP$ | 1.0 | 2.0 | 0.63 |
| 6-16 | $(CH_3)_3C$ | $CH_3$ | $-CH_2-C_6H_5$ | S | $-NH-i-Bu$ | 60 | $H_3PO_4$ | 4.0 | 2.0 | 0.91 |
| 6-17 | $(CH_3)_3C$ | $CH_3$ | $-CH_2-CH_2-\overset{\overset{O}{\|}}{C}(CH_2=CH-CH_2-O)$ | S | $-N(C_2H_5)_2$ | 61 | $AH_6SP$ | 2.0 | 2.0 | 0.48 |
| 6-18 | $(CH_3)_3C$ | | $-(CH_2)_5-$ | S | $-OC_2H_5$ | 52 | $AH_6SP$ | 2.0 | 2.0 | 0.41 |
| 6-19 | $(CH_3)_3C$ | | $-(CH_2)_5-$ | S | $-OCH(CH_3)$ | 28 | $AH_6SP$ | 1.0 | 2.0 | 0.87 |
| 6-20 | $C_6H_{5-n}Cl_n*$ | $CH_3$ | $CH_3$ | S | $-NH-t-Bu$ | 64 | none | — | 2.0 | 0.84 |
| 6-21 | $C_6H_{5-n}Cl_n*$ | | $-(CH_2)_5-$ | S | $-OCH_3$ | 62 | none | — | 2.0 | 1.00 |
| 6-22 | $(CH_3)_3C$ | | $-(CH_2)_5-$ | O | $-NH-i-C_4H_9$ | 97 | $AH_6SP$ | 2.0 | 2.0 | 0.53 |
| 6-23 | $(CH_3)_3C$ | | $-(CH_2)_5-$ | O | $-N(C_2H_5)_2$ | 96 | none | — | 2.0 | 0.85 |
| 6-24 | $(CH_3)_3C$ | | $-(CH_2)_5-$ | O | $-N(CH_3)-NH_2$ | 90 | none | — | 2.0 | 0.93 |
| 6-25 | $(CH_3)_3C$ | | $-(CH_2)_5-$ | O | $-NH-C_6H_5$ | 92 | none | — | 2.0 | 1.01 |
| 6-26 | $(CH_3)_3C$ | | $-(CH_2)_5-$ | O | $-NH_2$ | 90 | none | — | 2.0 | 0.96 |
| 6-27 | $(CH_3)_3C$ | | $-(CH_2)_5-$ | O | $-OCH_3$ | 91 | none | — | 2.0 | 0.83 |
| 6-28 | $(CH_3)_3C$ | | $-(CH_2)_7-$ | O | $-NH-i-C_4H_9$ | 29 | $H_3PO_4$ | 4.0 | 2.0 | 0.67 |
| 6-29 | $(CH_3)_3C$ | $C_2H_5$ | $C_2H_5$ | O | $-NH-i-C_4H_9$ | 59 | $AH_6SP$ | 2.0 | 2.0 | 0.26 |
| 6-30 | $(CH_3)_3C$ | $CH_3$ | $-CH_2-CH_2C_6H_5$ | O | $-NH-t-C_4H_9$ | 35 | $H_3PO_4$ | 4.0 | 2.0 | 1.01 |
| 6-31 | $(CH_3)_3C$ | $CH_3$ | $-CH_2-CH_2-C_6H_5$ | O | $-O-CH(CH_3)_2$ | ** | $AH_6SP$ | 2.0 | 1.0 | 1.03 |
| 6-32 | $(CH_3)_3C$ | i-Bu | i-Bu | O | $-NH-NH-C_6H_5$ | 80 | $AH_6SP$ | 4.0 | 2.0 | 0.447 |
| 6-33 | $(CH_3)_3C$ | $CH_3$ | $-CH_2-CH_2-\overset{\overset{O}{\|}}{C}(CH_2=CH-CH_2-O)$ | O | $-NH-NH-t-C_4H_9$ | 71 | $H_3PO_4$ | 4.0 | 2.0 | 0.788 |
| 6-34 | $(CH_3)_3C$ | | $-(CH_2)_5-$ | O | $-OC_2H_5$ | 80 | none | — | 2.0 | 0.69 |
| 6-35 | $(CH_3)_3C$ | | $-(CH_2)_5-$ | O | $-O-CH(CH_3)_2$ | 81 | none | — | 2.0 | 0.70 |
| 6-36 | $(CH_3)_3C$ | | $-(CH_2)_5-$ | O | $-O-t-C_4H_9$ | 22 | none | — | 2.0 | 0.44 |

Example 6-continued

PREPARATION OF UNSYMMETRICAL AZO COMPOUNDS FROM α-ISOCYANATO and α-ISOTHIOCYANATO-AZO-HYDROCARBON COMPOUNDS and THEIR USE IN PREPARING POLYMER FOAMS $\left( Y = -NH-\overset{X}{\underset{\|}{C}}-Q \right)$

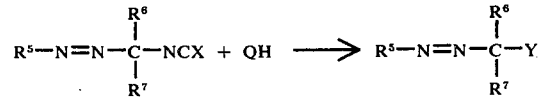

$$R^5-N=N-\underset{R^7}{\overset{R^6}{\underset{|}{\overset{|}{C}}}}-NCX + QH \longrightarrow R^5-N=N-\underset{R^7}{\overset{R^6}{\underset{|}{\overset{|}{C}}}}-Y$$

| | SYNTHESIS DATA | | | | | | FOAMING DATA | | | |
|---|---|---|---|---|---|---|---|---|---|---|
| EXAMPLE | $R^5$ | $R^6$ | $R^7$ | X | Q | % Yield | Activator | Parts Activator | Parts Azo | Foam Density |
| 6-37 | $(CH_3)_3C$ | | $-(CH_2)_7-$ | O | $-O-CH\begin{smallmatrix}CH_3\\ \\ CH_3\end{smallmatrix}$ | ** | none<br>$AH_6SP$ | —<br>2.0 | 2.0<br>2.0 | 1.05<br>0.63 |
| 6-38 | $(CH_3)_3C$ | $CH_3$ | $CH_3$ | O | $-OCH_3$ | 78 | $AH_6SP$ | 1.0 | 2.0 | 0.79 |
| 6-39 | $C_2H_5-CH-$<br>$\quad\;\;\;\;\;\;\;\;\;\;\;\;\;\;\;\|$<br>$\quad\;\;\;\;\;\;\;\;\;\;\;\;\;\;CH_3$ | $CH_3$ | i-Bu | O | $-OCH_3$ | 57 | none | — | 2.0 | 0.70 |
| 6-40 | $C_2H_5-CH-$<br>$\quad\;\;\;\;\;\;\;\;\;\;\;\;\;\;\;\|$<br>$\quad\;\;\;\;\;\;\;\;\;\;\;\;\;\;CH_3$ | $CH_3$ | i-Bu | O | $-NH-C_6H_{11}$ | 57 | none | — | 2.0 | 0.85 |
| 6-41 | $C_6H_{5-n}Cl_n{}^*$ | $CH_3$ | $CH_3$ | O | $-NH-t-Bu$ | 59 | $AH_6SP$ | 2.0 | 2.0 | 0.72 |
| 6-42 | $C_6H_{5-n}Cl_n{}^*$ | $CH_3$ | i-Bu | O | $-NH-t-Bu$ | 49 | none | — | 2.0 | 0.90 |
| 6-43 | $C_6H_{5-n}Cl_n{}^*$ | | $-(CH_2)_5-$ | O | $-OCH_3$ | 75 | $AH_6SP$ | 2.0 | 2.0 | 0.69 |

*Phenylazo-α-chloroalkane reactants were prepared in accordance with the method illustrated in Example 4 resulting in a mixture of compounds wherein $R^5$ is phenyl, chlorophenyl, dichlorophenyl, and trichlorophenyl radicals (i.e., n=0,1,2 and 3), which mixture was used as such for indicated reactions in this Example 6.
**By-product of isocyanate reaction
Synthesis Solvent was: methanol for Examples 4-15,-21,-27,-38,-39 and 43; ethanol for Examples 6-18 and 34; isopropanol for Examples 6-19,-31,-35, and-37; t-butanol for Example 6-36; and pentane for all other Examples.

Example 7

Preparation of Symmetrical Bis(azohydrocarbon) Compounds from α Haloazohydrocarbon Compounds and their use in Preparing Polyester Foams

$$R^5-N=N-\underset{R^7}{\overset{R^6}{\underset{|}{\overset{|}{C}}}}-Cl + M_2Y \longrightarrow R^5-N=N-\underset{R^7}{\overset{R^6}{\underset{|}{\overset{|}{C}}}}-Y-\underset{R^7}{\overset{R^6}{\underset{|}{\overset{|}{C}}}}-N=N-R^5 + MCl$$

| | SYNTHESIS DATA | | | | | | | FOAMING DATA | | |
|---|---|---|---|---|---|---|---|---|---|---|
| Example | $R^5$ | $R^6$ | $R^7$ | Y | $M_2Y$ | Solvent | % Yield | Activator | Parts Activator | Parts Azo | Foam Density |
| 7-1 | $(CH_3)_3C$ | $CH_3$ | $CH_3$ | S | $Na_2S$ | 75%aq.MeOH | 30 | $AH_6SP$ | 4.0 | 4.0 | 0.42 |
| 7-2 | $(CH_3)_3C$ | $CH_3$ | i-Bu | S | $Na_2S$ | 75%aq.MeOH | 80 | $AH_6SP$ | 1.0 | 1.0 | 0.83 |
| 7-3 | $CH_3\diagdown$<br>$\;\;\;\;\;\;\;\;CH-$<br>$CH_3\diagup$ | | $-(CH_2)_5-$ | $-\overset{O}{\underset{\|}{O}}C(CH_2)_2\overset{O}{\underset{\|}{C}}O-$ | $\left(\underset{NaOCCH_2}{\overset{O}{\underset{\|}{\|}}}\right)_2$ | N,N-Dimethyl-Formamide | 61 | $AH_6SP$ | 2.0 | 2.0 | 0.60 |

"Halo" denotes Cl, Br, and the like

Example 8

Preparation of Bis(azohydrocarbon)Compounds from α-Isocyanato and α-Isothiocyanato-azo-hydrocarbon Compounds and their use in Preparing Polyester Foams

$$R^5-N=N-\underset{R^7}{\overset{R^6}{\underset{|}{\overset{|}{C}}}}-NCX + H-Q-H \longrightarrow R^5-N=N-\underset{R^7}{\overset{R^6}{\underset{|}{\overset{|}{C}}}}-Y-\underset{R^7}{\overset{R^6}{\underset{|}{\overset{|}{C}}}}-N=N-R^5$$

| | SYNTHESIS DATA | | | | | | FOAMING DATA | | |
|---|---|---|---|---|---|---|---|---|---|---|
| Example | $R^5$ | $R^6$ | $R^7$ | X | Q | Solvent | % Yield | Activator | Parts Activator | Parts Azo | Foam Density |
| 8-1 | $(CH_3)_3C$ | $-(CH_2)_5-$ | | S | $-HN-CH_2-CH_2-NH-$ | pentane | 89 | $AH_6SP$ | 2.0 | 2.0 | 0.90 |
| 8-2 | $(CH_3)_3C$ | $-(CH_2)_5-$ | | S | $-HN-NH-$ | pentane | 92 | $H_3PO_4$ | 4.0 | 2.0 | 0.946 |
| 8-3 | $(CH_3)_3C$ | $-(CH_2)_5-$ | | O | $-HN-CH_2-CH_2-NH-$ | pentane | 75 | none | — | 2.0 | 0.72 |
| 8-4 | $(CH_3)_3C$ | $-(CH_2)_5-$ | | O | $-HN-NH-$ | pentane | 95 | $H_3PO_4$ | 4.0 | 2.0 | 0.85 |
| 8-5 | $(CH_3)_3C$ | $-(CH_2)_5-$ | | O | $-HN-NH-\overset{O}{\underset{\|}{C}}-NH-NH-$ | methanol | 87 | $AH_6SP$ | 2.0 | 2.0 | 0.57 |

Example 8-continued

Preparation of Bis(azohydrocarbon)Compounds from α-Isocyanato and α-Isothiocyanato-azo-hydrocarbon Compounds and their use in Preparing Polyester Foams

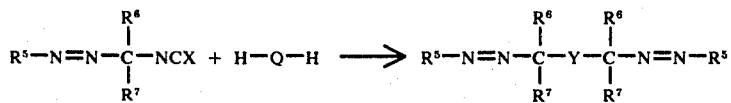

$$R^5-N=N-\overset{\overset{R^6}{|}}{\underset{\underset{R^7}{|}}{C}}-NCX + H-Q-H \longrightarrow R^5-N=N-\overset{\overset{R^6}{|}}{\underset{\underset{R^7}{|}}{C}}-Y-\overset{\overset{R^6}{|}}{\underset{\underset{R^7}{|}}{C}}-N=N-R^5$$

| | | SYNTHESIS DATA | | | | | | FOAMING DATA | | |
|---|---|---|---|---|---|---|---|---|---|---|
| Example | $R^5$ | $R^6$ | $R^7$ | X | Q | Solvent | % Yield | Activator | Parts Activator | Parts Azo | Foam Density |
| 8-6 | $(CH_3)_3C$ | $-(CH_2)_5-$ | | S | $-HN-NH-\overset{\overset{O}{\|}}{C}-NH-NH-$ | methanol | 87 | $AH_6SP$ | 2.0 | 2.0 | 0.65 |
| 8-7 | $(CH_3)_3C$ | $CH_3$ | $CH_3$ | O | $-HN-NH-\overset{\overset{O}{\|}}{C}-NH-NH-$ | methanol | 99 | $AH_6SP$ | 2.0 | 2.0 | 0.65 |

$$Y = -NH-\overset{\overset{X}{\|}}{C}-Q-\overset{\overset{X}{\|}}{C}-NH-$$

Example 9

Preparation of α-Hydroxyazohydrocarbon Compounds and Their Use in Preparing Polyester Foams

$$R^5-N=N-\underset{\underset{\underset{H}{O}}{|}}{\overset{\overset{R^6}{|}}{C}}-R^7$$

| | | SYNTHESIS DATA | | | | FOAMING DATA | | |
|---|---|---|---|---|---|---|---|---|
| Example | $R^5$ | $R^6$ | $R^7$ | Process | % Yield | Activator | Parts Activator | Parts Azo | Foam Density |
| 9-1 | $CH_3$ | $-(CH_2)_5-$ | | B.5.(c) | 42.5 | None | — | 2.0 | 0.84 |
| 9-2 | $CH_3$ | $CH_3$ | i-Bu | B.5.(c) | 56.0 | None | — | 2.0 | 0.32 |
| 9-3 | $CH_3$ | $CH_3$ | $C_5H_{11}$ | B.5.(c) | 84.0 | None | — | 2.0 | 0.48 |
| 9-4 | $CH_3$ | $CH_3$ | $-CH_2-C(CH_3)_3$ | B.5.(c) | 68.0 | None | — | 2.0 | 0.83 |
| 9-5 | $CH_3$ | $C_2H_5$ | $C_4H_9$ | B.5.(c) | 67.0 | None | — | 2.0 | 0.31 |
| 9-6 | $CH_3$ | $C_6H_{13}$ | H | B.5.(c) | 90.0 | $AH_6SP$ | 4.0 | 2.0 | 0.81 |
| 9-7 | $CH_3$ | $-CH-C_3H_7$ \| $CH_3$ | H | B.5.(c) | 75.0 | $AH_6SP$ | 4.0 | 2.0 | 0.49 |
| 9-8 | $CH_3$ | $C_4H_9$ | H | B.5.(c) | 64.0 | $AH_6SP$ | 4.0 | 2.0 | 0.64 |
| 9-9 | $HOCH_2-CH_2-$ | $CH_3$ | i-Bu | B.5.(c) | 52.0 | None | — | 2.0 | 0.54 |
| 9-10 | $C_6H_5CH_2-$ | $CH_3$ | $CH_3$ | B.5.(c) | 91.0 | None | — | 2.0 | 0.48 |
| 9-11 | $C_6H_5CH_2-$ | $CH_3$ | $C_2H_5$ | B.5.(c) | 91.0 | None | — | 2.0 | 0.65 |
| 9-12 | $n-C_4H_9$ | $CH_3$ | $CH_3$ | B.5.(c) | 45 | None | — | 2.0 | 0.65 |
| 9-13 | $n-C_4H_9$ | $CH_3$ | $C_2H_5$ | B.5.(c) | 86 | None | — | 2.0 | 0.49 |
| 9-14 | $n-C_3H_7$ | $CH_3$ | $CH_3$ | B.5.(c) | 21 | None | — | 2.0 | 0.39 |
| 9-15 | $n-C_3H_7$ | $CH_3$ | $C_2H_5$ | B.5.(c) | 37 | None | — | 2.0 | 0.84 |
| 9-16 | $n-C_8H_{17}$ | $CH_3$ | $CH_3$ | B.5.(c) | 98 | $AH_6SP$ | 2.0 | 2.0 | 0.44 |
| 9-17 | $n-C_8H_{17}$ | $CH_3$ | $C_2H_5$ | B.5.(c) | 99 | $AH_6SP$ | 2.0 | 2.0 | 0.46 |
| 9-18 | $n-C_{12}H_{25}$ | $CH_3$ | $CH_3$ | B.5.(c) | 99 | $AH_6SP$ | 2.0 | 2.0 | 0.42 |
| 9-19 | $n-C_{12}H_{25}$ | $CH_3$ | $C_2H_5$ | B.5.(c) | 82 | $AH_6SP$ | 2.0 | 2.0 | 0.47 |
| 9-20 | $n-C_{12}H_{25}$ | $i-C_3H_7$ | H | B.5.(c) | 97 | $AH_6SP$ | 2.0 | 2.0 | 0.50 |
| 9-21 | cyclopentyl | $-(CH_2)_5-$ | | B.5.(a) | 92 | None | — | 2.0 | 0.78 |
| 9-22 | $i-C_3H_7$ | $CH_3$ | $C_2H_5$ | B.5.(a) | 61 | None | — | 2.0 | 0.34 |
| 9-23 | $i-C_3H_7$ | $CH_3$ | $CH_3$ | B.5.(a) | 86 | None | — | 2.0 | 0.42 |
| 9-24 | 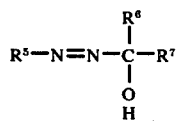 norbornyl-CH(CH_3)- | $CH_3$ | $-CH_2-CH_2-\overset{\overset{O}{\|}}{C}-$ \| $CH_2=CH-CH_2-O$ | B.5.(a) | 27 | None | — | 2.0 | 0.41 |
| 9-25 | $i-C_3H_7$ | $CH_3$ | $CH_3$ | B.5.(a) | 80 | None | — | 2.0 | 0.37 |
| 9-26 | $i-Bu-CH-$ \| $CH_3$ | $CH_3$ | $CH_3$ | B.5.(a) | 69 | None | — | 2.0 | 0.34 |
| 9-27 | $i-Bu-CH-$ \| $CH_3$ | $CH_3$ | $C_2H_5$ | B.5.(a) | 87 | None | — | 2.0 | 0.38 |
| 9-28 | $C_2H_5-CH-$ \| $CH_3$ | $CH_3$ | $C_2H_5$ | B.5.(a) | 80 | None | — | 2.0 | 0.37 |

Example 9-continued

Preparation of α-Hydroxyazohydrocarbon Compounds and Their Use in Preparing Polyester Foams

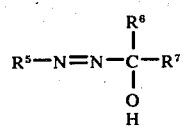

| | SYNTHESIS DATA | | | | | FOAMING DATA | | | |
|---|---|---|---|---|---|---|---|---|---|
| Example | $R^5$ | $R^6$ | $R^7$ | Process | % Yield | Activator | Parts Activator | Parts Azo | Foam Density |
| 9-29 | cyclohexyl | $CH_3$ | $C_2H_5$ | B.5.(a) | 84 | None | — | 2.0 | 0.39 |
| 9-30 | cyclopentyl | $CH_3$ | $CH_3$ | B.5.(a) | 58 | None | — | 2.0 | 0.29 |
| 9-31 | cyclohexyl | —$(CH_2)_5$— | | B.5.(a) | 81 | None | — | 2.0 | 0.92 |
| 9-32 | cyclohexyl | $CH_3$ | $CH_3$ | B.5.(a) | 96 | None | — | 2.0 | 0.40 |
| 9-33 | i-Bu—CH—<br>$\|$<br>$CH_3$ | —$(CH_2)_5$— | | B.5.(a) | 90 | None | — | 2.0 | 0.45 |
| 9-34 | $C_2H_5$—CH—<br>$\|$<br>$CH_3$ | $CH_3$ | $CH_3$ | B.5.(a) | 51 | None | — | 2.0 | 0.38 |
| 9-35 | i-$C_3H_7$ | i-$C_3H_7$ | H | B.5.(c) | 55 | None | — | 2.0 | 1.13 |
| 9-36 | cyclohexyl | $C_2H_5$ | H | B.5.(c) | 60 | None | — | 2.0 | 0.97 |
| 9-37 | t-$C_4H_9$ | $CH_3$ | $CH_3$ | B.5.(b) | 88 | None | — | 2.0 | 0.38 |
| 9-38 | t-$C_4H_9$ | $CH_3$ | $C_2H_5$ | B.5.(b) | 88 | None | — | 2.0 | 0.40 |
| 9-39 | t-$C_4H_9$ | $CH_3$ | $C_3H_7$ | B.5.(b) | 87 | None | — | 2.0 | 0.52 |
| 9-40 | t-$C_4H_9$ | $CH_3$ | $C_4H_9$ | B.5.(b) | 82 | None | — | 2.0 | 0.60 |
| 9-41 | t-$C_4H_9$ | $CH_3$ | $C_5H_{11}$ | B.5.(b) | 64 | None | — | 2.0 | 0.62 |
| 9-42 | t-$C_4H_9$ | $C_2H_5$ | $C_4H_9$ | B.5.(b) | 76 | None | — | 2.0 | 0.65 |
| 9-43 | t-$C_4H_9$ | $CH_3$ | $C_6H_{13}$ | B.5.(b) | 87 | None | — | 2.0 | 0.58 |
| 9-44 | t-$C_4H_9$ | $C_3H_7$ | H | B.5.(c) | 65 | None | — | 2.0 | 0.81 |
| 9-45 | t-$C_4H_9$ | $C_6H_5$ | H | B.5.(c) | 70 | None | — | 2.0 | 0.89 |
| 9-46 | t-$C_4H_9$ | $C_2H_5$ | H | B.5.(c) | 46 | None | — | 2.0 | 0.76 |
| 9-47 | t-$C_4H_9$ | $C_4H_9$ | H | B.5.(c) | 77 | None | — | 2.0 | 0.95 |
| 9-48 | t-$C_4H_9$ | $CH(C_2H_5)_2$ | H | B.5.(c) | 90 | None | — | 2.0 | 1.05 |
| 9-49 | t-$C_4H_9$ | $C_6H_{13}$ | H | B.5.(c) | 90 | None | — | 2.0 | 1.01 |
| 9-50 | t-$C_4H_9$ | $CH_3$ | $CH_2$—$CH_2$—$\underset{\underset{O}{\|\|}}{C}OC_4H_9$ | B.5.(c) | 94 | None | — | 2.0 | 0.93 |
| 9-51 | $C_6H_5$ | $CH_3$ | $C_2H_5$ | B.5.(c) | 89 | None | — | 2.0 | 0.38 |
| 9-52 | $C_6H_5$ | $CH_3$ | $CH_3$ | B.5.(c) | 63 | None | — | 2.0 | 0.40 |
| 9-53 | t-$C_4H_9$ | —$(CH_2)_5$— | | B.5.(b) | 92 | None | — | 2.0 | 0.36 |

Example 10

Preparation of α-Lower Alkanoyloxyazohydrocarbon Compounds and Their Use in Preparing Polyester Foams

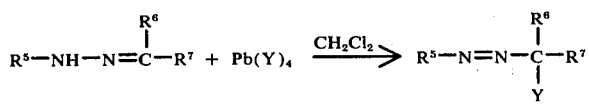

| | SYNTHESIS DATA | | | | | | FOAMING DATA | | | |
|---|---|---|---|---|---|---|---|---|---|---|
| Example | $R^5$ | $R^6$ | $R^7$ | Y* | solvent | % Yield | Activator | Parts Activator | Parts Azo | Foam Density |
| 10-1 | $C_6H_5$ | —$(CH_2)_5$— | | $\underset{\underset{OCCH_3}{\|\|}}{O}$ | $CH_2Cl_2$ | 85 | 60% $H_2SO_4$ | 1.5 | 2.0 | 0.87 |
| 10-2 | $C_6H_5$ | $CH_3$ | i-Bu | $\underset{\underset{OCCH_3}{\|\|}}{O}$ | $CH_2Cl_2$ | 98 | 60% $H_2SO_4$ | 1.5 | 2.0 | 0.91 |

Example 10-continued

Preparation of α-Lower Alkanoyloxyazohydrocarbon Compounds and Their Use in Preparing Polyester Foams

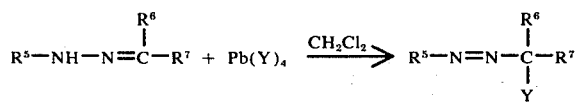

| | SYNTHESIS DATA | | | | | | FOAMING DATA | | |
|---|---|---|---|---|---|---|---|---|---|
| Example | $R^5$ | $R^6$ | $R^7$ | Y* | solvent | % Yield | Activator | Parts Activator | Parts Azo | Foam Density |
| 10-3 | $C_6H_5CH_2$ | $-(CH_2)_5-$ | | $\underset{OCCH_3}{\overset{O}{\|}}$ | $CH_2Cl_2$ | 85 | $AH_6SP$ | 2.0 | 2.0 | 0.985 |

*Y can be alkanoyloxy containing 1 to 8 carbon atoms

Example 11

Preparing of α-Lower Alkanoyloxyazohydrocarbon Compounds and Their Use in Preparing Polyester Foams

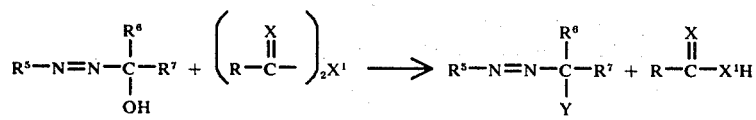

| | SYNTHESIS DATA | | | | | FOAMING DATA | | |
|---|---|---|---|---|---|---|---|---|
| Example | $R^5$ | $R^6$ | $R^7$ | Y | % Yield | Activator | Parts Activator | Parts Azo | Foam Density |
| 11-1 | $CH_3$ | $CH_3$ | $-CH_2C(CH_3)_3$ | $CH_3CO-\overset{O}{\|}$ | 42 | $AH_6SP$ | 4.0 | 2.0 | 0.74 |
| 11-2 | $CH_3$ | $CH_3$ | $C_5H_{11}$ | $CH_3CO-\overset{O}{\|}$ | 32 | $AH_6SP$ | 4.0 | 2.0 | 0.83 |
| 11-3 | $CH_3$ | $-\underset{CH_3}{\overset{}{C}H}-C_3H_7$ | H | $CH_3CO-\overset{O}{\|}$ | 64 | $AH_6SP$ | 4.0 | 2.0 | 0.60 |
| 11-4 | $C_6H_5-CH_2-$ | $CH_3$ | $C_2H_5$ | $CH_3CO-\overset{O}{\|}$ | 38 | $AH_6SP$ | 4.0 | 2.0 | 0.74 |
| 11-5 | $CH_3$ | $C_6H_{13}$ | H | $CH_3CO-\overset{O}{\|}$ | 90 | $AH_6SP$ | 4.0 | 2.0 | 0.64 |
| 11-6 | $HO-CH_2-CH_2-$ | $CH_3$ | i-Bu | $CH_3CO-\overset{O}{\|}$ | 44 | $AH_6SP$ | 4.0 | 2.0 | 0.54 |
| 11-7 | $C_6H_5-CH_2$ | $CH_3$ | $CH_3$ | $CH_3CO-\overset{O}{\|}$ | 40 | $AH_6SP$ | 4.0 | 2.0 | 0.64 |
| 11-8 | i-$C_3H_7$ | i-$C_3H_7$ | H | $CH_3CO-\overset{O}{\|}$ | 26 | $AH_6SP$ | 2.0 | 2.0 | 0.64 |
| 11-9 | cyclohexyl | $CH_3$ | $CH_3$ | $CH_3CO-\overset{O}{\|}$ | 53 | $AH_6SP$ | 2.0 | 2.0 | 0.52 |
| 11-10 | t-$C_4H_9$ | $C_4H_9$ | H | $CH_3CO-\overset{O}{\|}$ | 63 | $AH_6SP$ | 2.0 | 2.0 | 0.86 |
| 11-11 | t-$C_4H_9$ | $CH(C_2H_5)_2$ | H | $CH_3CO-\overset{O}{\|}$ | 40 | $AH_6SP$ | 2.0 | 2.0 | 1.00 |
| 11-12 | t-$C_4H_9$ | $C_3H_7$ | H | $CH_3CO-\overset{O}{\|}$ | 67 | $AH_6SP$ | 4.0 | 2.0 | 0.53 |
| 11-13 | t-$C_4H_9$ | $C_6H_{13}$ | H | $CH_3CO-\overset{O}{\|}$ | 61 | $AH_6SP$ | 4.0 | 2.0 | 0.51 |
| 11-14 | t-$C_4H_9$ | $C_2H_5$ | H | $CH_3CO-\overset{O}{\|}$ | 71 | $AH_6SP$ | 4.0 | 2.0 | 0.61 |
| 11-15 | t-$C_4H_9$ | $C_6H_5$ | H | $CH_3CO-\overset{O}{\|}$ | 35 | $AH_6SP$ | 4.0 | 2.0 | 0.72 |

Example 12

Preparation of α-Lower Alkoxyazohydrocarbon Compounds and Their Use in Polyester Foams

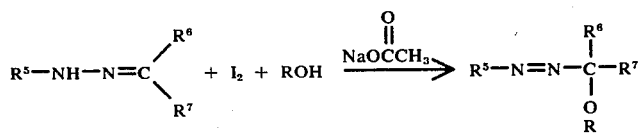

| | SYNTHESIS DATA | | | | | FOAMING DATA | | | |
|---|---|---|---|---|---|---|---|---|---|
| Example | $R^5$ | $R^6$ | $R^7$ | R | % Yield | Activator | Parts Activator | Parts Azo | Foam Density |
| 12-1 | $C_6H_5$ | $CH_3$ | $CH_3$ | $CH_3$ | 78.5 | $AH_6SP$ | 4.0 | 4.0 | 0.46 |
| 12-2 | $C_6H_5$ | $CH_3$ | i-Bu | $CH_3$ | 82 | $AH_6SP$ | 4.0 | 4.0 | 0.41 |
| 12-3 | $C_6H_5CH_2$ | —$(CH_2)_5$— | | $CH_3$ | 71 | $AH_6SP$ | 1.0 | 2.0 | 0.91 |

Synthesis solvent was methanol

Example 13

Preparation of Unsymmetrical α-Carbonatoazohydrocarbon Compounds And Their Use in the Preparation of Polyester Foams

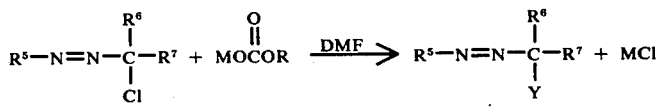

| | SYNTHESIS DATA* | | | | | | FOAMING DATA | | | |
|---|---|---|---|---|---|---|---|---|---|---|
| Example | $R^5$ | $R^6$ | $R^7$ | Y | M | %Yield | Activator | Parts Activator | Parts Azo | Foam Density |
| 13-1 | $(CH_3)_3C$ | $CH_3$ | $C_2H_5$ | $OCOC_2H_5$ (O double bond) | Na | 78% | $H_2SO_4$ | 0.25 | 1.0 | 0.49 |
| 13-2 | $(CH_3)_3C$ | $CH_3$ | $C_2H_5$ | $OCOCH(CH_3)_2$ | Na | 86% | $H_2SO_4$ | 0.25 | 1.0 | 0.49 |
| 13-3 | $(CH_3)_3C$ | $CH_3$ | $C_2H_5$ | $OCOC(CH_3)_3$ | K | 52% | $H_2SO_4$ | 0.25 | 1.0 | 0.68 |
| 13-4 | $(CH_3)_3C$ | $CH_3$ | $C_2H_5$ | $OCOCH_3$ | Na | 74% | $H_2SO_4$ | 0.25 | 1.0 | 0.51 |
| 13-5 | $(CH_3)_3C$ | $CH_3$ | $CH_3$ | $OCOCH_3$ | Na | 58% | $H_2SO_4$ | 0.25 | 1.0 | 0.65 |
| 13-6 | $(CH_3)_3C$ | $CH_3$ | i-Bu | $OCOCH_3$ | Na | 70% | $H_2SO_4$ | 0.25 | 1.0 | 0.50 |
| 13-7 | $(CH_3)_3C$ | —$(CH_2)_5$— | | $OCOCH_3$ | Na | 74% | $H_2SO_4$ | 0.25 | 1.0 | 0.65 |
| 13-8 | $(CH_3)_2CH$— | $CH_3$ | $C_2H_5$ | $OCOCH_3$ | Na | 60% | $H_2SO_4$ / Cu Naph** | 1.0 / 0.05 | 1.0 | 0.58 |
| 13-9 | $(CH_3)_2CH$— | $CH_3$ | $C_2H_5$ | $OCOC_2H_5$ | Na | 53% | $H_2SO_4$ / Cu Naph** | 1.0 / 0.05 | 1.0 | 0.64 |
| 13-10 | cyclohexyl | $CH_3$ | $CH_3$ | $OCOCH(CH_3)_2$ | Na | 77% | $H_2SO_4$ / Cu Naph** | 1.0 / 0.15 | 1.0 | 0.60 |
| 13-11 | cyclohexyl | $CH_3$ | $CH_3$ | $OCOC(CH_3)_3$ | K | 25% | $H_2SO_4$ / Cu Naph** | 1.0 / 0.15 | 1.0 | 1.00 |

*See MacLeay & Sheppard US Application 453,444 filed March 21, 1974, the contents of which are incorporated herein by reference.
**5% Copper Naphthenate in odorless mineral spirits.

EXAMPLE 13-12

Preparation of
1,1'-Azobis[1-(ethoxycarbonyloxy)cyclohexane]and
Its Use in the Preparation of a Polyester Foam

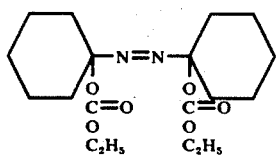

To a stirred slurry of 12 3 grams (0.11 mole) sodium ethyl carbonate in 80 ml of N, N-dimethylformamide warmed to 45° C in a 250 ml round bottom flask was added 13.15 grams (.05 mole) of 1,1'-azobis (1-chlorocyclohexane). The reaction was stirred for 7 hours at 45° C and then allowed to stir overnight at room temperature. The next morning the reaction mixture was warmed up to 45° C, stirred another two hours and poured into 350 ml of cold water. The product was taken up in 100 ml pentane and the pentane solution washed successively with 5% HCl, water and saturated sodium bicarbonate solution. The pentane solution was dried over anhydrous sodium sulfate, filtered and the pentane evaporated under reduced peesure. The residue weighed 5.5 grams (27.5% yield) and its infrared spectrum was in agreement with the structure of 1,1'-azobis[1(-ethoxy carbonyloxy)cyclohexane](strong carbonyl band at 1725 cm$^{-1}$).

The 1,1'-azobis [1(-ethoxycarbonyloxy)cyclohexane] was evaluated as a foaming agent for unsaturated polyester resins. With 100 grams of the Standard Unsaturated Polyester Resin were mixed 0.2 gram t-butyl peroxybenzoate, 1 gram of Dow Corning 193 Surfactant, 0.15 grams of a 5% solution of copper naphthenate in odorless mineral spirits and 1.0 gram 1,1'-azobis [1-(ethoxycarbonyloxy)-cyclohexane]using an electric stirrer. Finally, 0l.25 grams of 60% aqueous sulfuric acid was mixed into the formulation. The mixture was poured into a wax cup at ambient temperature (75° F) and allowed to foam and cure. The foaming and curing were complete in seven minutes. After the foam had cooled the foam density was determined to be 0.91 grams/cubic centimeter.

EXAMPLE 14

Preparation* of
2-t-Butylazo-2-(t-butylperoxycarbonyloxy)butane and
Its Use in the Preparation of a Polyester Foam

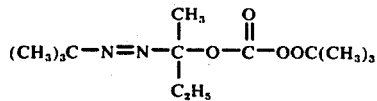

* See MacLeay & Sheppard U.S. application Ser. No. 453,444, supra.

Potassium t-butylperoxy carbonate was prepared in 67% yield by adding anhydrous t-butylhydroperoxide to a solution of potassium t-butoxide in t-butanol and then carbonating the resultant solution.

To a stirred slurry of 18.9 grams (0.11 mole) potassium t-butylperoxy carbonate in 80 ml of N, N-dimethylformamide in a 250 ml round bottom flask was slowly added 17.66 grams (0.1 mole) 2-t-butylazo-2-chlorobutane. After the addition was complete the reaction was stirred for 5 hours at room temperature and poured into 350 ml water. The product was taken up in 100 ml pentane and the pentane solution washed with 5% HCl, water and saturated sodium bicarbonate solution. The pentane solution was dried over anhydrous sodium sulfate, filtered and the pentane evaporated under reduced pressure. The residue weighed 22.9 grams (33% yield) and its infrared spectrum was in agreement with the structure of 2-t-butylazo-2-(t-butylperoxycarbonyloxy) butane (strong carbonyl band at 1750 cm$^{-1}$).

The product was evaluated as a foaming agent for unsaturated polyester resins. With 100 grams of the Standard Unsaturated Polyester Resin were mixed in a waxed cup 1 gram of Dow Corning 193 Surfactant, 0.25 gram of 60% aqueous sulfuric acid and 1.0 gram 2-t-butylazo-2-(t-butylperoxycarbonyloxy)butane for 30 seconds using an electric mixer and the contents allowed to foam standing at room temperature. The foaming and curing were complete in 18 minutes. After the foam had cooled the foam density was determined to be 0.515 grams/cubic centimeter.

Examples 15–17 inclusive below are intended to illustrate a variety of curing agents, with and without promoters, which are useful with particular acid-sensitive azo compounds for comparative purposes. In these Examples foaming is accomplished by weighing into a 150 ml beaker having a 2-inch diameter, 60 grams of the Standard unsaturated Polyester Resin. The indicated amount of curing agent and promoter (when used) were then weighed into the beaker and the mixture stirred up well using a wooden tongue depressor. Then the indicated amount of the indicated acid-sensitive azo foaming agents (prepared by methods described herein and as more particularly described in the Application of MacLeay and Sheppard U.S. Ser. No. 453,444, supra) was weighed into the beaker, the mixture rapidly mixed with the tongue depressor for about 15 seconds, the tongue depressor removed and the resin allowed to expand and cure. (When no curing agent was used, the foam was post-cured in an oven at 100° C for 30 minutes.)

The compressive strengths of the foams were then determined according to ASTM procedure D1621-59T. Samples were cut to a thickness of 1 inch with a band saw. Crosshead speed on the Instron was 0.1 inch per minute. Compressive strengths were determined from this maximum load or if no maximum is reached, the load at 10% deformation. The densities were determind on these one-inch samples.

A weighed sample of one of the foams was allowed to float in water for 24 hours, the water wiped of and the foam weighed. The foam did not increase in weight indicating the foam was of the closed cell type. Both ends of the foamed piece were then cut of and the procedure repeated. Again there was no increase in weight indicating the foam was of the closed cell type throughout.

The foaming system and the densities and compressive strengths of the resultant foams are summarized in Examples 15 and 16. The above procedure was repeated on various commercial polyester resin formulations whose compositions are of a proprietary nature. These results are summarized in Example 17. The compressive strengths of the foams of this invention Examples 15, 16 and 17) are quite comparable and in some instances even surpass the literature values for polyurethane, epoxy, and phenolic rigid foams (Example 17).

Example 15

Use of 2-t-Butylazo-2-Hydroxypropane as Foaming Agent for Standard Unsaturated Polyester Resin

| Example | Azo Conc. (% by Wt.) | Curing Agent | Conc. (% by Wt.) | 10 hour $t_{1/2}$ at °C | Promoter | Density g/cc | Density lbs/cu.ft. | Compressive Strength lbs/sq.inch |
|---|---|---|---|---|---|---|---|---|
| 15-1 | 1.0% | 2-t-butylazo-2-cyano-4-methoxy-4-methylpentane | 1.0% | 55° C | None | 0.61 | 38 | 2880 |
| 15-2 | " | 2-t-butylazo-2-cyano-4-methylpentane | " | 70° C | " | 0.56 | 35 | 1150 |
| 15-3 | " | benzoyl peroxide | " | 73° C | " | 0.46 | 29 | 1660 |
| 15-4 | " | 2,5-dimethyl-2,5-bis(2-ethylhexanoyl-peroxy)-hexane | " | 67° C | " | 0.60 | 37 | 2880 |
| 15-5 | " | 1,1,3,3-tetramethylbutyl peroxy-2-ethylhexanoate | 1.2% | 60° C | " | 0.54 | 34 | >3220 |
| 15-6 | " | t-butyl peroxyoctoate | 0.9% | 72° C | " | 0.64 | 40 | 2400 |
| 15-7 | " | t-butyl peroxypivalate | 1.0% | 55° C | " | 0.61 | 36 | 2550 |
| 15-8 | " | t-butylperoxy isopropyl carbonate | 0.8% | 99° C | " | 0.55 | 34 | 1340 |
| 15-9 | " | methyl ethyl ketone peroxide | 1.0% | — | " | 0.57 | 36 | 1050 |
| 15-10 | 1.0% | 1,1,3,3-tetramethylbutyl peroxy-2-ethylhexanoate | 0.2% | 60° C | None | 0.50 | 31 | 1280 |
| 15-11 | " | " | 0.4% | " | " | 0.58 | 36 | 2880 |
| 15-12 | " | " | 0.6% | " | " | 0.54 | 34 | 3060 |
| 15-13 | " | " | 0.8% | " | " | 0.59 | 37 | >3200 |
| 15-14 | " | " | 1.0% | " | " | 0.54 | 34 | >3200 |
| 15-15 | 0.5% | 2,5-dimethyl-2,5-bis(2-ethylhexanoyl-peroxy)hexane | 0.2% | 67° C | " | 0.83 | 52 | 1120 |
| 15-16 | 1.0% | " | 0.2% | " | " | 0.55 | 34 | >3200 |
| 15-17 | 1.5% | " | 0.2% | " | " | 0.47 | 29 | 2620 |
| 15-18 | 2.0% | " | 0.2% | " | " | 0.33 | 21 | 2040 |
| 15-19 | 2.0% | 1,1,3,3-tetramethylbutyl peroxy-2-ethylhexanoate | 1.0% | 60° C | " | 0.35 | 22 | 1120 |
| 15-20 | 2.0% | " | 1.0% | " | " | 0.34 | 21 | 1300 |
| 15-21 | 1.0% | benzoyl peroxide | 1.0% | 72° C | 0.1% dimethylaniline | 0.59 | 37 | >3200 |
| 15-22 | 1.0% | methyl ethyl ketone peroxide | 1.0% | — | 0.1% cobalt neodecanoate | 0.61 | 38 | >3200 |
| 15-23 | 2.0% | benzoyl peroxide | 1.0% | 72° C | 0.1% dimethylaniline | 0.34 | 21 | 1080 |

Example 16

Use of 2-t-Butylazo-2-Hydroxy-4-Methylpentane as Foaming Agent for Standard Unsaturated Polyester Resin

| Example | Azo Conc. (% by Wt.) | Curing Agent | Conc. (% by Wt.) | $t_{1/2}$ at °C | Promoter | Density g/cc | Density lbs/cu.ft. | Compressive Strength lbs/sq.inch |
|---|---|---|---|---|---|---|---|---|
| 16-1 | 1.0% | 1,1,3,3-tetramethylbutyl peroxy-2-ethylhexanoate | 1.0% | 60° C | None | 0.48 | 30 | 2800 |
| 16-2 | " | " | 0.4% | " | " | 0.51 | 32 | 2800 |
| 16-3 | " | methyl ethyl ketone peroxide | 1.0% | — | 0.1% cobalt neodecanoate | 0.64 | 40 | >3200 |
| 16-4 | " | benzoyl peroxide | 1.0% | 73° C | 0.1% dimethyl aniline | 0.48 | 30 | 2700 |

Example 17

Use of 2-t-Butylazo-2-Hydroxypropane as Foaming Agent for Commercial Unsaturated Polyester Resin

| Ex. | Polyester Resin | Azo Conc. (% by Wt.) | Curing Agent | Conc. (% by Wt.) | 10 hour $t_{1/2}$ at °C | Promoter | Density g/cc | Density lbs/cu.ft | Compressive Strength lbs/sq.inch |
|---|---|---|---|---|---|---|---|---|---|
| 17-1 | Hetron 92[a] | 1.0% | 1,1,3,3-tetramethylbutyl peroxy-2-ethylhexanoate | 0.6% | 60° C | None | 0.61 | 38 | 2000 |
| 17-2 | " | 1.0% | benzoyl peroxide | 1.0% | 73° C | 0.1% dimethylaniline | 0.74 | 46 | 2330 |
| 17-3 | Hetron 93LS[a] | " | 1,1,3,3-tetramethylbutyl peroxy-2-ethylhexanoate | 0.6% | 60° C | None | 0.60 | 37 | 1050 |
| 17-4 | " | " | benzoyl peroxide | 1.0% | 73° C | 0.1% dimethylaniline | 0.57 | 36 | 1630 |
| 17-5 | Marco GR4711[b] | 1.5% | 1,1,3,3-tetramethylbutyl peroxy-2-ethylhexanoate | 0.5% | 60° C | None | 0.77 | 49 | 2700 |
| | Controls[c] | | | | | | | | |
| | Epoxy (closed cell-rigid) | | | | | | | 20 | 1080 |
| | Phenolic | | | | | | | 10–22 | 1200 |
| | Polyurethane (closed | | | | | | 0.20–0.28 | 13–18 | 650–1,100 |

Example 17-continued

Use of 2-t-Butylazo-2-Hydroxypropane as Foaming Agent for Commercial Unsaturated Polyester Resin

| Ex. | Polyester Resin | Azo Conc. (% by Wt.) | Curing Agent | Conc. (% by Wt.) | 10 hour $t_{1/2}$ at °C | Promoter | Density g/cc | lbs/cu.ft | Compressive Strength lbs/sq.inch |
|-----|-----------------|----------------------|--------------|------------------|-------------------------|----------|--------------|-----------|----------------------------------|
| | cell-rigid) Polyester Resin Polyurethane (closed cell-rigid) | | | | | | 0.30–0.39 | 19–25 | 1,200–2,000 |
| | ″ | | | | | | 0.41–0.63 | 26–40 | 2,100–4,000 |
| | ″ | | | | | | 0.64–1.1 | 41–70 | 5,000–15,000 |

(a)Hetron resins are fire retardant styrenated polyester resins based on hexachloroendomethylene tetrahydrophthalic anhydride produced by Durez Plastics. Hetron 92 has an Acid No. of 24 and a Spec. Grav. at 77° F/60° F of 1.33. Hetron 93LS has an Acid No. 15 and a Spec. Grav. at 77° F/60° F of 1.29.
(b)Marco GR4711 is an unsaturated polyester resin produced by Marco Chemical Division of W. R. Grace from maleic anhydride and dipropylene glycol and contains 24–26% styrene—Acid No. 10.
(c)Properties reported in Modern Plastics Encyclopedia 45, No. 144, P. 362.(1968).

The remaining Examples are cited to illustrate the many facets of the present invention. The illustrative purposes are recited in the headings.

EXAMPLE 18

Polyester Foam Composites

For many applications it is desirable to produce foams which have a dense non-foamed outer layer or skin. Such foams have improved surface hardness, abrasion resistance, scratch resistance and solvent resistance compared to foams having no outer skin, while maintaining their light weight. The construction and transportation industries make great use of sandwich panels which consist of three or more layers of materials bonded together. The outer skins are usually dense strong materials such as steel, aluminum, reinforced plastic or plywood. The thicker center layer or core is usually a low density material such as a polymeric foam. The foam system hereof can be used in such applications.

In this Example, three different resins, denominated Resins A, B and C are employed. They are prepared as follows:

Resin A — is prepared by reacting maleic anhydride, phthalic anhydride, propylene glycol and diethylene glycol. 60 parts of this alkyd diluted with 40 parts of styrene monomer to give a resin with a viscosity of 620 cps. (Selectron RS 50111 by PPG)

Resin B — is prepared by reacting isophthlaic acid, maleic anhydride and diethylene glycol. This polyester is then diluted with styrene monomer to give a resin with an acid number of 20–25. (Reichold 31830 by Reichold Chemical Company.)

Resin C — is prepared by reacting isophthalic anhydride, maleic anhydride and propylene glycol to give an alkyd with an acid number of 10±2. 65 parts of this alkyd were diluted with 35 parts of styrene monomer (Aropol 7220 MC by Ashland Chemical Company).

With the above described resins, a polyester foam with a non-foamed polyester surface layer was prepared in a silicon rubber furniture mold in the following manner: A resin coating mixture was prepared by mixing together 100.0 g of Polyester Resin A, 15.0 g of pecan shell flour, 0.6 g Lupersol DDM and 0.06 g of a 12% cobalt naphthanate solution. This mixture was brushed onto the surfaces of the silicone rubber mold to form a coating approximately 10–15 mils in thickness. After approximately 15 minutes 530 g of a foaming mixture was poured into the mold (950 cc) which was then tightly closed. The foaming mixture was prepared by mixing 250 g of the Standard Unsaturated Polyester Resin, 220 g of Polyester Resin B, 55.0 g of Polyester Resin C, 25.0 g styrene monomer, 6.0 g of surfactant (LK 221), 18.0 g milled fiber glass, 18.0 g of pecan shell flour, 3.3 g of t-butyl perbenzoate, 0.22 g of a 5% copper naphthanate solution and 6.0 g of 2-t-butylazo-2-hydroxypropane. The surface of the cured foam was hard, dense and showed excellent reproduction of mold detail. Examination of a cross section of the foam exposed by a band saw cut showed that the surface skin was an integral part of the foam core.

A sandwich panel was constructed by the following technique. A ¼ inch plywood panel was placed into the bottom of a silicone rubber bar mold (3 inches × 1 inches × 12). The foaming mixture described in the proceeding example was poured into the mold. A second piece of ¼ inch plywood was placed on top of the mold and clamped tightly. After 15 minutes the sandwich panel was removed from the mold. The rigid foam core was of a fine uniform cell structure. Adhesion of the core to the plywood panels was judged to be good. The panels could not be pulled by hand from the foam core.

The foregoing technique can be used as well to form a composite made up of two or more layers having different densities. That is, one can form and gel one foamed layer, then repeat the process with a foamed layer having a different density, a function of polymer chosen or degree of foaming.

EXAMPLE 19

Foaming the Polyester-Styrene Resin with 2-t-Butylazo-2-Hydroxypropane and Curing it with 2-t-Butylazo-2-t-butylperoxypropane Crude 2-t-butylazo-2-t-butylperoxypropane was prepared by reacting 2-t-butylazo-2-chloropropane with an aqueous solution of the potassium salt of t-butyl hydroperoxide according to the method described in MacLeay. Lange and Sheppard Application Ser. No. 426,411 filed Dec. 19, 1973. The resultant product contained approximtely 75% 2-t-butylazo-2-t-butyl-peroxypropane and 25% 2-t-butylazo-2-hydroxypropane.

To 20 grams of the Standard Unsaturated Polyester Resin was added 0.2 grams of the above mixture, the resin stirred up well using a wood tongue depressor for about 15 seconds, and the resin poured into a 20 × 150 mm test tube to a depth of 3 inches. The internal temperature of the mixture was recorded as a function of time and a peak exotherm of 250° F (121° C) was reached in 5.5 minutes indicating an excellent cure of the resin had occurred. In addition, the resin had expanded to twice its original volume. The test tube was broken and the foam removed. The foam was very hard and did not crumble.

EXAMPLE 20

Polyester Foam Molded at Elevated Temperature

Polyester forms may be prepared with 2-t-butylazo-2-hydroxy butane by molding at elevated temperatures. This technique makes it possible to greatly reduce demold time compared to molding at ambient temperatures.

200 g of Laminac 4128[1], 17.0 g titanium dioxide, 117 g of ASP-400[2], 1.0 g MOLD RELEASE AGENT [3], 3.3 g of surfactant LK221[4], 6.6 g of milled fiber glass[5], and 0.66 g of LUPERSOL 256[6] were mixed thoroughly with a high speed electric mixer, following which 5.0 g of 2-t-butylazo-2-hydroxybutane was added and mixed for approximately 30 seconds. This mixture was then rapidly poured into a chrome plated steel mold which had been preheated to 250° F. The mold was then closed hydraulicly to a predetermined position to give a molded foam of 0.5 inch thickness. After 1.5 minutes the mold was opened and the rigid foam panel (8.25 inches × 8.25 inches × 0.5 inch) was removed.

1. AMERICAN CYANAMID COMPANY — rigid unsaturated polyester resin prepared by reacting propylene glycol, phthalic anhydride and maleic anhydride. Sixty-six parts of this resin were diluted with 34 parts of styrene monomer. 2. An aluminum silicate powder produced by ENGLEHARD MINERALS CORP. 3. A mixture of bis and mono alcohol phosphate esters ... $C_6$-$C_{12}$ straight chain structures. 4. A low viscosity, all organic, non-silicon type surfactant manufactured by Air Products and Chemicals Incorporated. 5. FERRO CORPORATION 6. 2,5-dimethyl-2,5-bis (2-ethylhexanoylperoxy)-hexane The white colored foam had a fine uniform cell structure; a smooth, nonporous surface skin; and a density of 33.4 lb./cu.ft.

EXAMPLE 21

Rigid Foam in the Absence of a Curing Agent 21-1, Rigid polyester foams may be prepared with 2-t-butylazo-2-hydroxybutane in the absence of a curing agent such as t-butylperbenzoate. For example, to 100 g of aropol 7019[1] was added 1.0 g of surfactant[2] and 3.0 g of milled fiber glass[3]. After mixing thoroughly with a high speed electric mixer, 1.0 g of 2-t-butylazo-2-hydroxybutane was added and mixing continued for an additional 30 seconds. The resin began to foam almost immediately after addition of the azo. The temperature of the foamed mass increased due to the heat of reaction, reaching a peak of 295° F after 8 minutes. The resulting rigid foam had a fine uniform cell structure with a density of 28.4 lb./cu.ft.

1. ASHLAND CHEMICAL COMPANY — an unsaturated polyester resin prepared by reacting maleic anhydride with propylene oxide. Seventy-five parts of this resin were diluted with 25 parts of styrene monomer to give a polyester resin with 25 parts of styrene monomer to give a polyester resin with an acid number of 15±2. 2. DOW CORNING 193 SURFACTANT — this is a low viscosity, silicone glycol copolymer manufactured by DOW CORNING CORPORATION. 3. FERRO CORPORATION A small decorative furniture piece was prepared in a silicone rubber mold from the above formulation. The rigid foam had good surface detail and hardness.

Foaming the Polyester-Styrene Resin Without a Curing Agent 21-2. To 150 grams of the standard resin described in Example 1 in a graduated beaker was added 1½ grams of Dow Corning Surfactant No. 193 and 1½ grams of 2-t-butylazo-2-hydroxypropane. The mixture was stirred with a high speed high torque mixer for approximately 20–30 seconds, a thermocouple inserted into the mixture and the temperature recorded as the polyester foamed. After 3 minutes the volume had reached a maximum of 400 ml. and the temperature was only 103° F. The peak exotherm of 284° F. was obtained after 18 minutes. The rigid foam had a density of 0.33g/cc.

21-3. The procedure is the same as that described in 6-2 except 1½ grams of 2-t-butylazo-2-hydroxybutane were used as the foaming agent. After 3 minutes the volume had reached a maximum of 400 ml. and the temperature was only 102° F. The peak exotherm of 274° F. was obtained after 22 minutes. The rigid foam had a density of 0.38g/cc.

EXAMPLE 22

Flexible Polyester Foams

Flexible foams are used in a wide variety of applications including comfort cushioning, safety padding, vibration dampening and packaging. The compressive nature of the flexible materials is the most important single property for most such uses.

Polyester foams with a wide range of compression properties may be prepared with 2-t-butylazo-2-hydroxybutane. This Example shows polyester foams prepared from various blends of a rigid resin (Laminac 4128)[1] and a flexible resin (Reichold 31-830)[2].

The procedure will be described for Example 22-8: 50 g of Laminac 4128[1], 50 g of Reichold 31-830[2], 1.0 g of Dow Corning 193[3] surfactant, 0.04 g of a 5% copper naphthenate* solution and 0.1 g of t-butylperbenzoate were mixed thoroughly in a 9 oz. waxed paper cup with a high speed mixer following which 0.8 g of azo was added and stirred for an additional 30 seconds. The mass foamed and the temperature increased due to the heat of reaction. After cooling to room temperature 1 inch cubes were cut on a band saw. Compression properties were determined on an Instron tester using a crosshead speed of 0.1 inches per minute and a chart speed of 10 inches per minute. Compression modulus was calculated from the initial straight line portion of the stress-strain curve.

1. American Cyanamid — rigid polyester resin prepared by reacting propylene glycol, phthalic anhydride and maleic anhydride. Sixty-six parts (i.e. 33 g. in Example 22-8) of this polyester were diluted with 34 parts (i.e. 17 g. in Example 22-8) of styrene monomer. The resin also contains a small amount of cobalt metal salt. 2. Reichold Chemicals — flexible unsaturated polyester resin prepared by reacting isophthalic acid, maleic anhydride and diethylene glycol. This polyester is then diluted with styrene monomer to give a resin with an acid number of 20–25. 3. Low viscosity silicone glycol copolymer manufactured by Dow Corning Corporation. * Cu naphthonate serves dual function of (1) activating the acid sensitive azo of this invention (much as $H_3PO_4$ etc. serve this function in other examples) and (2) activating the perbenzoate.

| | | Polyester Foams Prepared with 2-t-butylazo-2-hydroxybutane | | | | |
|---|---|---|---|---|---|---|
| | | Resin* (g.0) | | TBPB | Density | Compression |
| Example | Azo(g.) | Laminac 4128 | Reichold 31-830 | TBPB(g.) | Density lb/cu.ft. | Modulus (psi) |
| 22-1 | 0.8 | 0 | 100 | 0 | 33.2 | 60 |
| 22-2 | 1.2 | 30 | 70 | 0 | 27.2 | 150 |
| 22-3 | 0.8 | 30 | 70 | 0 | 31.7 | 183 |
| 22-4 | 0.8 | 50 | 50 | 0 | 29.8 | 600 |
| 22-5 | 0.8 | 0 | 100 | 0.3 | 37.0 | 5300 |

| Polyester Foams Prepared with 2-t-butylazo-2-hydroxybutane | | | | | |
|---|---|---|---|---|---|
| | | Resin* (g.0) | TBPB | Density | Compression |
| Example | Azo(g.) | Laminac 4128 Reichold 31-830 | TBPB(g.) | Density lb/cu.ft. | Modulus (psi) |
| 22-6 | 1.2 | 30  70 | 0.1 | 28.0 | 13000 |
| 22-7 | 0.8 | 30  70 | 0.1 | 31.7 | 26250 |
| 22-8 | 0.8 | 50  50 | 0.1 | 31.2 | 42000 |

*all formulations contain 1.0 phr of surfactant (Dow 193) and 0.04 phr of a 5% Copper napthanate solution in styrene monomer

EXAMPLE 23

Polyester Foam Using Vinyltoluene as the Crosslinking Monomer

Polyester resins containing crosslinking monomers other than styrene may be foamed with 2-t-butylazo-2-hydroxybutane. For example, 65 parts of a solid polyester resin[1] (Hetron No. 27205) were diluted with 35 parts of vinyltoluene[2] monomer (Dow 50T) to make a medium viscosity resin-vinyltoluene mixture. To 100 parts of this resin mixture in a 9 oz. waxed paper cup was added 2.0 parts of milled fiber glass, 1.0 part of Dow Corning 193[3] surfactant and 0.2 parts t-butylperbenzoate. After mixing thoroughly with a high speed mixer, 1.0 part of 2-t-butylazo-2-hydroxybutane was added and mixed for an additional 30 seconds. The resin foamed and reached a maximum volume change 1.5 minutes after mixing with azo was completed. The temperature of the foamed mass increased due to the heat of reaction reaching a maximum of 296° F after another 10 minutes. The rigid foam had a fine uniform cell structure with a density of 26.9 lb/cu.ft.

1. Unsaturated polyester prepared by reacting hexachloroendo-methylene tetrahydrophthalic acid, maleic anhydride, ethylene glycol and diethylene glycol. 2. Dow Chemical Company 3. A low viscosity, silicone glycol copolymer manufactured by Dow Corning Corporation.

EXAMPLE 24

Effect of Added Acids on the Degree of Foaming of Polyester Resins

The amount of foaming (volume increase) obtained from 2-butylazo-2-hydroxypropane may be increased in some cases by the addition of acid to the foaming system.

The unsaturated polyester resin used in this example was prepared by reacting phthalic anhydride (3.0 moles), maleic anhydrice (1.0 mole), propylene glycol (3.5 moles) and diethylene glycol (1.1 moles) until an acid value of 3.0 was obtained. To 76.5 parts of this alkyd was added 23.5 parts of styrene monomer to obtain a homogeneous blend having a viscosity of 10,700 cps, and an acid number of 2.3.

To 48 g of the above unsaturated polyester resin was added 2.0 g of styrene monomer, 0.5 g of surfactant LK221* and 0.25 g of t-butyl perbenzoate. After mixing thoroughly the desired amount of acid (see Table 9) was added with additional mixing. Finally, 1.0 g of 2-t-butylazo-2-hydroxy propane was added and mixed thoroughly at high speed.

* A product of Air Products and Chemical Inc.

The exotherm due to heat of reaction and the volume change due to evolution of gas were recorded as a function of time.

Data shown in Table 9 indicate that a significant increase in foaming (decrease in density) is obtained by addition of acid to the foaming system.

| Activation of 2-t-butylazo-2-hydroxy propane* With Acids to Prepare Rigid Polyester Foams | | | | | | |
|---|---|---|---|---|---|---|
| | | Conc Acid/100 g resin | | Peak | Time to | Foam |
| Example | Acid | Moles | Grams | Exotherm(° F) | peak (min.) | Den. lb/cu.ft. |
| 24-1 | None | — | — | 213 | 13 | 39 |
| 24-2 | Trichloroacetic | 12.2 × 10⁻⁴ | 0.20 | 246 | 11 | 27 |
| 24-3 | Dichloroacetic | 40.0 × 10⁻⁴ | 0.52 | 212 | 14 | 26 |
| 24-4 | Monochloroacetic | 124 × 10⁻⁴ | 1.20 | 210 | 13 | 25 |
| 24-5 | Acetic | 972 × 10⁻⁴ | 5.80 | 190 | 10 | 26 |

*1.0 phr.

EXAMPLE 25

Polyester Foams Prepared With Added Free Radical Initiators 100 grams of the Standard Unsaturated Polyester Resin were mixed with the desired amount of added free radical initiator and the desired amount of 2-t-butylazo-2-acetoxypropane using an electric stirrer.

Finally the appropriate amount of phosphoric acid was mixed into the formulation. The material was poured into a glass beaker at ambient temperature (~75° F) and allowed to foam and cure. The foaming and curing were complete in less than 30 minutes. The temperature of the foamed mass increased to 270°–300° F due to the heat of reaction. After the foams had cooled to room temperature, they were easily cut with a saw and compressive strengths were measured using A. S. T. M. method D-1621-59T. Data shown in Table 10 indicate that 1. Relatively strong rigid foams can be prepared without incorporating an added free radical initiator in the formulation.
2. Some increase in compressive strength can be achieved by the incorporation of an added free radical initiator and that its incorporation has little or no effect on resultant foam density.
3. The amount of foaming (increase in volume) is proportional to the amount of azo present.

Properties of Rigid Polyester Foams Prepared From 2-t-butylazo-2-acetoxypropane

| Example | A/W* × 10² | Parts Phosphoric Acid | Added Free Radical Initiator | Parts Added Free Radical Initiator | Foam Density (g/cm³) | Compression 5% | Modulus (psi) 10% |
|---|---|---|---|---|---|---|---|
| 25-1 | 0.97 | 1.75 | None | 0.0 | 0.70 | 950 | 3770 |
| 25-2 | 0.97 | 1.75 | t-butyl perbenzoate | 0.025 | 0.72 | 1830 | >4300 |
| 25-3 | 0.97 | 1.75 | 1,1-bis (t-butylperoxy)-3,3,5-trimethylcyclohexane | 0.025 | 0.70 | 680 | 1360 |
| 25-4 | 0.97 | 1.75 | methyl ethyl ketone peroxide++ | 0.025 | 0.72 | 1500 | >4300 |
| 25-5 | 0.97 | 1.75 | 2-t-butylazo-2-cyano-4-methyl-pentane | 0.10 | 0.69 | 550 | 3200 |
| 25-6 | 1.92 | 2.5 | None | 0.0 | 0.48 | 800 | 2620 |
| 25-7 | 1.92 | 2.5 | 2-t-butylazo-2-cyano-4-methyl-pentane | 0.10 | 0.45 | 870 | 2670 |
| 25-8 | 1.90 | 3.0 | t-butyl perbenzoate | 0.025 | 0.46 | 740 | 2770 |
| 25-9 | 1.90 | 3.0 | 1,1-bis(t-butylperoxy)3,3,5-trimethylcyclohexane | 0.025 | 0.47 | 1370 | 3050 |
| 25-10 | 1.90 | 3.0 | methyl ethyl ketone peroxide++ | 0.025 | 0.46 | 1080 | 2790 |
| 25-11 | 1.90 | 3.0 | t-butyl peracetate | 0.025 | 0.47 | 1260 | 2310 |
| 25-12 | 1.90 | 3.0 | 2-t-butylazo-2-cyano-4-methyl-pentane | 0.15 | 0.48 | 1080 | 2950 |
| 25-13 | 1.90 | 3.0 | None | 0.00 | 0.48 | 1320 | 2480 |
| 25-14 | 3.67 | 5.0 | None | 0.0 | 0.30 | 500 | 630 |
| 25-15 | 3.65 | 5.5 | None | 0.0 | 0.33 | 540 | 770 |
| 25-16 | 3.65 | 5.5 | 1,1-bis(t-butylperoxy)-3,3,5-trimethylcyclohexane | 0.3 | 0.35 | 800 | 1100 |
| 25-17 | 5.24 | 8.5 | 1,1-bis(t-butylperoxy)-3,3,5-trimethylcyclohexane | 0.05 | 0.24 | 250 | 290 |

*A is the weight of azo compound. W is the total weight of all materials, i.e. resin, acid and azo.
++LUPERSOL DDM - Trade name of Lucidol Division, Pennwalt Corporation.

EXAMPLE 26

A number of unsaturated polyester foams were prepared using the same resin and the same technique described in Example 25. Polymeric foams were formed for all of the compounds tested; the foaming and curing reaction was complete in less than 20 minutes. The amount of foaming increased with the amount of azo compound added. The optimum amount of phosphoric acid used varied from one compound to another. The effect of using 1 part v. 2 parts of the azos of these examples can be obtained by comparing Examples 26-1 though 26-8 with Examples 5-1 through 5-4 and 5-32 through 5-35 respectively.

(All of the azo compounds shown in Ex. 26 are thermally very stable (10-hour half-life >90° C) and may be stored for long periods at ambient temperatures).

In marked contrast, data in Example 12 indicate that azo compounds that do not fall within Formula I do not effect foaming of the unsaturated polyester resin at ambient temperatures over a period of 1 day.

EXAMPLE 27

Azo Compounds Found to be Totally Ineffective as Foaming Agents

| Compound Name | Results after 24 Hours |
|---|---|
| 2-t-butylazo-2-cyano-4-methyl-pentane | No reaction |
| 2-(t-butylazo)isobutyronitrile | No reaction |
| 1-cyano-1-(t-butylazo)cyclohexane | No reaction |
| 2-t-butylazo-2-cyanobutane | No reaction |
| 2-t-butylazo-2-phthalimido-4-methylpentane | No reaction |

100 parts of Standard Unsaturated Polyester Resin mixed with 0.1 part LUPERSOL DDM, 2.0 parts phosphoric acid (86%) and 1.0 part azo compound.

EXAMPLE 28

The resin used in these Examples is a fire retardant unsaturated resin known as "Hetron 92"* (prepared by reactimg hexachloroendomethylene tetrahydrophthalic anhydride with a glycol and containing 28.9 wt.% chlorine and 28.5 wt. % added styrene monomer). The Polyester Foams Prepared by Using Various Acid-Sensitive Azos

| Example | Azo Compound | Parts Azo | Parts Phosphoric Acid | Parts LUPERSOL* DDM | Approx. Foam Time (mins.) + | Peak °F | Time to Peak °F (mins.) | Density of Rigid Foam (g/cm³) |
|---|---|---|---|---|---|---|---|---|
| 26-1 | 2-t-butylazo-2-methoxy propane | 1.00 | 2.00 | 0.10 | 4 | 296 | 18 | 0.57 |
| 26-2 | 2-t-butylazo-2-methoxy-4-methylpentane | 1.00 | 1.35 | 0.10 | 5.5 | 314 | 16.5 | 0.64 |
| 26-3 | 2-t-butylazo-2,4-dimethoxy-4-methylpentane | 1.00 | 0.95 | 0.10 | 6 | 288 | 19 | 0.63 |
| 26-4 | 1-t-butylazo-1-methoxy-cyclohexane | 1.00 | 2.80 | 0.20 | 7 | 295 | 16.5 | 0.65 |
| 26-5 | 2-t-butylazo-2-acetoxy-propane | 1.00 | 2.50 | 0.10 | 6.5 | 288 | 14 | 0.60 |
| 26-6 | 2-t-butylazo-2-acetoxy-4-methylpentane | 1.00 | 1.60 | 0.10 | 6 | 320 | 12 | 0.74 |
| 26-7 | 2-t-butylazo-2-acetoxy-4-methoxy-4-methylpentane | 1.00 | 0.75 | 0.10 | 4.5 | 311 | 11 | 0.73 |
| 26-8 | 1-t-butylazo-1-acetoxy-cyclohexane | 1.00 | 2.50 | 0.10 | 8 | 286 | 16 | 0.69 | procedure was the same as that described in Examples 25-1 etc.
*Trade name of Durez Plastics Division of Hooker Chemical Company Foams Prepared From a Flame Retardant Unsaturated Polyester Resin

| Azo Compound (2 parts) | Parts $H_3PO_4$ | Foam Density (g/cc) |
|---|---|---|
| 2-t-butylazo-2-methoxypropane | 3.75 | 0.34 |
| 2-t-butylazo-2-methoxy-4-methylpentane | 2.50 | 0.61 |
| 2-t-butylazo-2-acetoxypropane | 3.75 | 0.47 |
| 1-t-butylazo-1-acetoxycyclohexane | 3.00 | 0.55 |
| 2-t-butylazo-2-acetoxy-4-methylpentane | 2.50 | 0.49 |

EXAMPLE 29

A number of unsaturated polyester foams were prepared using the same resin and the same technique as described in Example 10-1, etc. 1.0 part of 1-t-butylazo-1-methoxycyclohexane, and 0.1 part of a methyl ethyl ketone peroxide were used with 100 parts of Standard Unsaturated Polyester Resin. Data given below indicate that polymeric foams may readily be prepared over the temperature range 59° to 212° F.

Polyester Foams Prepared Over a Range of Temperatures Using 1 Part 1-t-butylazo-1-methoxycyclohexane

| Example | Initial Resin Temperature (° F) | Density of Resulting Foam (grams/cc) using | | |
|---|---|---|---|---|
| | | 1.4 Parts $H_3PO_4$ | 2.8 Parts $H_3PO_4$ | 4.2 Parts $H_3PO_4$ |
| 29-1 | 59 | — | 0.73 | — |
| 29-2 | 104 | 0.64 | 0.62 | 0.91 |
| 29-3 | 140 | 0.71 | 0.84 | 1.0 |
| 29-4 | 212 | 0.45 | — | — |

EXAMPLE 30

100 grams of Standard Unsaturated Polyester Resin in a 9 oz. waxed paper cup were mixed with 0.2 parts of t-butylperbenzoate and the desired amount of azo compound using an electric stirrer. Finally, the appropriate amount of the appropriate acid was mixed into the formulation. The temperature of the foamed mass increased to 262°–322° F due to heat of reaction.

mote the growth of small uniform cells in polyester foams prepared with acid sensitive azo compounds of this invention. For example, into a 32 oz. waxed paper cup was weighed 225 g of Laminac 4128[1] polyester resin, 3.4 g Igepal CO-430[2], 5.7 g of 1-t-butylazo-1-acetoxycyclohexane and 0.15 g t-butyl perbenzoate. These components were mixed with a high speed mixer for one minute. At this time 10.6 g of 85.4% phosphoric acid was added and stirring was continued for 30 seconds. The mixture foamed and cured, reaching a peak exotherm of 316° F after 10 minutes. The rigid foam had a density of 30 lb/cuft. A thin section of this foam was photographed under 20x magnification. A second foam similar to the first thin section (except no surfactant was used) was prepared and photographed. Examination of these photos revealed that the formulation containing surfactant produced a foam consisting of small uniform cells with a size range of .01 to .02 cm compared to that containing no surfactant which consisted of a non-uniform cell structure with a cell size range of 0.03 to 0.08 cm.
1. American Cyanamid Company
1. American Cyanamid Company 2. General Aniline & Film Corp., Nonylphenoxypoly (ethyleneoxy)ethanol, nonionic surfactant.

EXAMPLE 32

Foaming a Polyester-Styrene Resin Blend With 2-t-Butylazo-2-hydroxypropane in a Silicone Rubber Mold A blend of two polyester resins was prepared by mixing 400 grams of the Standard Unsaturated Polyeter Resin and 400 grams of a styrene monomer based unsaturated polyester resin prepared from maleic anhydride, phthalic anhydride, propylene glycol and diethylene glycol which had a viscosity of 620 centipoise (Brookfield) and a specific gravity of 1.13, in a large beaker. To this blend was added 1.6 grams of t-butyl peroxybenzoate, 12.0 grams Dow Corning Surfactant No. 193 and 9.6 grams of 2-t-butylazo-2-hydroxypropane. The mixture was stirred with a high speed high torque mixer for approximately 30 seconds. The mixture was quickly poured uniformly into a RTV (room temperature vulcanized) silicone rubber picture frame mold of approximately 1700 ml volume. A piece of plywood with release paper was clamped over the top of the mold. After twenty minutes the plywood was removed and the molded picture frame removed from the mold. The density of the picture frame was approximately 27.6 lbs./cu. ft. The surface detail of the finished piece accurately reproduced the wood grain surface present on the rubber mold.

Foams Prepared Using Various Acids as Activators

| Example | Acid | Acid Concentration (wt. %) | Parts Acid | Azo | Parts Azo | Peak ° F | Time to Peak (min) | Density (grams/cm³) |
|---|---|---|---|---|---|---|---|---|
| 30-1 | Phosphorus | 76% | 2.0 | 2-t-butylazo-2,4-dimethoxy-4-methyl-pentane | 1.0 | 270° | 20 | 0.63 |
| 30-2 | Sulfuric | 60% | 0.5 | " | 1.8 | 322 | 11 | 0.48 |
| 30-3 | Methane Sulfonic | 100% | 0.25 | " | 1.8 | 262 | 15 | 0.62 |
| 30-4 | Nitric | 15% | 0.5 | " | 1.8 | 272 | 16 | 0.89 |
| 30-5 | Hydrochloric | 36% | 0.5 | " | 1.8 | 300 | 19 | 0.61 |
| 30-6 | Sulfuric | 60% | 1.0 | 1-t-butylazo-1-acetoxy cyclohexane | 1.8 | 308 | 15 | 0.45 |
| 30-7 | Perchloric | 50% | 0.5 | " | 1.8 | 340 | 7 | 0.67 |
| 30-8 | Phosphoric | 85% | 3.0 | " | 1.8 | 315 | 11 | 0.45 |

EXAMPLE 31

Surfactants promote gas nucleation and provide wall stability thus preventing coalesence of small foam cells. Ionic and non-ionic surfactants have been used to pro- Rigid foams may also be prepared from resins that are terminated by polymerizable unsaturated ester functions. The general formula of the resin is

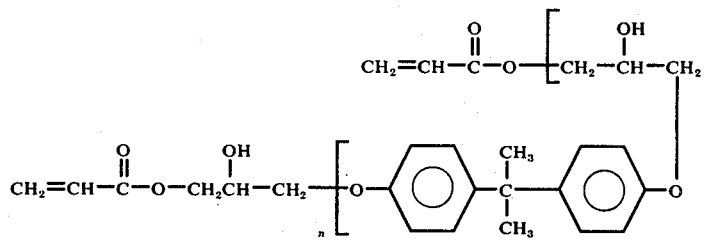

These resins are diluted with styrene monomer. The commercially available compound, Derakane 412-45*, had its styrene content reduced from 45 weight percent to 40 weight percent by vacuum distillation. Although the unmodified Derakane 412-45* resin gave rigid foams, the resin of reduced styrene content resulted in faster cure times compared to the unmodified resin.
*Dow Chemical Company 100 Grams of modified vinyl ester resin were mixed with the desired amount of azo compound and 0.1 g of methyl ethyl ketone peroxide using an electric stirrer. Finally the appropriate amount of phosphoric acid was mixed into the formulation at ambient temperature.

The temperature of the foamed mass increased to 264°–320° F due to the heat of reaction. The foaming and curing were complete in less than 25 minutes. After cooling to ambient the rigid foams were cut into cubes and densities were determined.

The azo compounds used are shown below, together with the density of the resultant polymeric foams.

Vinyl Ester Foams Prepared using 2 Parts of Azo Compound

| Example | Azo Compound | Parts $H_3PO_4$* | Foam Density (g/cc) |
|---|---|---|---|
| 33-1 | 2-t-butylazo-2-methoxypropane | 3.75 | 0.47 |
| 33-2 | 2-t-butylaza-2-methoxy-4-methylpentane | 2.50 | 0.55 |
| 33-3 | 2-t-butylazo-2,4-dimethoxy-4-methylpentane | 1.75 | 0.55 |
| 33-4 | 1-t-butylazo-1-methoxycyclohexane | 3.50 | 0.58 |
| 33-5 | 1-t-butylazo-1-acetoxycyclohexane | 3.00 | 0.49 |
| 33-6 | 2-t-butylazo-2-acetoxy-4-methylpentane | 2.50 | 0.44 |
| 33-7 | 2-t-butylazo-2-acetoxypropane | 3.75 | 0.55 |

*86 wt. % phosphoric acid

EXAMPLE 33

Other rigid foams were prepared from a resin similar to that used in Example 33-1 to 33-7, i.e., a resin terminated by polymerizable unsaturated ester functions. In the present example, the resin, Derkane 412-45*, was used in its commercial form (not modified).
*Dow Chemical Company To 100 g of Derakane 412-45 was added 3.25 g of 1-t-butylazo-1-acetoxycyclohexane, 0.4 g of t-butyl perbenzoate and 1.5 g Igepal CO-430**. After mixing for 30 seconds with a high speed electric stirrer, 6.5 g of 85.4% phosphoric acid were added and stirring continued for an additional 30 seconds. Several glass vials (1 × 3.5 inches) were filled two-thirds full with this mixture and a top was clamped in place. The resin foamed to fill the vial completely and cured with an exotherm to a rigid state after 25 minutes. This average density of cured pieces was 25.8 lb/cu. ft. (0.41 g/cc).
**General Aniline & Film Corporation

EXAMPLE 34

Foaming a Polyester Alkyd Resin Using Acetone to Enhance Foaming

Polymeric foams were prepared using a polyester alkyd with an inert diluent and no added monomer. The reactive solution consisted of 100 parts of Stypol 414-83* (Freeman Chemical Company — an alkyd prepared by condensing dipropylene glycol with maleic anhydride) and 12 parts of acetone as a diluent. Samples were prepared by mixing 100 grams of the reactive solution in a beaker with the designated amount of 2-t-butylazo-2-hydroxypropane as indicated below. A flexible open-celled foam resulted from using acetone.
*Acid No. 31 ± ³ — contains no styrene or the like.

| Example | Parts **Azo | Foam Density (grams/cm³) |
|---|---|---|
| 34-1 | 3 | 0.15 |
| 34-2 | 4 | 0.10 |

**Per 100 parts reactive solution.

EXAMPLE 35

A number of polymer foams were prepared using a polyester alkyd with an inert diluent and no added monomer. The reactive solution consisted of 100 parts of Stypol 414-83 (Freeman Chemical Company — alkyd prepared by condensing dipropylene glycol with maleic anhydride) and 12 parts of acetone. Samples were prepared with the indicated quantities of 1-t-butylazo-1-acetoxycyclohexane in the manner described in Examples 15-1, etc. Data on the resultant foams are given below.

| Example | Parts Azo Compound | Parts 60 wt. % Sulfuric Acid | Foam Density (grams/cm³) |
|---|---|---|---|
| 35-1 | 2 | 1 | 0.33 |
| 35-2 | 3 | 1 | 0.23 |

1 part of Monowet MT 70 (Surfactant) per 100 parts of solution was used

EXAMPLE 36

Preparation of Rigid Foam from a Derakane Resin Using Acetone and 2-t-butylazo-2-hydroxypropane To 100 grams of Derakane 412-45* was added 1.0 gram of surfactant LK 221**, 0.5 gram of t-butyl perbenzoate and 5.0 grams of reagent grade acetone. After mixing thoroughly with a high speed electric stirrer, 1.0 gram of 2-t-butylazo-2-hydroxypropane was added and stirring continued for an additional 30 seconds. The mixture foamed with a simultaneous increase in temperature due to the heat of reaction. The temperature reached a maximum of 215° F after 34 minutes. After cooling to room temperature, a cube was cut with a band saw. The density of the foam was 23.2 lbs/cu. ft. The cell structure was fine and uniform.

* A product of Dow Chemical used as purchased. The acid number of this resin (same as that of Example 33) was determined to be 5.3 i.e., 5.3 mg. KOH were needed to neutralize 1.0 gram of resin. ** A product of Air Products and Chemicals, Inc.

EXAMPLE 37

Unsaturated polyester foams were prepared in the same manner as described in Example 10-1, etc., except that n-pentane was added to the system. Data shown below indicate that the amount of foaming obtained increases with the amount of pentane added.

Polyester Foams Prepared Using n-Pentane To Enhance Foaming

| Example | Parts Pentane* | Foam Density g/cm$^3$ |
| --- | --- | --- |
| 37-1 | None | 0.67 |
| 37-2 | 1.0 | 0.62 |
| 37-3 | 2.0 | 0.57 |
| 37-4 | 4.0 | 0.45 |

*1 part 1-t-butylazo-1-methoxycyclohexane and 2.8 parts (86%) phosphoric acid.

EXAMPLE 38

Other unsaturated polyester foams were prepared using the unsaturated polyester resin described in Example 10-1 etc., using 1-t-butylazo-1-acetoxycyclohexane and employing various non-reactive blowing agents. Data on these foams are given below.

| Ex. | Added Blowing Agent | Parts* | Density of Foam (grams/cm$^3$) | | |
| --- | --- | --- | --- | --- | --- |
| | | | 1.0 | 2.0 | 3.0 |
| 38-1 | Isopentane | | 0.39 | 0.30 | 0.28 |
| 38-2 | Isoprene | | 0.42 | 0.36 | 0.34 |
| 38-3 | n-pentane | | 0.39 | 0.33 | 0.28 |
| 38-4 | dichloromethane | | 0.42 | 0.41 | 0.40 |
| | None | | 0.45 | | |

*Parts of Added Blowing Agent per 100 parts of Standard Unsaturated Polyester Resin.
Formulation consists of 100 parts of unsaturated polyester resin, 2.0 parts 1-t-butylazo-1-acetoxycyclohexane, 3.0 parts 86% wt. % phosphoric acid, 0.03 parts t-butyl perbenzoate, and the designated parts of Added Blowing Agent.
The addition of the compounds illustrated in Examples 34-1 through 38-4 allows one to use a more economical formulation to achieve a given foam density.

EXAMPLE 39

Rigid foams may also be prepared from thermoplastic resins such as methyl methacrylate. A Lucite Acrylic Sirup, DuPont designation 202-X, was used to prepare a rigid foam. This resin is a solution of 26 wt.% polymethylmethacrylate in methyl methacrylate monomer.

To 50.0g of sirup in a 9 oz waxed paper cup was added with stirring 1.0 g of 1-t-butylazo-1-acetoxycyclohexane, 0.5g of t-butyl perbenzoate and 0.5g of an anionic surfactant (Monawet MT-70*). Finally, 1.5g of phosphoric acid (85 wt.%) was added. After 15 minutes at room temperature, 15.0 g of this mixture were added to an 18 × 150 mm pyrex test tube. The tube was placed into a 50° C water bath and after 10 minutes, foaming started. At this time the tube was removed from the bath, foaming continued until the foam extended approximately ½ inch above the top of the tube.

* Mona Industries, Inc. - Di-tridecyl Na sulfosuccinate (70% soln.). The resulting rigid white foam had a density of 20 lb/ft.$^3$ or 0.32g/cc.

EXAMPLE 40

Rigid thermoplastic foams can be prepared from mixtures of copolymerizable monomers such as methyl methacrylate and acrylic acid. In this case the acrylic acid functions both as an activator for 2-t-butylazo-2-hydroxy propane and as a copolymerizable monomer.

To 40.0 g of methyl methacrylate monomer was added 10.0 g of acrylic acid, 0.5 g of a silicone surfactant (DOW 193*) and 1.0 g of 2-t-butylazo-2-hydroxy propane. After 15 minutes the temperature had increased to 140° F due to the heat of reaction and the viscosity had increased significantly. At this time an additional 1.5 g of 2-t-butylazo-2-hydroxypropane were added with rapid mixing. The mixture foamed and cured to a rigid white open celled foam with a density of approximately 0.16 g/cc or 10.0 lb/cu.ft.

* A product of Dow Corning

EXAMPLE 41

The resin system, designated Gulf Polyanoxy resin, has been used to prepare a polymeric foam. Its composition is:
9.9% Glycidyl Methacrylat
21.6% Styrene Maleic Anhydride Copolymer
3.5% Maleic Anhydride
65.0% Styrene (41-1) to 50.0 g of Gulf Polyanoxy resin in a 9 oz. waxed paper cup was added 0.5 g dimethylaniline followed by 1.3 g of LUPERSOL 225* Due to the heat of reaction, the temperature of this mixture increased to 80° C. after 40 minutes, 0.08 g of dimethylaniline and 0.60 g of LUPERSOL 225* were added and stirred for 15 minutes. At this time the viscosity of the resin had increased to a medium viscosity prepolymer. To this mixture was added 1.0 g of 2-t-butylazo-2,4-dimethoxy-4-methylpentane. After stirring for 1 minute, 1.0 g of 86.4% phosphoric acid was added with rapid stirring by an electric driven stirrer. Foaming of the resin began immediately upon addition of the acid followed by an exothermic reaction which caused the temperature to increase to 210° F within 7 minutes. The foam was postcured in the oven at 70° C for 1 hour.

The resulting rigid foam was light orange-yellow in color and except for a few voids was composed of a uniform cellular structure. A cube cut from this foam on a band saw had a density of 26.4 lg/cu.ft. (0.42 g/cc).

* Di Sec. Butyl Peroxydicarbonate (41-2) To 50.0 g of Gulf Polyanoxy resin in a 9 oz. waxed paper cup was added 0.10 g of dimethylaniline followed by 2.0 g of LUPERSOL 225. After 1 hour and 20 minutes, 0.6 g LUPERSOL 225 was added followed by 0.3 g t-butyl perbenzoate and 1.6 g 1-t-butylazo-1-methoxycyclohexane. Thirty minutes after this addition, the viscosity of the prepolymer had increased to a medium viscosity. To this mixture was added 3.0 g of 86.4 wt.% phosphoric acid with rapid stirring. Foaming began immediately and the temperature increased to 200° F within 7 minutes. The foam was postcured for 1 hour at 100° C.

The resulting rigid foam was light orange in color and was composed of a relatively uniform cellular structure. A cube cut from this foam on a band saw had a density of 11.5 lb/cu.ft. (0.18 grams/cm$^3$).

In the following examples, all parts referred to are on a weight basis.

EXAMPLE 42

Foaming a Polyester Alkyd

A polyester foam was prepared by foaming a polyester alkyd[1] in the absence of a solvent or reactive monomer. The alkyd used in this experiment was prepared by reacting maleic anhyride, phthalic anhydride and propylene glycol. In a 100 ml pyrex beaker 50.0 g. of the above alkyd was heated to 50° C. to the viscous alkyd was added 0.5 g. of silicone surfactant [2], 0.5 g. of t-butyl perbenzoate and 1.0 g. of 85% $H_3PO_4$. After mixing thoroughly 1.0 g. of 2-t-butylazo-2,4-dimethoxy-4-methylpentane was added and mixed at high speed with an electric stirrer equipped with a turbine type paddle.

* (1) This is the alkyd portion of Laminac 4128 (American Cyanamid Company). Structure described previously. (2) DC 193, Dow Corning Corporation.

The mixture foamed slowly to give a semi-flexible foam with a fine uniform cell structure. Foam density was 0.37g/cc.

EXAMPLE 43

Foaming ethylmethacrylate/Geon 443 Syrup, Using a Dimethacrylate as Gelling Agent To 70 parts of ethylmethacrylte (inhibited with 15 ppm of monomethylether of hydroquinone) stirring in a mixing bowl; 30 parts of Geon *443 (a carboxyl modified vinyl chloride/vinylacetate copolymer) was added. The mixture was stirred until a clear syrup was obtained.

* B. F. Goodrich Chemical Company 92.80 g. of the above syrup, 4.0 g. of ethylene glycol dimethacrylate, 1.0 g. of Dow Corning 193 surfactant, 1.0 g. of t-butyl perbenzoate, 0.4 g. of dichloroacetic acid, and 0.3 g. of 10% copper naphthenate in dioctyl phthalate were placed in a 9 oz. waxed paper cup and blended using an electric stirrer.

0.5 g. of 2-t-butylazo-2-hydroxybutane was then added, and the mixing was continued at high speed for 20 seconds. The mixture foamed, gelled, and the bulk of the reaction exotherm occurred within 6 minutes, yielding a white, rigid foam having a density of 0.42 g/cm³.

EXAMPLE 44

Foaming Lauryl Methacrylate/Geon 222* Syrup Trimethylol Propane Trimethacrylate as Gelling Agent

*Geon 222 is a vinyl chloride/vinylidene chloride copolymer having an inherent viscosity of 0.39 and a specific gravity of 1.54. This copolymer is available from B. F. Goodrich Chemical Company.

To 70 parts of lauryl methacrylate (inhibited with 100 ppm of hydroquinone) stirring in a mixing bowl, 30 parts of Geon 222 was added. The mixture was stirred until a clear syrup was obtained.

89.2 g. of the above syrup, 4.0 g. of trimethylol propane trimethylacrylate, 1.0 g. of Dow Corning 193 surfactant, 1.0 g. of t-butyl perbenzoate, 0.5 g. of dichloroacetic acid, 0.3 g. of 10% copper naphthenate in dioctyl phthalate, and 3.0 g. of Atomite** were placed in a 9 oz. waxed paper cup and blended using an electric stirrer.

** A calcium carbonate filler 1.0 g. of 2-t-butylazo-2-hydroxybutane was then added and the mixing was continued for 30 seconds at high speed. The mixture foamed and the bulk of the reaction exotherm occurred within 5 minutes. A flexible foam having fine cell size and a density of 0.33 g/cm³ was obtained.

EXAMPLE 45

Foaming Isobutyl Methacrylate/Geon 222 Syrup Using a Trimethacrylate as Gelling Agent To 60 parts of isobutylmethacrylate (inhibited with 10 ppm of monomethylether of hydroquinone) stirring in a mixing bowl, 40 parts of Geon 222 was added. The mixture was stirred until a clear syrup was obtained.

92.60 g. of the above syrup, 4.0 g. of trimethylol propane trimethacrylate, 1.0 g. of Dow Corning 193 surfactant, 1.0 g. of t-butyl perbenzoate, 0.4 g. of dichloroacetic acid, and 0.3 g. of 10% copper naphthanate in dioctyl phthalate were placed in a 9 oz. waxed paper cup and blended using an electric stirrer.

0.7 g. of 2-t-butylazo-2-hydroxybutane was then added, and the mixing was continued at high speed for 20 seconds. A major portion of the mixture was decanted into a second 9 oz. cup. The mixture foamed, gelled and the bulk of the reaction exotherm occurred within 1.5 minutes, yielding a white, rigid, fine-celled foam having a density of 0.28g/cm³.

EXAMPLE 46

Foaming of Triethylene Glycol Dimethacrylate/Geon 222 Syrup

To 74 parts of triethylene glycol dimethacrylate stirring in a mixing bowl, 26 parts of Geon *222 (a low molecular weight vinyl chloride/vinylidene chloride copolymer) was added. The mixture was stirred until a clear obtained.

was obtained.
* B. F. Goodrich Chemical Company 100 g. of the above syrup, 1.0 g. of Dow Corning 193 surfactant, and 0.75 g. of dichloroacetic acid were placed in a 9 oz. waxed paper cup and blended using an electric stirrer. 1.0 g. of 2-t-butylazo-2-hydroxybutane was then added and mixed at high speed for 20 seconds. The mixture foamed and cured in about 7 minutes. A rigid foam having uniform cell size and a density of 0.27 g/cm³ was obtained.

EXAMPLE 47

Foaming Polyester Resin Containing Dissolved Kraton 101

90 g. of Stypol * No. 40.753.40, 10 g. of styrene containing 1.0 g. of dissolved Kraton ** 101, 1.0 g. of Dow Corning 193 surfactant, 0.2 g. of t-butyl perbenzoate, 0.02 g. of 10% copper naphthenate in dioctyl phthalate and 1.0 g. of 2-t-butylazo-2-hydroxybutane were placed in a 9 oz. waxed paper cup and blended at high speed for 30 seconds, using an electric stirrer. The mixture foamed and reached peak exotherm in 5.7 minutes. A rigid, fine-celled foam having a density of 0.41 g/cm³ was obtained.

* Freeman Chemical Company — This resin was prepared by reacting maleic anhydride (1.0 mole), isophthalic anhydride (1.0 mole) and propylene glycol (2.2 mole) until an acid number of 30–35 was obtained. Seventy nine parts of this unsaturated polyester were diluted with twenty one parts of styrene monomer. ** Shell Chemical Company — a polystyrene-polybutadiene-polystyrene block copolymer containing 30% styrene units.

EXAMPLE 48

Foaming Syrup of Styrene/Geon 222/Trimethacrylate

To 44 parts of styrene and 28 parts of trimethylolpropane trimethyacrylate stirring in a mixing bowl, 28 parts of Geon 222 was added. The mixture was stirred until a clear syrup was obtained.

100 g. of the above syrup, 1.0 g. of Dow Corning 193 surfactant, 1.0 g. of t-butyl perbenzoate, 1.0 g. of dichloroacetic acid, and 0.3 g. of 10% copper naphthenate in dioctyl phthalate were placed in a 9 oz. waxed paper cup and blended using an electric stirrer. 50 g. of Atomite * (A calcium carbonate filler) was added and the mixture was blended to a homogeneous consistency.
* Thompson, Weinman, & Company 1.0 g. of 2-t-butylazo-2-hydroxybutane was then added and the mixing was continued at high speed for 30 seconds. The mixture foamed and the bulk of the reaction exotherm occurred within 9 minutes.

A rigid foam of uniform cell size having a density of 0.43 g/cm$^3$ was obtained.

EXAMPLE 49

Foaming of Polyester-Styrene Containing Dissolved Geon 222

To 60 parts of styrene stirring in a mixing bowl, 40-parts of Geon 222 added. The mixture was stirred until a clear syrup was obtained.

50 g. of the above syrup and 50 g. of Laminac 4123*(A polyester resin comprised of 70 parts alkyd and 30 parts styrene) were placed in a 9 oz. waxed paper cup to give a mixture of the following composition:
45% styrene
35% polyester
20% Geon 222
*Structure described previously To this mixture 1.0 g. of Dow Corning 193 surfactant, 1.0 g. of t-butyl perbenzoate, 0.5 g. of dichloroacetic acid, and 0.02 g. of 10% copper naphthenate in dioctyl phthalate were added and blended using an electric stirrer.

1.0 g. of 2-t-butylazo-2-hydroxybutane was then added and mixed at high speed for 30 seconds. The mixture foamed and cured in about 3 minutes. A rigid foam of fine cell structure having a density of 0.36g/cm$^3$ was obtained.

EXAMPLE 50

Foaming Mixture of Vinylacetate, Triallylisocyanurate and PMMA

To 35 parts of triallylisocyanurate and 35 parts of vinyl acetate stirring in a mixing bowl, 30 parts of Elvacite * 2009 (a methyl methacrylate homopolymer resin) was added. The mixture was stirred until a clear syrup was obtained.
* E. I. duPont deNemours & Company Inc. - Elvacite 2009 has a number average molecular weight of 80,000 and a specific gravity of 1.15.

100 g. of the above syrup, 1.0 g. of Dow Corning 193 surfactant, 1.0 g. of a 75% solution of di(2-ethylhexyl) peroxydicarbonate in mineral spirits, 0.4 g. of dichloroacetic acid, and 0.3 g. of 10% copper naphthenate in dioctyl phthalate were placed in a 16 oz. waxed paper cup and blended using an electric stirrer.

1.0 g. of 2-t-butylazo2-hydroxybutane was then added and the mixing was continued at high speed for 30 seconds. The mixture foamed and the bulk of the reaction exotherm occurred in about 3 minutes and hardened to a rigid foam within 2 hours. A foam of fine cell size, having a density of 0.25 g/cm$^3$ was obtained.

EXAMPLE 51

Foaming Acrylonitrile/PMMA Syrup w/Filler — Trimethylol Propane Trimethycarylate as Gelling Agent To 55 of acrylonitrile stirring in a mixing bowl, .45 parts of Elvacite 2009 was added, the mixture was stirred until a clear syrup was obtained.
* Described previously.

62.7 g. of the above syrup, 4.0 g. of trimethylol propane trimethacrylate, 1.0 g. of Dow Corning 193 surfactant, 0.5 g. of t-butyl perbenzoate, 0.5 g. of dichloroacetic acid, and 0.3 g. of 10% copper naphthenate in dioctyl phthalate were placed in a 9 oz. waxed paper cup and blended using an electric stirrer. 30g. of Atomite** was added and the mixture was blended to a homogeneous consistency.
** A calcium carbonate filler 1.0 g. of 2-t-butylazo-2-hydroxybutane was then added and the mixing was continued for + seconds. The mixture foamed in 2 minutes, and cured in about 5 minutes. A rigid foam, light brown in color, having irregular cell size and a density of 0.37 g/cm$^3$ was obtained.

EXAMPLE 52

Foaming of Derakane Resin Containing Dissolved Geon 222

To 77 parts of Derakane *411-C50(A resin containing styrene and polymer terminated by polymerizable ester functions) stirring in a mixing bowl, 23 parts of Geon 222 as added. The mixture was stirred until a clear syrup was obtained.
* Dow Chemical Company — Structure described previously 100 g. of the above syrup, 1.0 g. of Dow Corning 193 surfactant, 1.0 g. of t-butyl perbenzoate and 1.0 g. of dichloroacetic acid were placed in a 9 oz. waxed paper cup and blended, using an electric stirrer.

1.0 g. of 2-t-butylazo-2-hydroxybutane was then added and mixed at high speed for 30 seconds. The mixture foamed and gelled in 5 minutes, and cured in about 12 minutes. A rigid foam of fine cell size and a density of 0.38 g/cm$^3$ was obtained.

EXAMPLE 53

Foaming Syrup of Ethylmethacrylate, Polybutadiene, Geon 222, Ethylene Glycol Dimethacrylate as Gelling Agent To 51.5 parts of ethylmethacrylate (inhibited with 15 ppm of monomethylether of hydroquinone) and 10 parts of Arco* Poly BD Liquid Resin R-5HT (A hydroxyl terminated polybutadiene resin) stirring in a mixing bowl, 38.5 parts of Geon 222 was added. The mixture was stirred until a clear syrup was obtained.
* Arco Chemical Company 93.4 g. of the above syrup, 3.0 g of ethylene glycol dimethacrylate, 1.0 g of Dow Corning 193 surfactant, 1.0 g. of t-butyl perbenzoate, 0.5 g. of dichloroacetic acid, and 0.3 g. of 10% copper naphthenate in dioctyl phthalate were placed in a 9 oz. waxed paper cup and blended using an electric stirrer.

0.8 g. of 2-t-butylazo-2-hydroxybutane was then added and the blending was continued at high speed for 20 seconds. A major portion of the mixture was decanted into a 16 oz. waxed paper cup. The mixture gelled and the bulk of the reaction exotherm occurred in about 2 minutes. A rigid foam of uniform cell size having a density of 0.23 g/cm³ was obtained.

EXAMPLE 54

Foaming Unsaturated Polyester/vinyl Acetate

To 25 parts of vinyl acetate (inhibited with 300 ppm of diphenylamine) stirring in a mixing bowl, 75 parts of Hetron* Resin No. 27205 (a flaked alkyd) was added. The mixture was stirred until a clear syrup obtained.

* Hooker Chemical Company — This alkyd is produced by condensation of a mixture consisting of a glycol, fumaric acid and 5,6-dicarboxy-1,2,3,4,7,7-hexachlorobicyclo[2.2.1]-2-heptene. The condensation reaction is terminated when an acid value of 34 is obtained. The solid alkyd has a specific gravity of 1.63.

100 g. of the above syrup, 1.0 g. of Dow Corning 193 surfactant, 0.5 g. of t-butyl perbenzoate, and 0.005 g. of 5% copper naphthenate in dioctyl phthalate were placed in a 9 oz. waxed paper cup and blended using an electric stirrer.

1.0 g. of 2-t-butylazo-2-hydroxybutane was then added and the mixing was continued at high speed for 10 seconds. The mixture foamed and cured rapidly. A rigid foam having a density of 0.32g/cm³ was obtained.

EXAMPLE 55

Foaming of PVC Plastisol Using Polyester Resin as Gelling Agent 62 g. of butylbenzyl phthalate, 56 g. of Laminac* 4128 Polyester Resin, 2.0 g. of Dow Corning 193 surfactant, 1.0 g. of dichloro acetic acid, and 0.4 g. of t-butyl perbenzoate were placed in a 16 oz. waxed paper cup and blended using an electric stirrer. 82 g. of a commercial dispersion grade polyvinyl chloride (homopolymer) resin was added and the mixture was blended to a homogeneous consistency.

*American Cyanamid Company 3.0 g. of 2-t-butylazo-2-hydroxybutane was then added, and the mixing was continued at high speed for 30 seconds. A major portion of the mixture was decanted into a 32 oz. waxed paper cup and allowed to foam. The mixture foamed and gelled in 2.5 minutes, yielding a foam of fine cell size with a density of 0.35g/cm³. The rigidity of the foamed/gelled plastisol was sufficient to permit clean handling for future fusion at elevated temperatures.

EXAMPLE 56

Foaming and Gelling of PVC Plastisol Using Butylmethacrylate and a Trimethyacrylate To 40 parts of butylmethacrylate and 40 parts of tricresyl phosphate stirring in a mixing bowl, 20 parts of Geon 222 was added. The mixture was stirred until a clear syrup was obtained.

60 g. of the above syrup, 4.0 g. of trimethylol propane trimethacrylate, 1.0 g. of Dow Corning 193 surfactant, 1.0 g. of t-butyl perbenzoate, 1.0 g. of dichloroacetic acid, and 0.2 g. of 10% copper naphthenate in dioctyl phthalate were placed in a 9 oz. waxed paper cup and blended using an electric stirrer.

20 g. of a commercial dispersion grade homopolymeric polyvinyl chloride resin and 20 g. of a commercial blending grade homopolymeric polyvinyl chloride resin were added to the above mixture and blended to a homogeneous consistency.

1.0 g. of 2-t-butylazo-2-hydroxybutane was then added and mixed in at high speed for 20 seconds. The mixture foamed and gelled in about 1 minute, producing a fine celled foam of 0.38 g/cm³ density. The rigidity of the foamed/gelled plastisol was sufficient to permit clean handling for future fusion at elevated temperatures.

EXAMPLE 57

Foaming 2-Ethylhexylacrylate/ Geon 222 Syrup w/Filler Trimethylol Propane Trimethacrylate as Gelling Agent To 68 parts of 2-ethylhexylacrylate (inhibited with 50 ppm of monomethylether of hydroquinone) stirring in a mixing bowl, 32 parts of Geon 222 was added. The mixture as stirred until a clear syrup was obtained.

69.7 g. of the above syrup, 4.0 g. of trimethylol propane trimethacrylate, 1.0 g. of Dow Corning 193 surfactant, 3.0 g. of styrene, 0.5 g. of -butyl perbenzoate, 0.5g. of dischloroacetic acid, and 0.3 g. of 10% copper naphthenate in dioctyl phthalate were place in a 9 oz. waxed paper cup and blended using an electric stirrer. 20 g. of Atomite* was added and the mixture was blended to a homogeneous consistency.

*A calcium carbonate filler 1.0 g. of 2-t-butylazo-2-hydroxybutane was then added and the mixing was continued at high speed for 30 seconds. The mixture foamed and the bulk of the reaction exotherm occurred within 5 minutes. A flexible foam having a density of 0.27 g/cm³ was obtained.

EXAMPLE 58

Foaming/Casting of Methylmthacrylate/Geon 222 Syrup, w/Filler

To 60 parts of methylmethacrylate (inhibited with 10 ppm of monomethylether of hydroquinone) stirring in a mixing bowl, 40 parts of Geon 222 was added. The mixture was stirred until a clear syrup was obtained.

130 g. of the above syrup, 10 g. of tricresyl phosphate, 9.0 g. of trimethylol propane trimethacrylate, 2.0 g. of Dow Corning 193 surfactant, 2.0 g. of t-butyl perbenzoate, 1,4 g. of styrene, 1.0 g. of dichloroacetic acid, and 0.6 g. of 10% copper napthenate were placed in a 16 oz. waxed paper cup and blended using an electric stirrer. 100 g. of Camelwite * (a calcium carbonate filler) was added and the mixture was blended to a homogeneous consistency.

* Harry T. Campbell Sons' Company 1.0 g. of 2-t-butylazo-2-hydroxybutane was then added and the mixing was continued for 30 seconds at high speed. 208 g. of the mixture was poured into a glass (pyrex) tray of 325 ml volume. The top of the tray was then closed with release paper affixed to a wooden panel, and then clamped in a press. The mixture foamed and reached peak exotherm in about 5 minutes. After an additional 15 minutes, the casting was removed from the tray. A rigid, fine celled foam of 0.64g/cm³ density was obtained.

EXAMPLE 59

Foaming/Casting of MMA (Monomer-Polymer) Syrup w/Filler (Self-Skinning)

To 64 parts of methylmethacrylate (inhibited with 10 ppm of monomethylether of hydroquinone) stirring in a mixing bowl, 36 parts of Elvacite 2009 was added. The mixture was stirred until a clear syrup was obtained.

135 g. of the above syrup, 18 g. of diallylphthalate, 5.4 g. of trimethylol propane trimethacrylate, 1.8 g. of Dow Corning 193 surfactant, 1.8 g. of t-butyl perbenoate, 0.9 g. of dichloroacetic acid, and 0.54 g. of 10% copper naphthenate in dioctyl phthalate were placed in a 16 oz. waxed paper cup and blended using an electric stirrer. 36 g. of Atomite *was added and the mixture was blended to a homogeneous consistency.

*A calcium carbonate filler 1.08 g. of 2-t-butylazo-2-hydroxybutane was then added and the mixing as continued at high speed for 30 seconds. 172 g. of the mixture was poured into a glass (pyrex) tray of 325 ml volume. The top of the tray was then closed with release paper affixed to a wooden panel, and then clamped in a press. The mixture foamed and reached peak exotherm in about 5 minutes. After an additional 4C minutes, the casting was removed from the tray. A rigid, fine celled foam having a hard, smooth surface and a density of 0.53 g/cm$^3$ was obtained.

EXAMPLE 60

Foaming/Casting of Mixed Methacrylate Syrups 104 g. of syrup consisting of 30 parts Geon 222 dissolved in 70 parts of lauryl methacrylate, 25.2 g. of a syrup consisting of 40parts Geon 222 dissolved in 60 parts of methyl methacrylate, 5.6 g. of trimethylol propane trimetharylate, 1.4 g. of Dow Corning 193 surfactant, 1.4 g. of t-butyl perbenzoate, 0.7 g. of dichloroacetic acid and 0.42 g. of 10% copper naphthenate in dioctyl phthalate were placed in a 9 oz. waxed paper cup and blended using an electric stirrer.

0.9 g. of 2-t-butylazo-2-hydroxybutane was then added and the mixing was continued at high speed for 30 seconds. 108 g. of the mixture was poured into a glass (pyrex) tray of 325 ml volume. The top of the tray was then closed with release paper affixed to a wooden panel, and then clamped in a press. After 30 minutes, the casting was removed from the tray , a flexible, fixed-celled foam having a density of 0.33 g/cm$^3$ was obtained.

EXAMPLE 61

Butyl Methacrylate Foam on MMA Gel Coat

To 75 parts of methyl methacrylate (inhibited with 10 ppm of monomethylether of hydroquinone) stirring in a mixing bowl, 25 parts of Elvacite 2009 was added. The mixture was stirred until a clear (polymer in monomer)syrup was obtained.

44 g. of the above syrup, 4.0 g. of LUPERCO * AFR-55 (A 55% benzoyl peroxide paste) and 1.0 g. of ethylene dimethyacrylate were placed in a 9 oz. waxed paper cup and mixed briefly to dissolve the benzoyl peroxide. 50 g. of Atomite and 5.0 g. of TiO$_2$* were added and the mixture was blended to a homogeneous consistency using an electric stirrer. 0.5 g. of N,N-dimethylaniline was then added and mixed in.

* LUCIDOL DIVISION, Pennwalt Corporation A calcium carbonate filler * Titanium Dioxide 82 g. of the mixture was poured and spread onto the bottom of a glass (pyrex) tray of 325 ml volume to form a gel coat 1/8 of an inch in thickness. The gel coat cured in about 18 minutes and was allowed to cool to room temperature intact in the tray.

148 g. of a syrup consisting of 40 parts Geon 222 dissolved in 60 parts of butyl methacrylate, 6.40 g. of trimethylol propane trimethacrylate, 1.60 g. of Dow Corning 193 surfactant, 1.60 g. of t-butyl perbenzoate, 0.64 g. of dichloroacetic acid, and 0.48 g. of 10% copper naphthenate in dioctyl phthalate were placed in a 16 oz. waxed paper cup and blended using an electric stirrer.

1.28 g. of 2-t-butylazo-2-hydroxybutane was then added and the mixing was continued at high speed for 30 seconds. 123 g. of the mixture was poured onto the gel coat. The top of the tray was then closed with release paper affixed to a wooden panel and clamped in a press. The mixture foamed to the top of the tray in 1 minute. After an additional 45 minutes, the foam/gel coat laminate was removed from the tray. Good adhesion between the layers and an overall density of 0.6 g/cm$^3$ was obtained.

EXAMPLE 62

Polyester Foam on MMA Gel Coat 91 g. of a commercial polyester resin — Selectron* RS-50111, 39 g. of Laminac 4123 Polyester resin, 1.30 g. of Dow Corning 193 surfactant, 0.13 g. of t-butyl perbenzoate, 0.02 g. of 10% copper naphthenate in dioctyl phthalate, and 1.69 g. of 2-t-butylazo-2-hydroxybutane were placed in a 9 oz. waxed paper cup and blended for 30 seconds at high speed using an electric mixer.

* Pittsburgh Plate Glass 110 g. of the mixture was poured onto a methlmethacrylate gel coat (as prepared in Example 61) while the gel coat was in a rigid state, but still retaining exotherm of curing reaction. The top of the tray was then closed with release paper affixed to a wooden panel and clamped in a press. The mixture foamed to the top of the tray in 2 minutes. After an additional 13 minutes, the foam/gel coat laminate was removed from the tray. Good adhesion between the layers and an overall density of 0.59 g/cm$^3$ was obtained.

EXAMPLE 63

Methacrylate Foam on Simulated Marble 86.71 g. of a syrup consisting of 40 parts of Geon 222 dissolved in 60 parts of methyl methacrylate, 32.50 g. of a syrup consisting of 30 parts Geon 222 dissolved in 70 parts of lauryl methacrylate, 6.50 g. of trimethylol propane trimethacrylate, 1.30 g. of Dow Corning 193 surfactant, 1.30 g. of t-butyl perbenzoate, 0.42 g. of dichloroacetic acid, and 0.39 g. of 10% copper naphthenate in dioctyl phthalate were placed in a 9 oz. waxed paper cup and blended using an electric stirrer.

0.78 g. of 2-t-butylazo-2-hydroxybutane was then added and the mixing was continued at high speed for 30 seconds.

112 g. of the mixture was then poured onto a ¼ inch thick by 5 inch square slab of a commercially available simulated marble material made from a cured acrylic resin containing appropriate fillers such as calcium carbonate and sold by DuPont Company under the trademark CORIAN. The slab was enclosed by wooden surrounds to permit a foam rise of 9/16 of an inch with foam density being 0.48 g/cm$^3$. The top of the mold was then closed with release paper affixed to a wooden panel and clamped in a press. After 30 minutes, the part was removed from the mold. Good adhesion between the two materials was obtained.

EXAMPLE 64

Foaming Butyl Methacrylate/PMMA Syrup Using a Trimethacrylate as Gelling Agent

To 65 parts of butyl methacrylate (inhibited with 10 ppm of monomethylether of hydroquinone) stirring in a mixing bowl, 35 parts of Elvacite 2009 was added. The mixture was stirred until a clear syrup was obtained.

92.1 g. of the above syrup, 5.0 g. of trimethylol propane trimethacrylate, 1.0 g. of Dow Corning 193 surfactant, 1.0 g. of t-butyl perbenzoate, 0.5 g. of dichloroacetic acid, and 0.4 g. of 10% copper naphthenate in dioctyl phthalate were placed in a 16 oz. waxed paper cup and blended, using an electric stirrer.

1.0 g. of 2-t-butylazo-2-hydroxybutane was then added, and the mixing was continued at high speed for 30 seconds. The mixture foamed, gelled, and the bulk of the reaction exotherm occurred in about 2 minutes. A white, rigid foam having uniform cell size and a density of 0.21 g/cm$^3$ was obtained.

EXAMPLE 65

Foaming Ethyl Methacrylate/Polystyrene Syrup Using A Trimethyacrylte as Gelling Agent To 64 parts of ethyl methacrylate (inhibited with 15 ppm of monomethylether of hydroquinone) stirring in a mixing bowl, 36 parts of a crystal polystyrene prepared by suspension polymerization and having a weight average molecular weight of 230,000 and a number average molecular weight of 93,000 was added. The mixture was stirred until a clear syrup was obtained.

92.4 g. of the above syrup, 5.0 g. of trimethylol propane trimethacrylate, 1.0 g. of Dow Corning 193 surfactant, 1.0 g. of t-butyl perbenzoate, 0.4 g. of dichloroacetic acid, and 0.2 g. of 10% copper naphthenate in dioctyl phthalate were placed in a waxed 16 oz. paper cup and blended, using an electric stirrer.

0.5 g. of 2-t-butylazo-2-hydroxybutane was then added and the mixing was continued at high speed for 30 seconds. The mixture foamed, gelled and the bulk of the reaction exotherm occurred in about 5 minutes. A white, rigid foam having uniform cell size and a density of 0.29 g/cm$^3$ was obtained.

EXAMPLE 66

Foaming a Syrup of ABS Polymer in Methyl Methacrylate Monomer

A thermoplastic foam was prepared from a polymer syrup composed of 25% by weight of an acrylonitrile-butadiene-styrene copolymer[1] dissolved in methyl methacrylate monomer. To 50.0 g. of this syrup in a 9 oz. waxed paper cup was added, with stirring, 0.4 g. of dichloroacetic acid, 0.5 g. surfactant[2], 0.06 g. of 5% copper naphthenate and 0.3 g. of acetyl cyclohexyl sulfonyl peroxide. After mixing thoroughly 1.0 g. of 2-t-butylazo-2-hydroxybutane was added and mixed at high speed with an electric motor equipped with a turbine type paddle.
1. Cyclo AC 10010T available from Borg-Warner, Marbon Div.
2. Dow Corning 193, silicone type surfactant.

The viscous syrup foamed and simultaneously increased in temperature due to the heat of reaction. The foaming and curing reactions were complete after 8 min. The rigid foam had a density of 0.18g/cm$^3$.

EXAMPLE 67

Foaming a Blend of Polyester Resin and Epoxy Resin

A rigid foam was prepared from a blend of a polyester resin and an epoxy resin. To a 9 oz. waxed paper cup was added 70.0 g. of polyester resin[1], 30.0 g. of epoxy resin[2], 1.0 g. Dow Corning 193 surfactant, 0.09 g. of a 5% copper naphthenate solution and 0.5 g. of t-butyl perbenzoate. After mixing thoroughly 1.0 g. of 2-t-butylazo-2-hydroxypropane was added and mixed rapidly with an electric motor equipped with a turbine type paddle. The resin blend foamed slowly to give a foam with a fine uniform cell structure. Foam rise was complete after approximately 5 minutes. A post cure at 110° C for 18 hrs. was used to develop full physical properties. The cured foam had a density of 0.30g/cc.
1. Laminac 4123 — structure described previously.
2. D. E. R. 321 — Dow Chemical Company. This resin is based on a blend of a diglycidyl ether of bisphenol A and butyl glycidyl ether. The resin has an epoxide equivalent weight of 182–192 and a viscosity of 500–700 cps at 25° C.

EXAMPLE 68

A Foam Prepared from a Blend of Polyester and Phenolic Resins

A rigid foam was prepared from a blend of a polyester resin and a phenolic resin. To a 9 oz. waxed paper cup was added 70.0 g. of Laminac 4123[1], 30.0 g. of Durez 7421A phenolic resin[2], 1.0 g. Dow Corning 193 surfactant, and 0.5 g. of t-butyl perbenzoate. After mixing thoroughly 1.0 g. of 2-t-butylazo-2-hydroxypropane was added and mixed rapidly with an electric motor equipped with a turbine type paddle. The resin blend foamed slowly to give a foam with a fine uniform cell structure. The temperature increased due to the heat of reaction and reached a maximum of 325° F after 9 minutes. The density of the foam was 0.51g/cc.
1. American Cyanamid — structure previously described.
2. Hooker Durez Division — This resin is produced by a one step process in which phenol and formaldehyde are condensed under alkaline conditions. The resin is supplied at a viscosity of 3200 cps at 25° C.

EXAMPLE 69

Foaming a Blend of Polyester Resin in Acrylic Syrup

A rigid foam was prepared from a blend of a polyester resin and an acrylic syrup. To a 9 oz. waxed paper cup was added 80.0 g. of polyester resin[1], 20.0 g. of acrylic syrup[2], 1.0 g. of silicone surfactant[3] and 0.5 g. t-butyl perbenzoate. After mixing thoroughly 1.0 g. of 2-t-butylazo-2-hydroxybutane was added and mixed at high speed. The mixture foamed and simultaneously increased in temperature due to the heat of reaction. The temperature reached a maximum of 400° F after 9 minutes. After cooling to room temperature, a cube was cut with a band saw. The density of the foam was 0.37g/cc. The cell structure was fine and uniform.
1. Paraplex P-701 available from Rohm and Haas Company. This is a maleic anhydride-propylene glycol type polyester containing 30.5–37.5% styrene monomer and having an acid number of 15–25.
2. Paraplex p-340 available from Rohm and Haas Company. This syrup is composed of styrene monomer containing 30–35% of an acrylic polymer. The polymer is primarily poly(methyl methacrylate) containing some acid functionality. Syrup viscosity is 750–1550 cps.
3. DC-193 Silicone surfactant
NOTE: A 60/40 blend of those resins is commercially identified as Paraplex P-19D and is offered by Rohm and Haas as a low shrink molding resin.

EXAMPLE 70

Foaming a Blend of 1,2-Polybutadiene in Vinyl Toluene

A 70% by weight blend of a 1,2-polybutadiene in vinyl toluene coreactive monomer was foamed at elevated temperatures. To a 9 oz. waxed paper cup was added 100 g. of resin[1], 35.0 g. of calcium carbonate filler[2] 1.0 g. of silicone surfactant[3], 1.5 g. of dichloroacetic acid, 0.5 g. of benzoyl peroxide and 2.0 g. of LUPEROX 500-R[4]. After mixing thoroughly for approximately 2 minutes at high speed with an electric motor equipped with a turbine type paddle, 1.0 g. of 2-t-butylazo-2-hydroxybutane was added and mixed for an additional 30 seconds. The slowly foaming mixture was poured into the cavity of a preheated (300° F) steel mold measuring 4 inches × 4 inches 33 1 inch. The mold top was placed into position and the mold was placed into an electrically heated hydraulic press. The press was closed and maintained at 300° F. After 1.5 hrs. the tough, hard foam was removed from the mold after cooling to room temperature. The foam could be easily cut on a band saw to reveal a non-uniform cell structure. Foam density was 0.46g/cc.

1. Dienite PM-502, Firestone Synthetic Rubber & Latex Company
2. Atomite
3. DC-193, Dow Corning Corporation
4. Dicumyl Peroxide

EXAMPLE 71

Foaming a Mixture of Styrene and Maleic Anhydride

A solution of maleic anhydride in styrene monomer was converted to rigid foam. A mixture of 20.0 g. of styrene monomer and 20.0 g. of maleic anhydride (MAH) in a 100 ml pyrex beaker was heated and maintained at 50° C until solution of MAH was complete. To the stirred solution was added 20.0 g. of Atomite (calcium carbonate filler) and 1.0 g. Dow Corning 193 silicone surfactant. Finally after mixing thoroughly 1.0 g. of 2-t-butylazo-2,4-dimethoxy-4-methyl pentane was added. The mixture began to foam rapidly. After a foam rise time of approximately 15 seconds, a rapid polymerization and exotherm occurred resulting in a solid foamed structure with a non-uniform cell structure. The foam had a density of 0.64g/cc.

EXAMPLE 72

Foaming a Mixture of Allyl Monomer in Vinyl Acetate

A solution of diethylene glycol bis(allyl carbonate), herein referred to as ADC, vinyl acetate monomer and triallyl isocyanurate monomer was converted to a rigid foam. Thus, to a 9 oz. waxed paper cup was added 15.0 g. of ADC monomer, 10.0 g. of vinyl acetate monomer, 5.0 g. triallyl isocyanurate, 25.0 g. of calcium carbonate filler, 5.0 g. of milled fiber glass, 0.02 g. of a 5% copper naphthenate solution, 0.2 g. of t-butyl perbenzoate, 0.3 g. of Dow Corning 193 surfactant and 0.5 g. of dichloroacetic acid. After mixing thoroughly 0.5 g. of 2-t-butylazo-2-hydroxybutane was added and mixed rapidly with an electric motor equipped with a turbine paddle.

The mixture foamed slowly to a stiff gel state after approximately 12 minutes. The foam was placed into a hot air oven maintained at 100° C. After a post cure treatment for 1.5 hrs. the foam was a hard rigid solid with non-uniform cell structure and had a density of 0.61 g/cc.

EXAMPLE 73

Foaming of Ethoxylated Bisphenol a Dimethacrylate 100 g. of ethoxylated bisphenol A dimethacrylate (Sartomer* SR-348) 1.0 g. of Dow Corning 193 surfactant, and 1.0 g. of dichloroacetic acid were placed in a 9 oz. waxed paper cup and blended using an electric stirrer. 1.0 g. of 2-t-butylazo-2-hydroxybutane was then added and mixed at high speed for 30 seconds. The mixture foamed and cured in about 4 minutes. A rigid foam of fine cell structure having a density of 0.38 g/cm³ was obtained.

* Sartomer Company

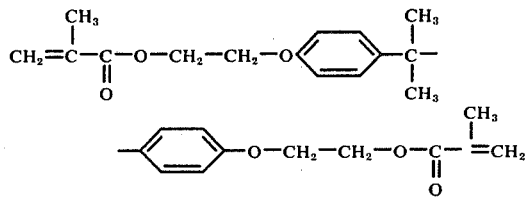

EXAMPLE 74

Foams From Isophthalic Acid-Propylene Glycol-Maleic Anhydride Resin

Isophthalic polyesters were prepred from 50 moles parts of isophthalic acid, 50 mole parts of maleic anhydride and 110 mole parts of propylene glycol. Alkyds having appropriate acid values were diluted with styrene to prepare resins 74-1, 74-4 and 74-5 at the viscosities given below.

The resins in Examples 74-2 and 74-3 were prepared from the resin of Example 74-1 by adjusting the acid value of the resin of Example 74-1 to 15.8 and 30.5 respectively by adding methacrylic acid. Foams were prepared from the resulting polyester resin by the technique described hereinbefore, this operation being promoted and catalyzed by the use of a surfactant (LS 221), t-butyl perbenzoate and copper naphenate mixture (similar to those of Examples 10, 5 and 22) with 1% by weight of 2-t-butylazo-2-hydroxybutane. Foam properties are given below.

The alkyd used to produce example 74-1, was diluted with 2-vinyl toluene to produce a resin containing 39 wt%2-vinyl toluene. A 32 lb/cu.ft foam was prepared using the described foaming technique. Similarly, the alkyd was diluted to produce a resin containing 25 wt% styrene and 10 wt%-alpha-methyl styrene. A 36 lb/cu.ft.foam was obtained from this resin using the described foaming technique.

Foams from Isophthalic Acid-Propylene Glycol-Maleic Anhydride Resins

| Example | 25° C Brookfield Visc. | Wt. % Styrene | Acid Value (Solids) | Density Lb/Cu. Ft. |
|---|---|---|---|---|
| 74-1 | 1040 | 39.5 | 10.5 | 42.5 |
| 74-2 | 1040 | 39.5 | 15.8 | 38.1 |
| 74-3 | 1020 | 39.0 | 30.5 | 42.6 |
| 74-4 | 950 | 32.0 | 30.0 | 32.0 |
| 74-5 | 1100 | 31.0 | 48.0 | 26.0 |

EXAMPLE 75

A series of three polyesters were prepared from propylene glycol and varying amounts of phthalic anhydride and varying amounts of maleic anhydride, after which varying amounts of styrene were added. Following preparation of the polyester resins, foams were prepared as described in Example 74. In each of these phthalic anhydride-maleic anhydride-propylene glycol polyester resins, 110 mole parts of propylene glycol were used. Particulars of the resin preparation and the foam characteristics are given below.

Foams from Phthalic Anhydride-Maleic Anhydride-Propylene Glycol Resins Containing Varying Non-aromatic Unsaturation

| Example | Mol Parts Maleic Anhydride | Mol Parts Phthalic Anhydride | Acid Value (Solids) | 25° C Brookfield Visc. | Wt. % Styrene | Density Lb/Cu. Ft. |
|---|---|---|---|---|---|---|
| 75-1 | 100 | — | 25.5 | 2250 | 29.4 | 36.7 |
| 75-2 | 50 | 50 | 28.3 | 1300 | 30.1 | 29.3 |
| 75-3 | 20 | 80 | 30.0 | 875 | 30.6 | 23.6 |

EXAMPLE 76

A series of diethylene glycol polyester resins containing varying amounts of phthalic anhydride and maleic anhyride were prepared. Each such resin was made from 110 mole parts of the diethylene glycol, the mole parts of phthalic anhydride and maleic anhydride are set forth below, as are the weight percentages of styrene and the densities of the foam formed therefrom. The foams were prepared as described below.

Foams from Phthalic Anhydride-Maleic Anydride-Diethylene Glycol Resins Containing Varying Non-aromatic Unsaturation

| Example | Mol Parts Maleic Anhydride | Mol Parts Phthalic Anhydride | Acid Value (Solids) | 25° C Brookfield Visc. | Wt. % Styrene | Density Lb/Cu. Ft. |
|---|---|---|---|---|---|---|
| 76-1 | 100 | — | 25.0 | 1,000 | 22.4 | 42.3 |
| 76-2 | 50 | 50 | 28.2 | 1,050 | 22.4 | 31.4 |
| 76-3 | 20 | 80 | 30.0 | 1,050 | 23.0 | 27.2 |

EXAMPLE 77

Dipropylene glycol resins containing varying amounts of phthalic anhydride and maleic anhydride were prepared. Pertinent details regarding these polyester resins and the foams prepared from them are given below. The foams were prepared as described below.

Example 77

Foams from Phthalic Anhydride-Maleic Anhydride-Dipropylene Glycol Resins Containing Varying Non-aromatic Unsaturation

| Example | Mol Parts Maleic Anhydride | Mol Parts Phthalic Anhydride | Acid Value (Solids) | 25° C Brookfield Visc. | Wt. % Styrene | Density Lb/Cu. Ft. |
|---|---|---|---|---|---|---|
| 77-1 | 100 | — | 30.80 | 1050 | 24.6 | 45.2 |
| 77-2 | 50 | 50 | 30.45 | 1090 | 24.0 | 31.7 |
| 77-3 | 20 | 80 | 29.90 | 950 | 25.0 | 56.0 |

EXAMPLE 78

A polyester resin was prepared from 50 mole parts isophthalic acid, 50 mole parts maleic anhydride and 110 mole parts of propylene glycol to give a resin having an acid value of 30.0 and a 25° C. Brookfield viscosity of 1100. The polyestr resin was combined with 35 weight percent styrene and the foaming technique described in Example 59 performed. The foam castings had a density of 27.1 lb./cu. ft.

EXAMPLE 79

Preparation of Acrylic Foams via a Spray Technique

Acrylic resin foams can be prepared by the following spray technique. Into a 5 gallon container is weighed 39.0 lb. of a polymer syrup, consisting of 15.6 lb. of Geon 222 (see Example 46) dissolved in 23.4 lb. of methyl methacrylate, 0.4 lb. of surfactant (Dow Corning DC-193), 0.1 lb. of dichloroacetic acid and 0.4 lb. of t-butyl perbenzoate. 2-t-butylazo-2-hydroxybutane is added to another container. The resin and azo, together with atomizing air are mixed in a spray gun and are ejected at ambient temperature (25° C), as a spray onto a polymethylmethacrylate sheet. The essential feature of the spray technique is that the azos and acrylic resin are mixed in the spray gun momentarily before ejection from the gun. 0.6 wt% of 2-t-butylazo-2-hydroxybutane is incorporated in the acrylic resin. The sprayed resin composition will begin to foam after 30 seconds and foaming and curing will be complete within 15 minutes.

EXAMPLE 80

Preparation of Polyester Foams via a Spray Technique

Using techniques described in Example 79, polyester resin foams can readily be prepared using the following technique. Into a 5 gallon container is weighed 39.4 lbs. of the Standard Polyester Resin, 0.2 lbs. of a 5% copper naphthenate solution, 0.50 lbs. of t-butyl perbenzoate and 0.40 lbs. of surfactant (Dow Corning DC-193). The Resin is pumped directly from this container to a spray gun. To the catalyst injector is added sufficient 2-t-butylazo-2-hydroxybutane and the flow rate is adjuted to deliver 0.5% 2-t-butylazo-2-hydroxybutane based on the Resin. At ambient temperature (25° C), the azo is sprayed onto a surface composed of a cured unsaturated polyester resin, the composition of which may be the same as or different from that of the Standard Polyester Resin. The sprayed Resin will begin to foam after 30 seconds and foaming and curing of the same will be complete within 15 minutes.

EXAMPLE 81

Preparation of a Polyester Foam Filled with Vermiculite

Fillers of various types may be added to plastic foams which are prepared using azo compounds of this invention. Fillers are added to modify density, physical properties and/or economics of the foam. For example, to 100 g. of the Standard Unsaturated Polyester Resin was added 1.0 g. surfactant (Dow Corning DC-193), 0.5 g. t-butyl perbenzoate and 1.0 g. of 2-t-butylazo-2-hydroxybutane. After mixing thoroughly for 30 seconds at ambient temperature (25° C), 10.0 g. of vermiculite[1] was added and mixed thoroughly with a spatula. The mixture foamed and cured to give a rigid foam with a fine cell structure. Foam density was determined to be 0.38 g./cc.

1. an expanded form of ferrous aluminum magnesium silicate. Bulk density equals 6.7 Lb./CF (0.107 g./cc.). Large irregular shaped particles ranging in size from approximately ⅛ inch to ¼ inch in diameter (W. R. Grace & Co.).

A similar reaction was run except that no vermiculite was incorporated. The density of the cured foam was 0.45 g./cc.

We claim:

1. Cellular polymeric structures prepared by the process which comprises mixing an acidulous or acidic polymerizable medium that is polymerizable and/or cross-linkable by a free radical mechanism with an effective amount of an acid sensitive mono- or poly-azo compound containing the group:

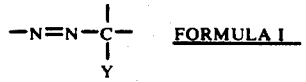

FORMULA I wherei Y is an acid sensitive group which in the presence of an acidulous or acidic polymerizable medium causes sufficient decomposition of the azo compound that gas is released in said medium and during said decomposition said mono- or poly-azo compound promotes polymerization and/or cross-linking of said medium to provide a matrix that is sufficiently polymerized and/or cross-linked that the generated gases cause the matrix to expand, each of the remaining valences being satisfied by an organic radical; provided that any carbon atom that is directly linked to an azo nitrogen, except that of a carbonyl group, has at least two of its remaining three valences satisfied by a carbon to carbon bond or a carbon to hydrogen bond.

2. Rigid cellular structures prepared in accordance with the process of claim 1.

3. The rigid cellular structures of claim 2 further characterized in that said structures are essentially in the form of open cells.

4. The rigid cellular structures of claim 2 further characterized in that said structures are essentially in the form of closed cells.

5. Flexible cellular structures prepared in accordance with the process of claim 1.

6. The flexible cellular structures of claim 5 further characterized in that said structures are essentially in the form of open cells.

7. The flexible cellular structures of claim 5 further characterized in that said structures are essentially in the form of closed cells.

8. The product of claim 1 wherein said azo compound is 2-t-butylazo-2-hydroxypropane.

9. The product of claim 1 wherein said azo compound is 2-t-butyalzo-2-hydroxybutane.

10. The product of claim 1 wherein said azo compound is 1-t-butylazo-1-hydroxycyclohexane.

* * * * *